United States Patent [19]

Rawlings et al.

[11] 4,200,930
[45] Apr. 29, 1980

[54] ADAPTER CLUSTER MODULE FOR DATA COMMUNICATIONS SUBSYSTEM

[75] Inventors: Robert L. Rawlings, El Toro; Ronald D. Mathews, Mission Viejo, both of Calif.

[73] Assignee: Burroughs Corporation, Detroit, Mich.

[21] Appl. No.: 932,698

[22] Filed: Aug. 10, 1978

Related U.S. Application Data

[63] Continuation-in-part of Ser. No. 799,265, May 23, 1977, abandoned.

[51] Int. Cl.² ............................................. G06F 3/04
[52] U.S. Cl. ................................................. 364/200
[58] Field of Search ........................... 364/200 MS

[56] References Cited

U.S. PATENT DOCUMENTS

| | | | |
|---|---|---|---|
| 3,618,037 | 11/1971 | Wollum et al. | 364/200 |
| 3,668,649 | 6/1972 | Pederson et al. | 364/200 |
| 3,934,232 | 1/1976 | Curley et al. | 364/200 |
| 4,103,328 | 7/1978 | Dalmasso | 364/200 |
| 4,156,907 | 3/1979 | Rawlings et al. | 364/200 |

*Primary Examiner*—Harvey E. Springborn
*Attorney, Agent, or Firm*—Alfred W. Kozak; Nathan Cass; Kevin R. Peterson

[57] ABSTRACT

In a digital data communication network there is provided a data communications subsystem working in conjunction with a main host system having a central host processor and main memory. The data communications subsystem provides a data communications processor and a local autonomous data communications memory connected to a basic control interface unit which supports a plurality of front-end controllers. The data communications subsystem can sense a halt in the main system and operate autonomously and independently of the main host system during such down-time. The present disclosure describes a front-end controller-processor called an adapter cluster module which is used to control a plurality of line adapters, each of which communicates with remote terminals on low to medium speed transmission lines. Up to 16 such adapter cluster modules may be accommodated as front-end controllers within a single data communications subsystem. Each adapter cluster module can handle up to eight transmission lines operating in full duplex mode. A ROM memory area is provided for standard program routines. A RAM memory is provided for storage of special routines and instructions in addition to a scratchpad area for accumulation of a full message block before any interruption is made to the data communications processor requesting further data transfer instructions. Thus, a large magnitude of overhead operations are removed from the data communications processor which formerly was interrupted each time a byte of information was received by the adapter cluster module.

16 Claims, 31 Drawing Figures

MAIN MEMORY

LOCAL MEMORY FOR DCP

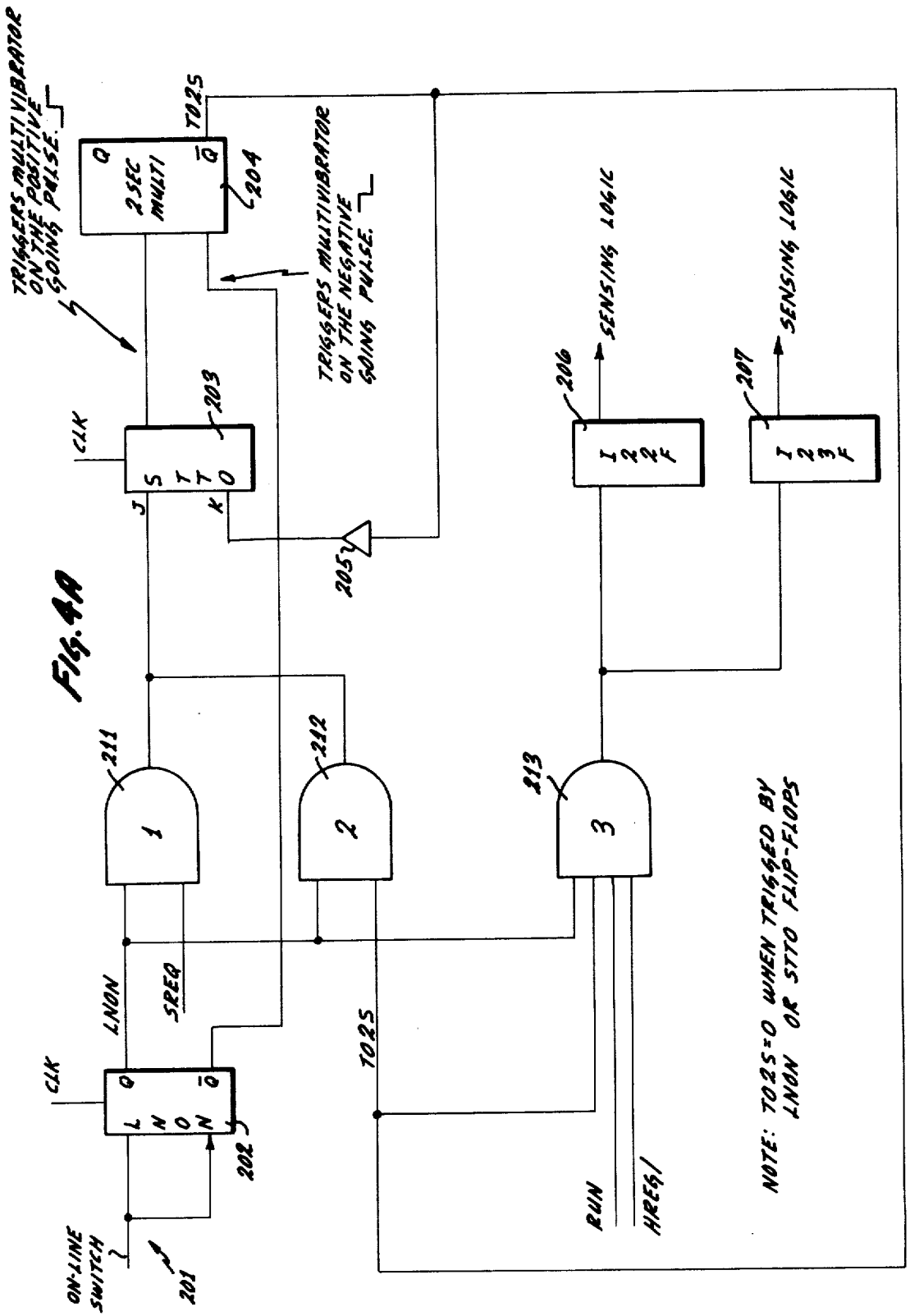

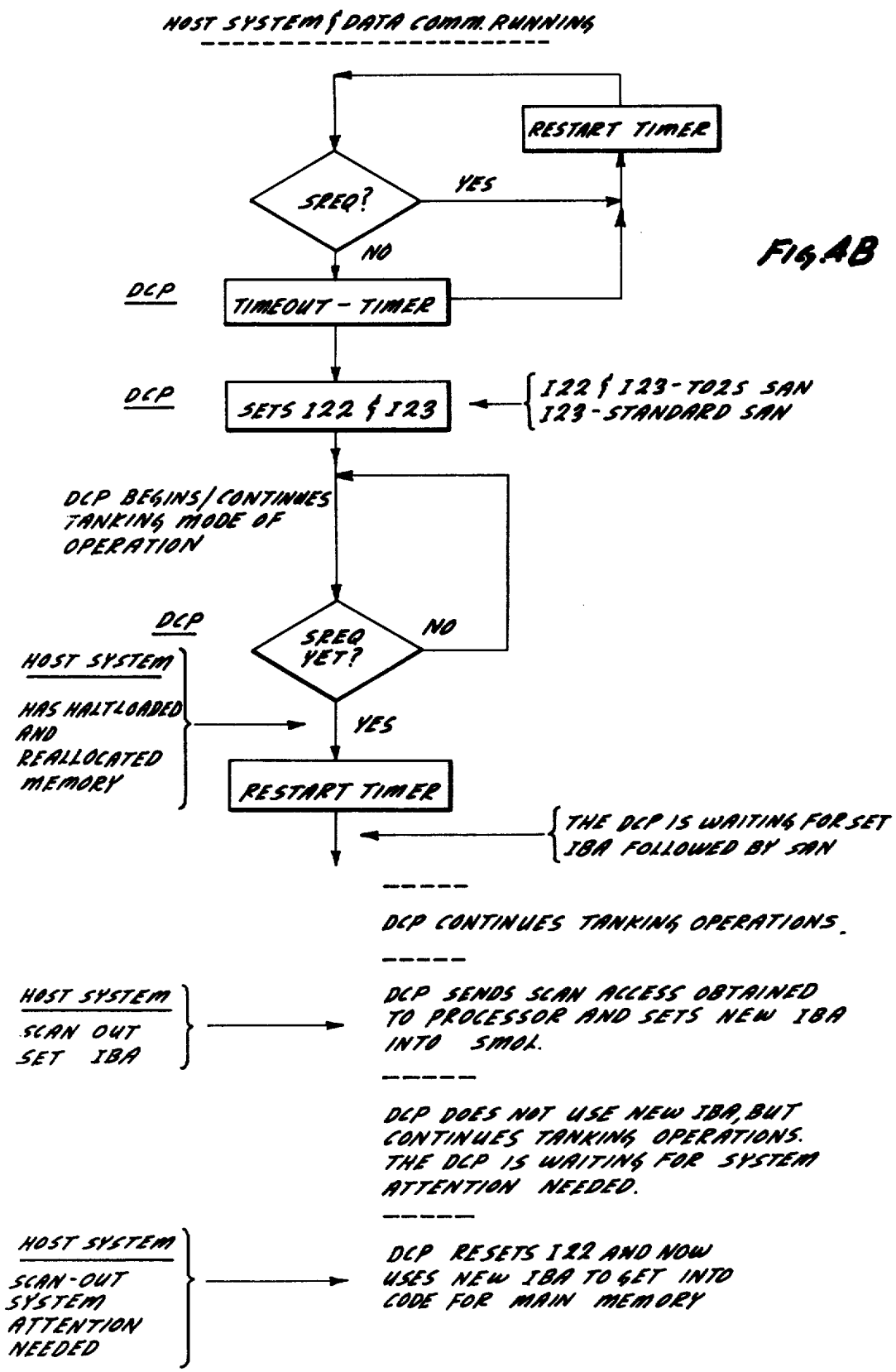

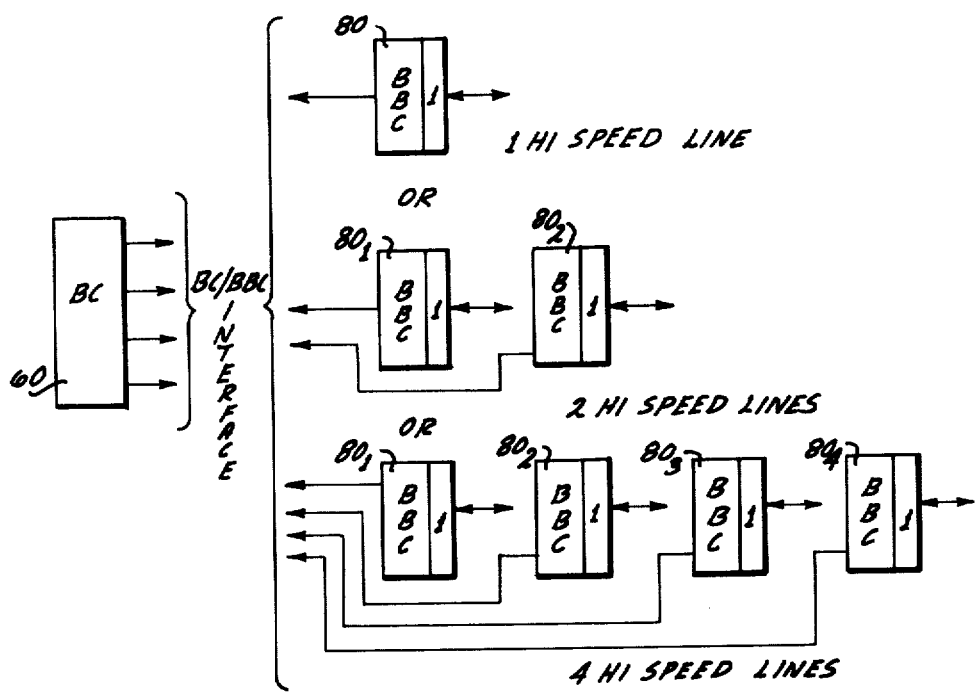
BROADBAND CONTROL CONFIGURATIONS Fig. 9
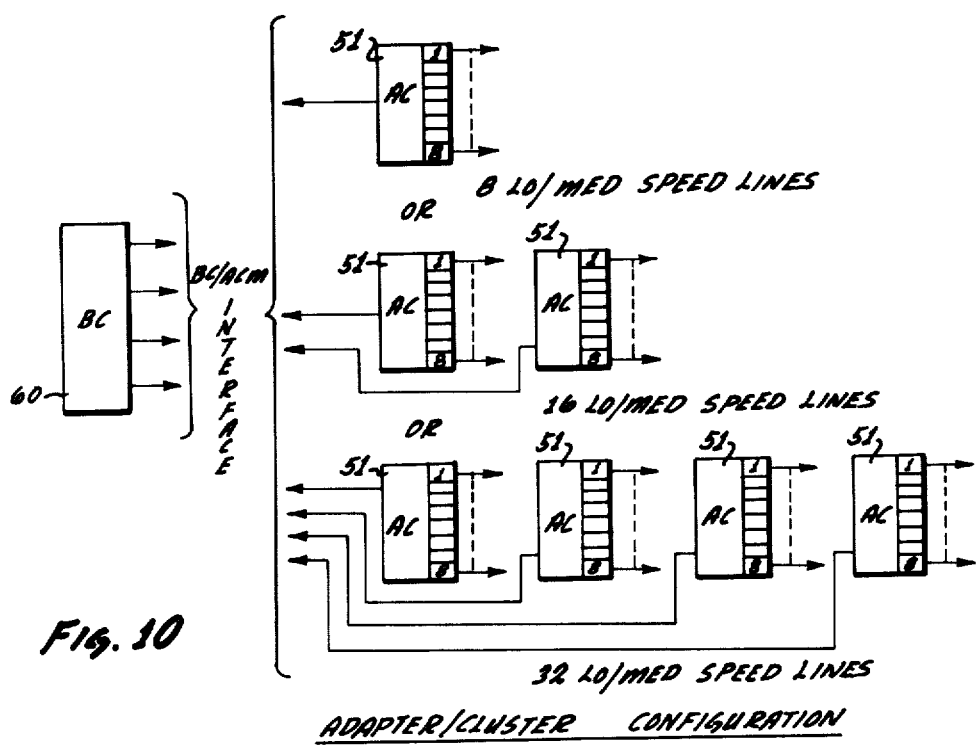
Fig. 10
ADAPTER/CLUSTER CONFIGURATION

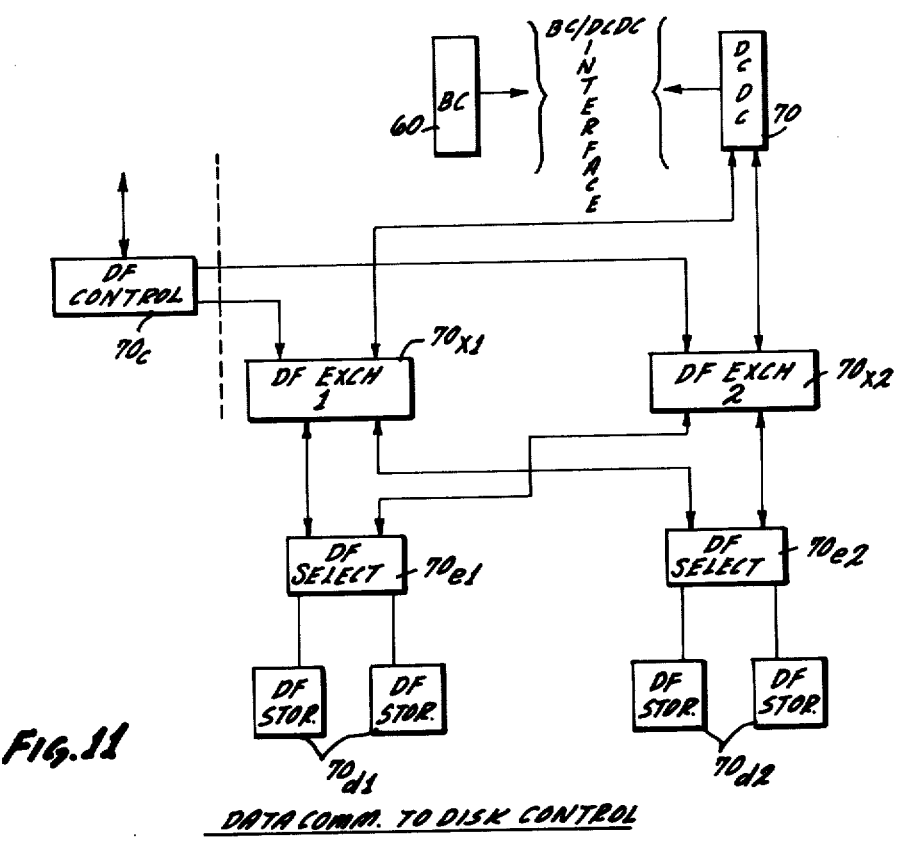
Fig. 11  DATA COMM. TO DISK CONTROL
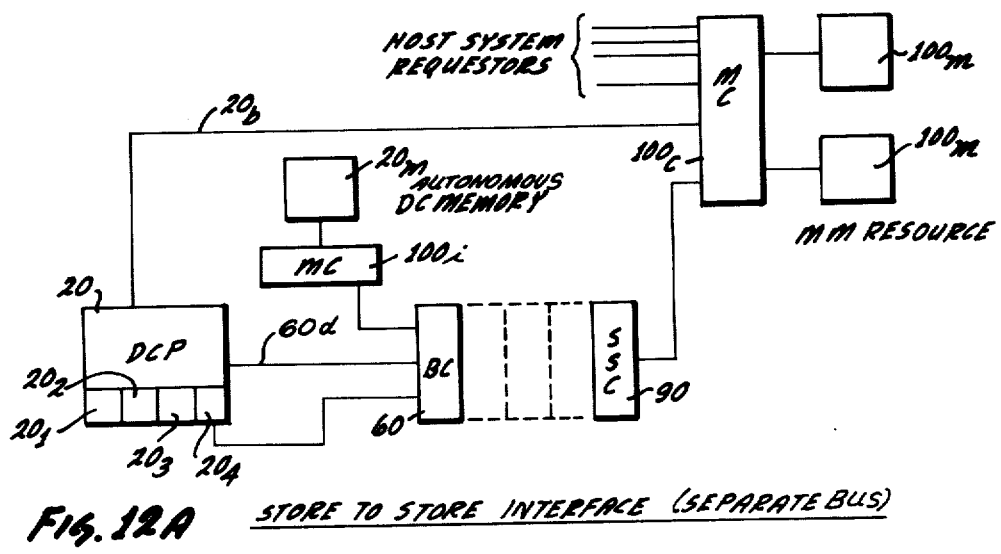
Fig. 12A  STORE TO STORE INTERFACE (SEPARATE BUS)

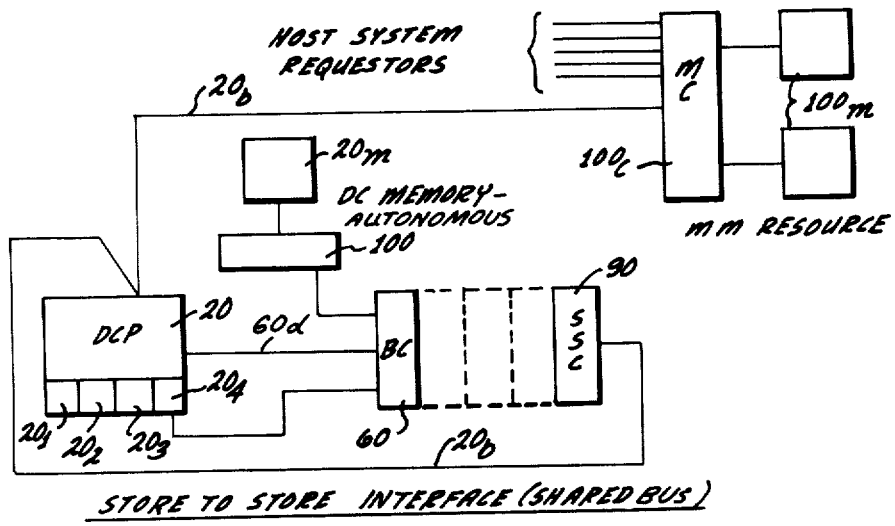
Fig. 12B — STORE TO STORE INTERFACE (SHARED BUS)
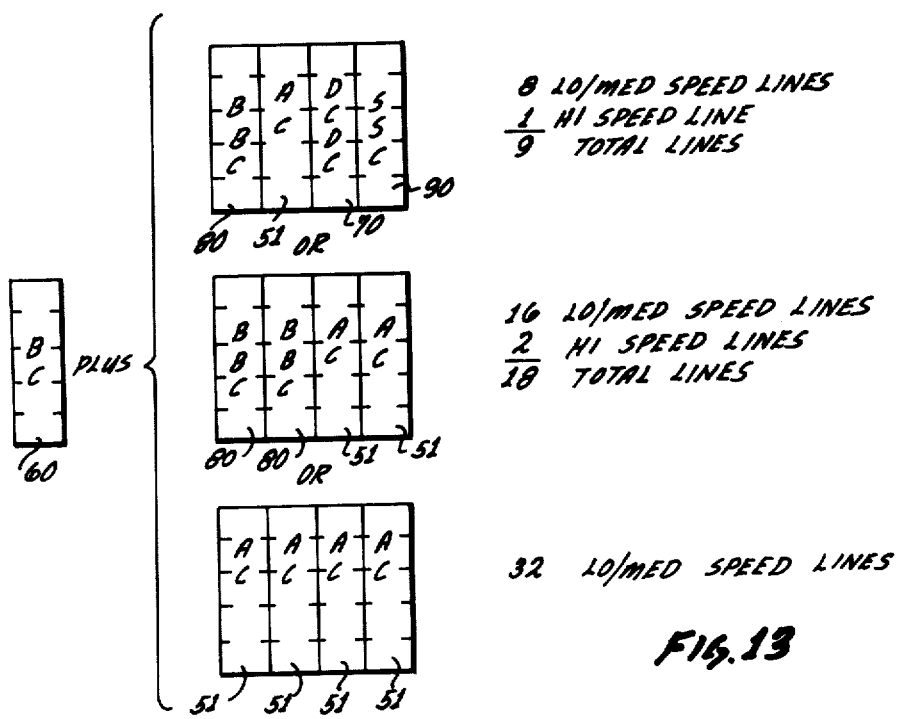
Fig. 13 — TYPICAL EDC MODULE CONFIGURATIONS

DATA COMM. COMMAND WORD (DCCW)

DATA COMM. ADDRESS WORD (DCAW)

DATA COMM. RESULT WORD (DCRW)

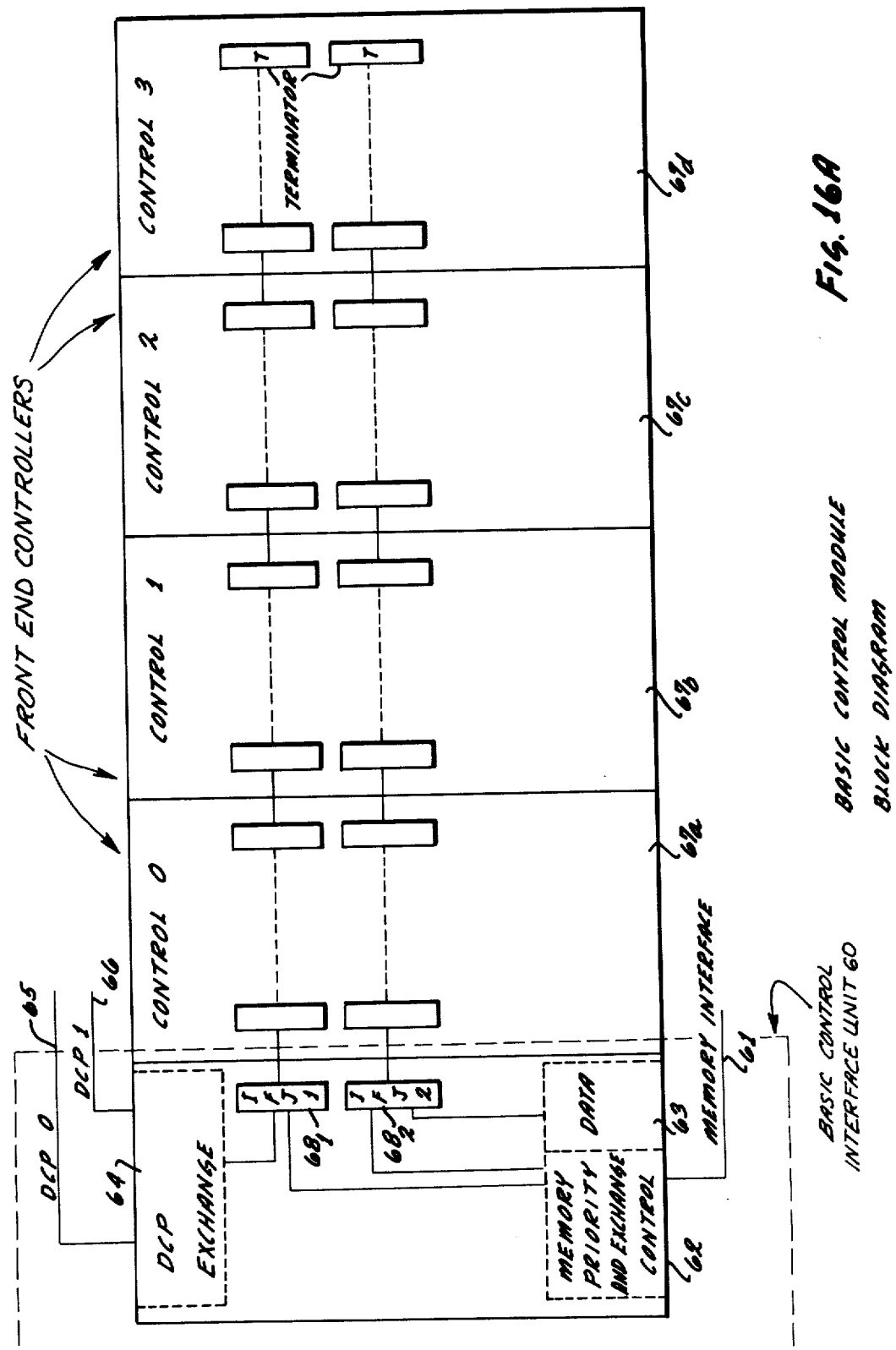

BASIC CONTROL BLOCK DIAGRAM

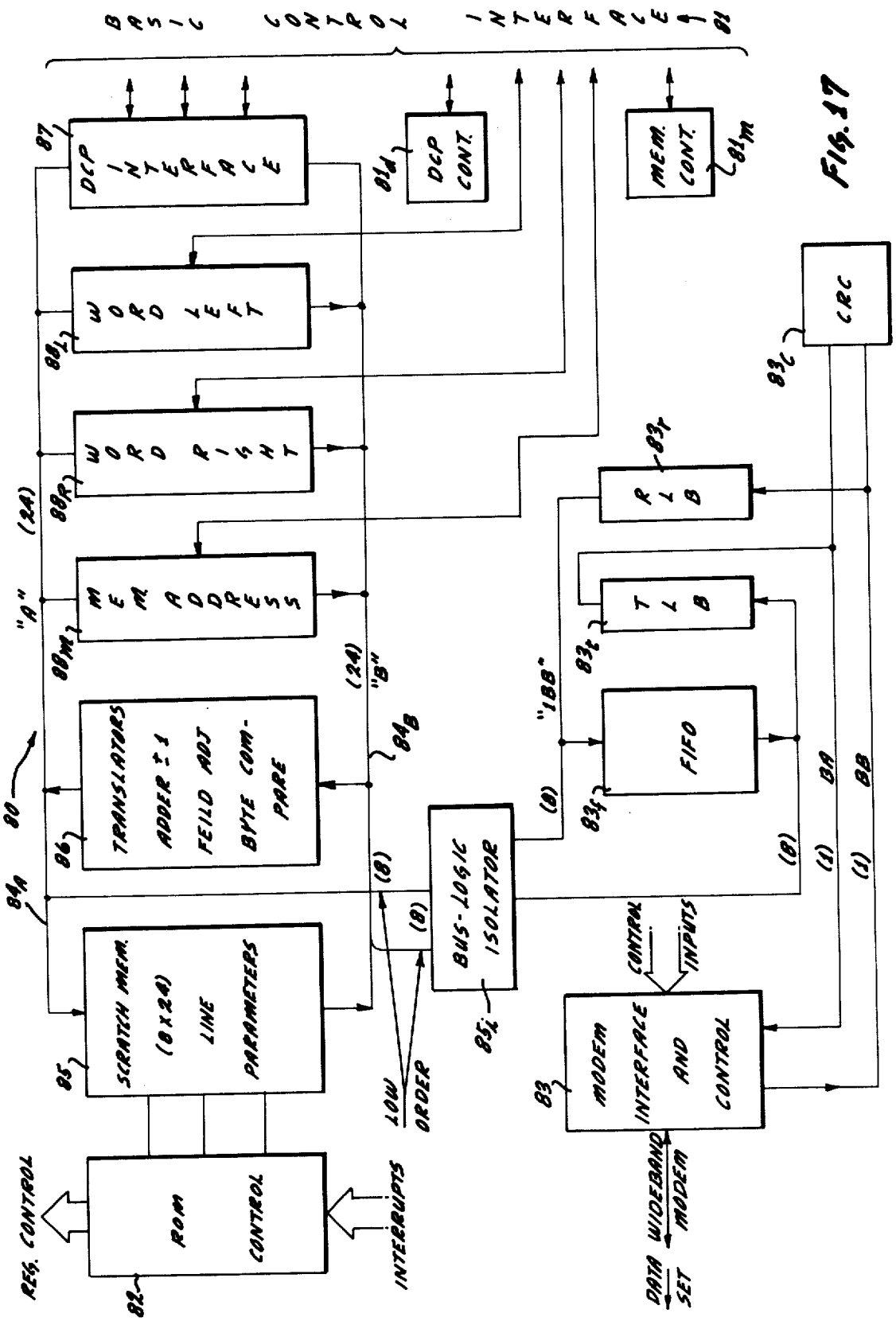

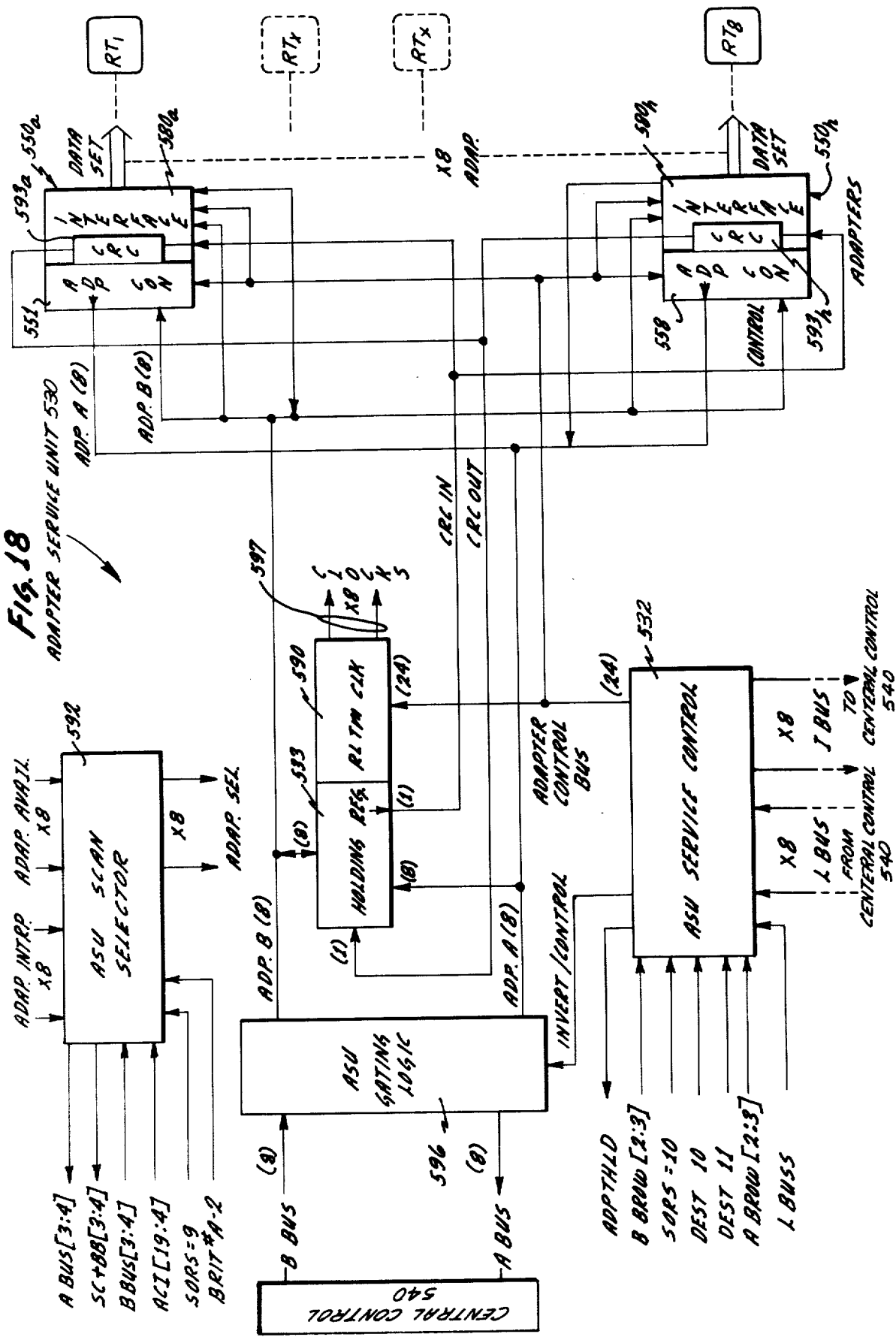

STORE TO STORE CONTROLLER

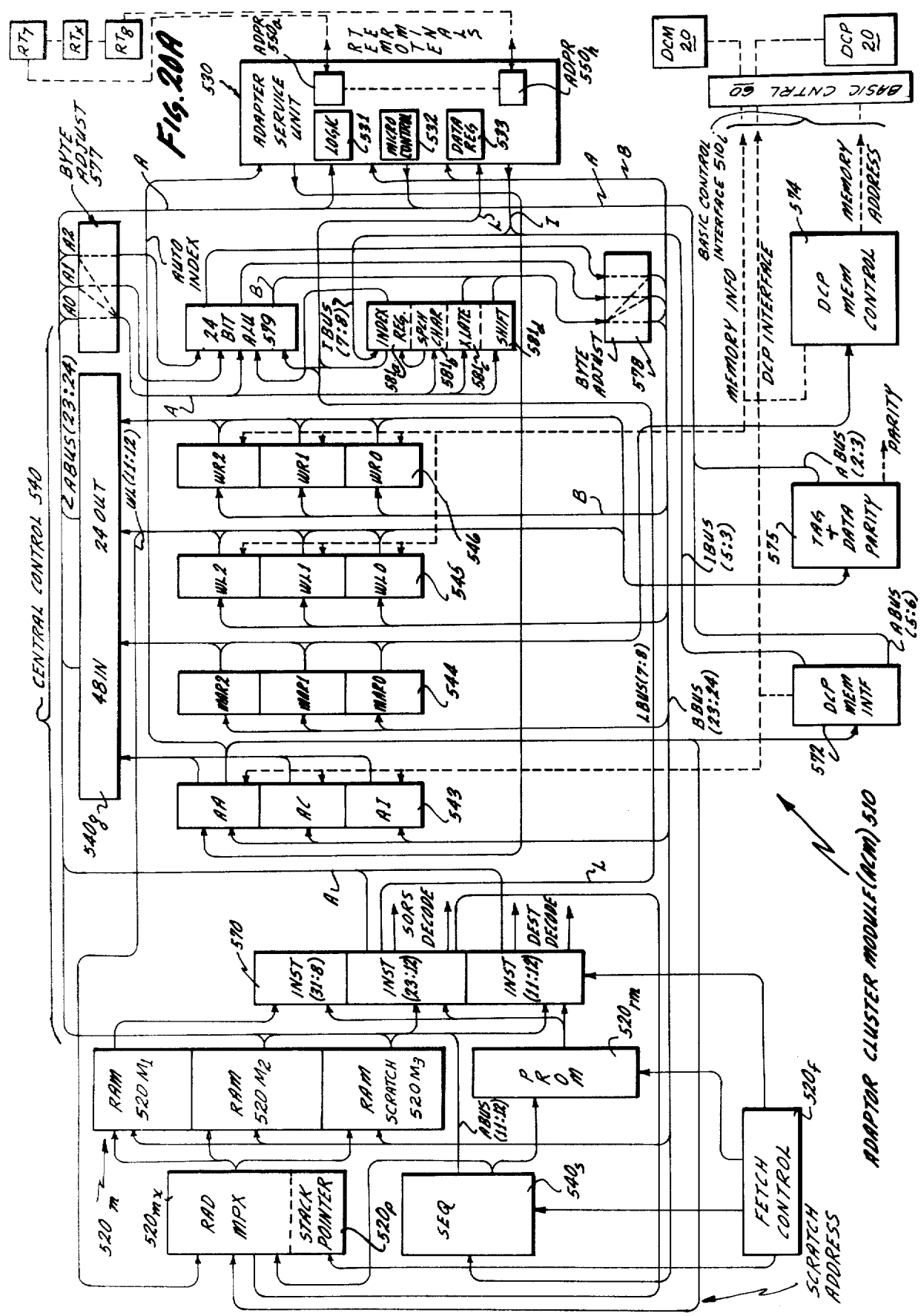

FIG. 20B MICRO-OPERATORS

| Instruction | Mnemonic | 31 30 29 28 27 26 25 24 | 23 22 21 20 19 18 17 16 15 | 14 13 12 11 10 9 8 | 7 6 5 4 3 2 1 0 |
|---|---|---|---|---|---|
| INSTRUCTION REGISTER BITS | | OP / A | B | C | D |
| | | OP / AAA SR | LIT/CONTROL/SOURCE | SOURCE | DESTINATION |
| SHIFT WITH MASK | SHMK | P 000 AAA R | MASK | SOURCE | DESTINATION |
| MOVE HALF WORD | MOVE | P 001 AAA R | LITERAL/CONTROL | SOURCE | DESTINATION |
| MOVE BYTES | MVBT | P 101 AAA R | SOURCE/CONTROL | SOURCE | DESTINATION |
| MOVE BYTE WITH LITERAL IN B FIELD | MVLB | P 011 AAA R | LITERAL/CONTROL | SOURCE | DESTINATION |
| BRANCH | BRAN | P BRAN 100 COND C | SOURCE CONDITION | Rs | BRAN ADDR. |
| BRANCH TO INDEX | BRIN | P BRIN 101 COND C | INDEX/SOURCE | Rs | BRAN ADDR. |
| BRANCH ON INTERRUPT | BRIT | P BRIT 110 COND C | INDEX SOURCE | Rs | BRAN ADDR. |
| NO OPERATION | NOOP | P 111 AAA C | | Rs | BRAN ADDR. |

C = CALL FLAG
R = RETURN FLAG

Rs = RAM SEQ BRANCH = 1

FIG. 20C A FIELD FUNCTIONS ADAPTER CLUSTER OP CODES

| INST. BITS | OP [30:3] | A FIELD, INST.[27:3]=AAA | | | | | | | | Description |
|---|---|---|---|---|---|---|---|---|---|---|
| | | 000 | 001 | 010 | 011 | 100 | 101 | 110 | 111 | |
| | | 0 | 1 | 2 | 3 | 4 | 5 | 6 | 7 | |
| SHMK | 000 | 0 | 1 | 2 | 3 | 4 | 5 | 6 | 7 | SHIFT AMOUNT |
| MOVE | 001 | CON TFR | ADDL | SUBL | — | — | LOAD RAM | READ RAM | — | HALF WORD MOVE |
| MVBT | 010 | CON TFR | ADD | SUB | AND | OR | EXOR | CON A→E | CON E→A | BYTE MOVE |
| MVLB | 011 | CON TFR | ADDL | SUBL | ANDL | ORL | XORL | CON A→E | CON E→A | BYTE LIT IN (B) |
| BRAN | 100 | BIT 0 | BIT 1 | BIT 2 | BIT 3 | BIT 4 | BIT 5 | BIT 6 | BIT 7 | BRANCH CONDITIONAL |
| BRIN | 101 | UNC | DCP INT | ASU INT | SPEC CHAR | ALU ZERO | ALU ONES | CARY 8 | CARY 20 | BRANCH INDEX |
| BRIT | 110 | UNC | DCP INT | ASU INT | SPEC CHAR | ALU ZERO | ALU ONES | CARY 8 | CARY 20 | BRANCH INTERRUPT |
| NOOP | 111 | NOOP | STOP NO BRAN | STOP + BRAN | — | — | — | — | BRAN UNC | BRANCH IN [C:D] NOP OR STOP |

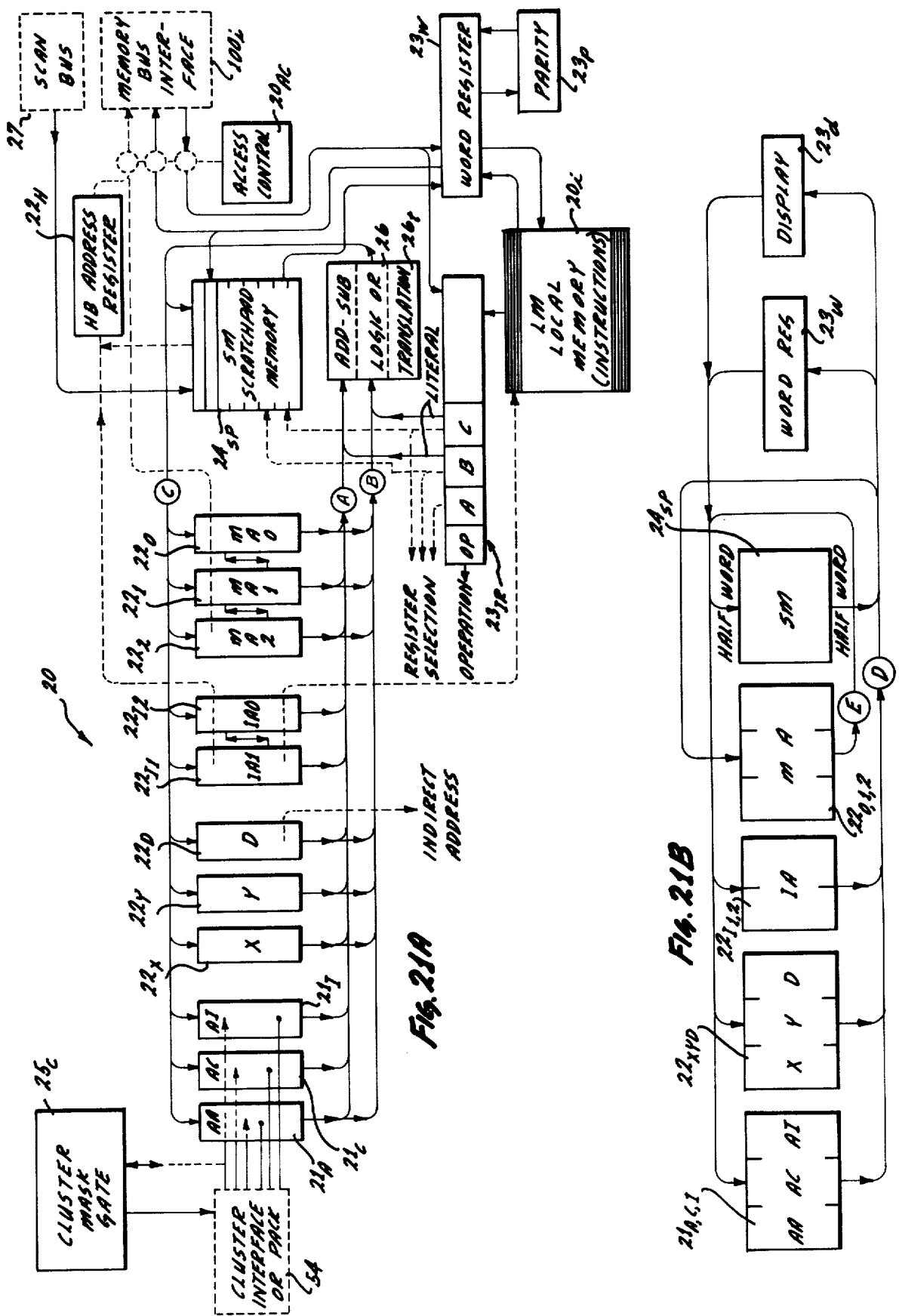

ADAPTER CLUSTER MODULE FOR DATA COMMUNICATIONS SUBSYSTEM

This application is a continuation-in-part of Ser. No. 799,265, filed May 23, 1977 and now abondoned.

CROSS REFERENCE TO RELATED APPLICATIONS

The following patent applications, each of which is assigned to the same common assignee, are related to the subject matter of the attached specification:

"Enhanced Data Communications Subsystem," inventors J. E. Wollum and R. L. Rawlings, Ser. No. 882,213, filed Feb. 28, 1978.

An application entitled "Improved Data Communications Subsystem," Ser. No. 905,885, filed May 15, 1978, by inventors R. L. Rawlings and M. G. Watson, now U.S. Pat. No. 4,156,907.

FIELD OF THE INVENTION

This invention relates to digital communication subsystems and is particularly involved with more efficient routing and control of data transfers between various types of remote peripherals on transmission lines and a central host computer.

BACKGROUND OF THE INVENTION

In recent years there has been a proliferation of communication facilities involving many remote stations and terminals working together with data processors in a network. Generally, such network systems involve a host processor working with a main memory to form a central processing unit, or even a plurality of such central processing units, whereby digitized message data can be transmitted from one station or terminal to another station or terminal within the system, but which, of course, the transmission must be routed, controlled and organized to accomplished the message transfer in an orderly and accurate fashion.

In the prior art, one example of the handling of digital communications between remote terminals and a central processor is seen in U.S. Pat. No. 3,618,037, inventor James E. Wollum and entitled "Digital Data Communication Multiple Line Control," which patent is also assigned to the assignee of the presently described invention.

In the field of data communications each data transmission line is connected to a "line adapter" which interfaces the data communications line into the system network. These line adapters may be associated together in a group and called an Adapter Cluster or, that is to say a group or cluster of adapters physically located within one unit. Each line adapter is specially designed to operate to suit the characteristics of a particular type of remote terminal or station. The line adapter has to take into account account factors such as the type of characters transmitted, the coding type of characters, the type of parity that is used, whether transmission is synchronous or asynchronous, the data rate or speed of transmission permissible, and so on, in order to provide that the terminal station connected at the other end of the transmission line will receive the proper type of signals.

Efforts are continuously being made to increase throughput, i.e., the number of message bits that can accurately be transmitted per unit time while minimizing the cost of equipment and facilities for accomplishing this. However, there must also be flexibility, in that provision must be made for wide band high speed transmission line for high speed transmission of data, in addition to low to medium speed transmission lines which are commonly used since they are cheaper in cost. Further, the accessibility of message data stored in memory must be speedily available in order to obviate delays and increase throughput, and the desirability of concurrent overhead control operations to reduce delays has been recognized.

The field of this invention pertains to data processing equipment which is intended for use with a wide variety of remotely located terminal devices. It has become very desirable to incorporate a data processing system into a network for transmission of data over long distances. The terminal devices involved will generally convert the data from a humanly readable form into binary digital form and transmit this data over wires or microwave relay systems. The terminal devices operate under and generate a wide variety of messages code sets, character lengths, bit rates, message formats, communication line disciplines and modes of transmission which present considerable problems to the designer of data communication equipment. The data communications equipment must be able to interface with a wide variety of different types of these terminal devices and should be flexible enough that additional devices can be added or that the terminal devices already used can be changed according to customer preference.

Many of the past and presently existing data communication systems are categorized by those systems which are designed with fixed hardware and are intended only with a specific type of terminal device. This may be economical but is not particularly flexible; other systems have been designed in a modular form to provide options for each of the modules to provide compatibility with certain types of terminal equipment. Because of the differences required among different line disciplines and different types of terminal requirements, it is not usually possible to design a common logic system to perform control functions to cover each of the variety of types of terminals. Among the difficulties involved is that of providing a comprehensive software package to service different configurations and in which the configurations may be desired to be changed from time to time. Thus, in the economics of time and hardware it has often been found necessary to limit the software to one particular type of data communication lines and terminal stations in the system.

With the development of integrated circuits and mini and microcomputers, it is now possible to provide hardware and software of great flexibility in order to handle systems which may have many possible configurations and newly desired configurations in the future. Often it was necessary that a particular program or subroutine be provided for each type of terminal device connected to the system and when new terminals were added to the system, a new subroutine was provided. This activity, however, lead to considerable expense, in addition to eating up long periods of time within the processor.

The present invention overcomes many of the earlier limitations and provides faster throughput of data transfers while permitting reconfigurability and also adaptability to various types of transmission lines and terminal equipment characteristics.

The use of individualized adapters as part of data communications systems in which the adapters are connected to remote terminals, such as teletype units, video terminals, etc., via telephone lines, has required a great amount of overhead operations to be imposed upon either a local processor, such as a data communications processor or upon a main host processor if no local data communications processor is available.

For example, different types of remote terminals used in a data communications system will require different codes such as ASCII or EBCDIC; also, the various remote terminals operate at different speeds and thus require specialized timing cycles; further the byte sizes of words used in different remote terminals will vary according to the type and make of terminal to further complicate the communication discipline involved; further, different terminals may require different protocols and recognition of specialized control characters.

Thus, in order that orderly data communications take place between a set of remote terminals and a central station, various types of arrangements must be made so that the variety of terminals may be received and standardized into formats which are handleable by the central station. Further, since the remote terminals operate on a relatively slow basis, generally transmitting or receiving one byte of information during a transmission cycle and then requesting an interrupt of a processor for further instructions, it is extremely burdensome and time consuming on the part of the local data communications processor to monitor, control and regulate the data transmissions for each individual byte (received or transmitted) for each of the individual remote terminals. The various requirements of, for example, eight remote terminals require a tremendous need for overhead operations on the part of the data communications processor which results in overall data transfer operations being slowed down, since the data communications processor is not readily avialable when it is occupied in handling the data communications transfer requirements of a variety of different remote terminals.

SUMMARY OF THE INVENTION

The system described herein helps to alleviate the overload imposed upon the data communications processor by changing the nature of the old type Adapter-Controllers into what is designated here as an Adapter Cluster Module which operates as a front-end controller and processor capable of relieving the multiple number of tasks formerly imposed upon the data communications processor in handling data transfer operations between a central station and a plurality of remote terminals having different line disciplines, speed and protocol requirements.

The Adapter Cluster Module, ACM, of the present embodiment provides means for handling up to eight adapter units including all of the idiosyncracies required by the remote terminals connected to each of the adapters. Thus, once initialized by the data communications processor, the Adapter Cluster Module can use its stored program routines, initially received from the data communications processor, for controlling and operating the data transfer operations to and from various remote terminals, and in so doing, handling all the requirements of differences in speed, differences in protocol, differences in line disciplines, differences in byte size, differences in requirements for translation, and recognition of specialized control characters. Further, the Adapter Cluster Module handles all individual data transmissions to and from the remote terminals including all the interrupts necessitated after an individual adapter has transmitted or received a byte of information.

Since all these overhead features are handled by the Adapter Cluster Module without interruption to the data communications processor, the data communications processor is left free to handle the larger tasks of regulating data transfer operations involving other front-end controllers such as the broadband control, the data communications disk controller, and the store-to-store controller, in addition to the Adapter Cluster Module.

Thus, in a data communications network wherein the main host system has many of its main burdens relieved by a data communications subsystem having a data communications processor, it is now possible to add an Adapter Cluster Module which will relieve further still the large volume of overhead burdens which have now been imposed upon the data communications processor.

More specifically, the improved Data Communications subsystem includes a more versatile and improved Adapter Cluster Module, operating as a front-end controller-processor, to handle all the many detailed "overhead" operations necessary in communicating on low/-medium speed transmission lines to remote terminals. In the prior art where individual line adapters were used for communications to remote terminals, it was necessary that the line adapter interrupt and ask instructions of a local processor or a central processor each time a byte of information was received from the remote terminal to the line adapter. This put a rather excessive burden on the processor which continuously had to monitor the data transfers of a plurality of line adapters to a plurality of remote terminals. It also tied up the processor from attending to other data transfer operations required for the handling of other types of front-end controllers. The presently described improved Adapter Cluster Module in combination with the improved Data Communications Subsystem relieves the great overhead burdens which were normally placed upon a local Data Communications Processor by providing, in the Adapter Cluster Module, the capability of data transfers to and from remote terminals including the handling of different baud rates of transmission, the editing of messages and accumulation of complete message blocks of information—and thus, only then, interrupting the Data Communications Processor for transfer instructions in regard to the message block of data accumulated. Under this system the Data Communications Processor, being thus relieved of ordinary overhead tasks, is more able to devote its time to controlling and handling data transfer operations for a "plurality" of front-end controllers rather than having its operation time fixed mainly on just "one" front-end controller.

The presently described Data Communications Subsystem also has the objective of optimizing the message transference of data between sending and receiving terminals in a Data Communications System network in addition to making such data available to/from a main host computer system; also by providing a special autonomous Data Communications Memory which is accessible to the Data Communications Processor and the front-end controllers, data transfers and data transfer operations can occur independently of the main host system should the main system be down or halted; further, other types of front-end controllers such as disk controllers provide for the "tanking" of messages in order to provide back-up storage for the system; further, specialized front-end controllers, such as a broadband controller may be used to handle data communication operations on high speed communication lines while another type of frontend controller designated as a "store-to-store controller" may be used to shift data between a local Data Communications Memory within the Data Communications Subsystem and memory space in the main host system memory.

The Adapter Cluster Module described herein is part of an improved data communications subsystem which may be summarized as follows:

A data communications subsystem for use with a host processor and main memory for the routing, monitoring and controlling of data messages between a plurality of remote terminals connected by data transmission lines. The central processing unit, consisting of a host processor and main memory or a plurality of such, works with a plurality of data communications processors which relieve the main burden of the host processor in terms of regulating, routing and controlling the interchange of digital data messages within the system. In turn, each data communications processor is relieved of detailed processing burdens by connection to a basic control module having a cluster-group of front-end controllers supported by a basic control interface unit. Some of the front-end controllers handle a specific protocol and line discipline to or from remote peripheral terminals.

Each data communications processor provides four cluster interface hubs through each of which it manages a plurality of Adapter Cluster Modules which are essentially groups of line adapters which interface telephone transmission lines to remote terminals or stations. In addition, one or more of the interface hubs of the data communications processor may connect to a basic control module which holds up to four front-end controllers for specialized data transfer activities. The data communication processor (through the basic control interface unit) may then interface a mix of front-end controllers used for: high speed wide band transmission (designated as Broad Band Controller); handling low to medium speed transmissions and called Adapter Cluster Module Controller; a Data Comm Disk Controller (DCDC) for temporary storage or tanking of messages in disk files; and a Store-to-Store Controller (SSC) for relocating data and instructions among the memory resources. A "command block" of control data and message data is provided in memory resources for each of the front-end controllers whereby, stored in memory space, there resides: a Data Comm Command Word (DCCW); a Data Comm Address Word (DCAW) and a Data Comm Result Word (DCRW)—this data is called a "command block" and is initiated by the data communications processor which provides an address pointer to each front-end controller which tells the front-end controller where to find the command-instruction data and control data which it will use; in addition, the Command Block provides memory space for message data. The data communications processor uses these command blocks to control the source, destination, receipt, timing and transmission of digital data messages being sent between source and destination points within the system, but leaves the execution of the data transfer operation to the specific front-end controller involved.

A singular feature involved is the relationship between the main host computer system and the data communication subsystem, wherein the data communications processor of a subsystem can sense a failure or a halt-load condition of the main host processor. In so doing it will permit the data communication subsystem to operate in the "autonomous" or continuous operation mode, independent of the main host processor. During this mode of operation, data which would normally be sent to the main host system would be "tanked" into a disk file memory until such time as the main host system is "on-line" again.

Upon resumption of normal activity on the part of the main host system, this condition will be sensed by the data communications processor which will then initiate normal inter-communicating relationships between the data communication subsystem and the main host system.

Thus, the improved data communication subsystem may be seen to consist of the following elements:
  (a) a data communications processor (DCP);
  (b) a local "autonomous" memory (may also be called autonomous data communications memory) which is used in the autonomous configuration;
  (c) non-automomous memory which is normally the main host memory used in the non-automomous configuration;
  (d) local internal memory (this is a memory internal to the data communications processor which may be enhanced by add-on memory modules and which serves to provide the programs and routines necessary for operation of a data communications processor without the data communications processor having to go through the delays of accessing the main host memory);
  (e) the basic control module. This consists of a basic control interface unit and up to four front-end controllers. The basic control interface unit also provides connections to data communications processors, to autonomous memory, to main memory or other memory resources which may be available.

Under normal conditions when the main host system is operating on-line, the data communications subsystem is said to operate in the "non-autonomous" mode.

In the automomous configuration, when the main host system is halted or down, the data communication subsystem will operate in an "autonomous" self-operating mode whereby incoming messages from peripherals are "tanked" into disk files until the main system is "on-line" again; while outgoing messages stored in autonomous memory (or on disk files) continue to be sent to peripherals by the data communications subsystem. An individual local power supply is provided to power this system independently of the main host system. In the "autonomous" mode, the data communication subsystem has the capability of tanking and de-tanking data on to the disk files provided.

In the present system, the concept of "data communications memory" refers to any memory resource having data transfer commands and control data which the data communication subsystem can access in any mode. These memory resources may be in the main host system, in the autonomous memory.

The basic control module provides the termination equipment for data transmission lines which connect to peripheral terminal units. The basic control module may be described as consisting of (a) a basic control interface unit, (b) front-end controllers and (c) connections to peripherals via transmission lines. The front-end controllers may include any mix of:
  (i) broad band controller (BBC);
  (ii) adapter cluster module controller (ACM) (iii) data comm to disk controller (DCDC); (iv) store-tostore controller (SSC). This may also be called a memory transfer controller.

The basic control interface unit serves as a nexus of the data communication subsystem. It provides direct memory access to a specially dedicated autonomous data communications memory. It may also be configured to provide direct memory access to the main host memory. Further, the basic control interface unit provides for priority selection for each of the front-end controllers attached to the basic control interface unit. It also provides for fail-soft configurations whereby two data communications processors may be interconnected through two or more basic control interace units so that if a data communications processor which controls a set of front-end controllers should fail, then its activities would be taken over by an adjoining data communications processor which maintains connections to the basic control interface unit which was normally handled by the failed data communications processor.

The various modules used in the Data Communications Subsystem and their relationship to the main host system may be configured in at least three basic formats:
 (A) Non-autonomous configuration
 (B) Autonomous configuration
 (C) Fail-soft configuration (This applies to both non-autonomous and autonomous configurations)

(A) NON-AUTONOMOUS CONFIGURATION

In the "non-autonomous" configuration, the system main memory is used for storage of command blocks and data areas. The front-end controllers access the main memory through the basic control interface unit, and the data communications processor accesses memory through its own memory bus. The data communications processor can, in addition, have internal (or both internal and external) local memory, which can be used only for the storage of data communications processor (DCP) code. In this configuration the local memory is for the use of the data communications processor and is not accessible by the front-end controller.

Only the front-end controllers known as broadband controller (BBC) and the adapter cluster module controllers can be used in the non-autonomous configuration.

The previously mentioned front-end controllers known as the data communications disk controller (DCDC) and the store-to-store controller (SSC) are only used for and are compatible with the "autonomous" configuration of the subsystem.

(B) AUTONOMOUS CONFIGURATION

Autonomous configurations are those which include an "autonomous memory" as a local modular unit for the storage of command blocks and data areas. In this configuration, both the data communications processor and the front-end controllers access autonomous memory through the basic control interface unit. The data communications processor has an interface path, called the local memory interface, which is connected to the basic control interface unit in order to provide a communications path to autonomous memory for the data communications processor.

In the autonomous configuration of a subsystem, all types of the front-end controllers previously mentioned can be used in these autonomous subsystems.

In the autonomous configuration of the subsystem, the data communications processor must have at least one store-to-store controller (SSC). In addition, each data communications processor may have one or more data comm disk controls (DCDC's).

(C) FAIL-SOFT CONFIGURATION

The fail-soft configuration can be used in conjunction with the non-autonomous subsystem configuration or the autonomous subsystem configuration. The fail-soft configuration is a condition of "exchange" where redundancy is used to provide a takeover by one data communication processor in case of failure of another data communications processor.

The major aspect of the fail-soft configuration is that all of the basic control interface units are visible to two DCP's. Thus, two data communications processors (DCP's) would share four basic control interface units and their associated front-end controllers. Each data communications processor has a hardware cluster mask which prevents both data communications processors from being enable to the same front-end controller at the same time. If one DCP is taken off-line, the cluster mask of the other will be changed to enable it to handle all the front-end controllers. A particular basic control interface unit must be connected (FIG. 7) via the same cluster interface number to both the data communications processors, for example, via cluster interface $20_2$ on DCP $20_A$ and cluster interface number $20_2$ on DCP $20_B$.

The major configuration of importance in the enhanced data communications subsystem is the "autonomous" configuration. Here, we use the autonomous memory, the data communications processor, the basic control interface unit with the four front-end controllers including the data communication disk controller and the store-to-store controller.

The data communications disk controller (DCDC) provides the function of storing all the input messages (which have come in from remote peripherals) and which temporarily resided in the "autonomous" memory. Normally, the data communications processor will provide an address to the store-to-store controller to take these input messages from the autonomous memory to main memory without any further burden to the data communications processor.

However, should the main system be halted or go "down" this will be noted by the data communications processor and the data communications processor will initiate the autonomous mode whereby it knows that the main host system is halted but that the message data is being accumulated on disk file—and when the main host system is operative and on-line again, the data communications processor will notify the main system that it should retrieve the message data at certain addresses on the disk file and transfer this data to the main host memory.

In the autonomous configuration, both the data communications processor and each of the front-end controllers can access the autonomous memory through the basic control interface unit.

In this respect the data communications processor has a special interface path (called the local memory interface) which is connected to the basic control interface unit and which provides for a communications path to the autonomous memory for the data communications processor.

In the autonomous configuration, there will always be at least one store-to-store controller (SSC) for use of the data communications processor so that the data communications processor can provide (to the store-tostore controller) the pointer addresses of commands whereby the store-to-store controller can transfer accumulated messages taken from the autonomous memory and transfer them to the main host memory and vice versa without tying up the data communications processor.

In the "autonomous configuration" and in the normal operating situation when the main system is on-line (non-autonomous mode) and operating, input messages will be transferred from remote peripherals to the front-end controllers and placed in the autonomous memory. This will occur because of initialization of the front-end controllers by the data communications processor.

The accumulated input messages in the autonomous memory will be continuously duplicated on disk files controlled by the data comm disk file controller which has been initialized by the data communications processor.

Input messages in the autonomous memory will, from time to time, be transferred from the autonomous memory over to the main host memory by means of the store-to-store controller which is initialized by the data communications processor, after which the store-to-store controller can do its data transfer operations without further interruption to the data communications processor, thus freeing the data communications processor for other operations.

The data communications processor is originally initialized by the main host system, however, the data communications processor code and operating routines may be derived from one of two sources: (a) the main host memory may serve as a storage repository for data communications processor routines; or (b) a local internal memory within the data communications processor may serve as a storage repository for data communications processor routines. Needless to say, the use of an internal local memory within the data communications processor saves added access time which would be required if the data communications processor had to acquire its instruction routines from main host memory.

The autonomous configuration can operate even when the main host system is halted or "down". In this case, the data communications processor senses the halt in the main host system. The data communications processor will then build a quantity of data which identifies those areas of message data which are accmulating on the desk files and which will have to be transferred later to the main memory. After the main system is on-line again, the data communications processor will notify the main host system of addresses of message data on the desk file which should be transferred to main memory, and the main memory and the main host system will then access the required data from the disk file and place it into main memory.

An input message from a remote terminal into the data communications system may be also in the nature of an inquiry which will require a output message from the main system which is conveyed as an answer back to the remote peripheral.

The inquiry message when presented to the main host system via the data communications subsystem will normally be transferred to the autonomous memory. This would be done by the data communications processor providing an address pointer relating to instructions to the store-to-store controller in which the store-to-store controller would take message data from main memory and transfer it to autonomous memory. Then on a later instruction cycle this data (in autonomous memory) would be transferred to the appropriate front-end controller which would execute transfer operation of the message data out to the appropriately addressed peripheral.

Once the message data of the output message resides in the autonomous memory, it would not matter whether the main host system was halted, since the data communications subsystem can continue its operation to complete data transfer operations to peripherals even though the main host system is temporarily down.

A unique feature of the embodiment of the Data Communications Subsystem as described in this application is the inclusion of a front-end controller-processor known as an Adapter Cluster Module which provides a new concept for handling groups of line adapters connected to remote peripheral terminals on low/medium speed communication lines. The improved embodiment of the Adapter Cluster Module described herein provides a basic front-end controller-processor having a number of unique features which handle data transfer operations on the low/medium speed transmission lines so as to handle all of the idiosyncracies of the remote terminals and their associated line adapters without interference and tying up of the Data Communications Processor of the subsystem. For example, the various line disciplines and different Baud timing rates of the remote terminals are provided for by the improved Adapter Cluster Module. Further, data from the remote terminals, which is received on a serial bit by bit basis is accumulated in a UART/USART until a "byte" is formed which is then sent to a holding register and then sent to a dedicated portion of scratchpad memory until the accumulation of a complete message block is formed. It is only then, when the complete message block is formed, that the Adapter Cluster Module will interrupt the Data Communications Processor for a block of data. This data may later be transferred (by the DCP) to the main memory of the host computer system for main memory storage or for later usage and transmission to some other terminal.

The improved Adapter Cluster Module thus provides a memory for storage of data transfer program routines, a temporary scratchpad memory having dedicated storage areas for each line adapter and its associated remote terminal, register means for addressing specifically selected line adapters and also for addressing specific memory areas of the Data Communications Memory, registers for temporarily holding data to be transferred, in addition to processing means for selecting data to be transferred from a first or source position to a second or destination position.

The data communications subsystem described herein above is further enhanced by an improved Adapter Cluster Module which is summarized as follows:

An improved Adapter Cluster Module for use as a front-end controller in a Data Communications subsystem is organized to handle a plurality of or up to eight communication lines which connect to remote terminals. The improved Adapter Cluster Module, part of a group of front-end controllers, connects through a Basic Control Interface to a Data Communications Processor which is part of and supportive of a system involving a host processor and main memory which handles a Data Communications network.

The improved Adapter Cluster Module is provided with its own memory and local instructions for execution of functions involving the receipt and transmission of messages from remote terminals, the storage of such messages including the polling of remote terminals, the handling of bytes received or transmitted, and the handling of protocols involved in connection with special features of the various remote terminals, the handling of error correction, in addition to dialing, answering and disconnect functions involved with telephone lines.

The improved Adapter Cluster Module comprises: an Adapter Service Unit having a group of up to eight line adapters which connect to remote terminals, a Central Control unit for the instruction and processing logic needful to handling such messages, and a Basic Control interface for connection to local Data Comm Memory or for connection to the associated Data Communications Processor.

Internal memory within the improved Adapter Cluster Module provides micro-code instructions for handling of internal local operations which will relieve the need for interrupts requiring use of the Data Comm Processor and its Data Comm Memory, thus keeping message handling operations locally within the improved Adapter Cluster Module rather than burdening the Data Communications Processor and the host processor and its main memory or the Data Comm Memory.

A Command Block (CB) of control and data information is provided in Data Comm Memory for each of the front-end controllers including the improved Adapter Cluster Module. This memory stores a Data Comm Command Word (DCCW); a Data Comm Address Word (DCAW); and a Data Comm Result Word (DCRW) plus memory space for message data. Normally the Data Communications Processor would use these "command blocks" to control the source, destination, receipt, timing and transmission of the digital data messages being sent between source and destination points between the system. However, with the improved Adapter Cluster Module herein described the Adapter Cluster Module itself may access the "command block" and use it to process and handle digital data transmissions without recourse to using the Data Communications Processor itself.

DESCRIPTION OF THE DRAWINGS

FIG. 4A shows a logic diagram of the means by which a data communications processor senses a halt in the main host system.

FIG. 4B is a flow chart showing the inter-relationship between the main host system and a data communications subsystem during normal activity and during half of the main host system.

FIG. 9 shows the interface between the basic control interface unit and the broad band controller and various alternative configurations which are possible.

FIG. 10 shows the interface between the basic control interface unit and the Adapter Cluster Module and alternatively a plurality of Adapter Cluster Modules which can be used to provide data transfer on low to medium speed communication lines.

FIG. 11 is a block diagram of one configuration using the front-end controller known as the data comm disk controller.

FIG. 12A is a configuration of the data communications subsystem wherein the store-to-store controller has access to the Main Memory resource and to a local resource.

FIG. 12B is a configuration of the data communications subsystem wherein the store-to-store controller shares the Main Memory resource with the data-comm processor.

FIG. 13 is a schematic diagram of alternative methods of organization of the basic control interface unit which is used as an interface to various alternative arrangements of front-end controllers.

FIG. 16A is a block diagram of the basic control module which includes the basic control interface and connections to four front-end controllers.

FIG. 17 is a block diagram of the basic elements of the broad band controller with specific reference to the embodiment called the Broad Band Synchronous Control.

FIG. 18 is a block diagram of the Adapter Service Unit of the Adapter Cluster Module of FIG. 20A.

FIG. 20A is a block diagram of the front-end controller-processor known as the Adapter Cluster Module; FIG. 20B shows the Instruction Register Micro-Operators; FIG. 20C shows the OP codes in the A field of FIG. 20B; FIG. 20D is a schematic diagram of RAM memory illustrating how this memory is mapped.

FIG. 21A is a block diagram of the data communications processor which is used in the data communications subsystem; FIG. 21B is a simplified block diagram of FIG. 21A.

DESCRIPTION OF PREFERRED EMBODIMENT

Figure 1A:
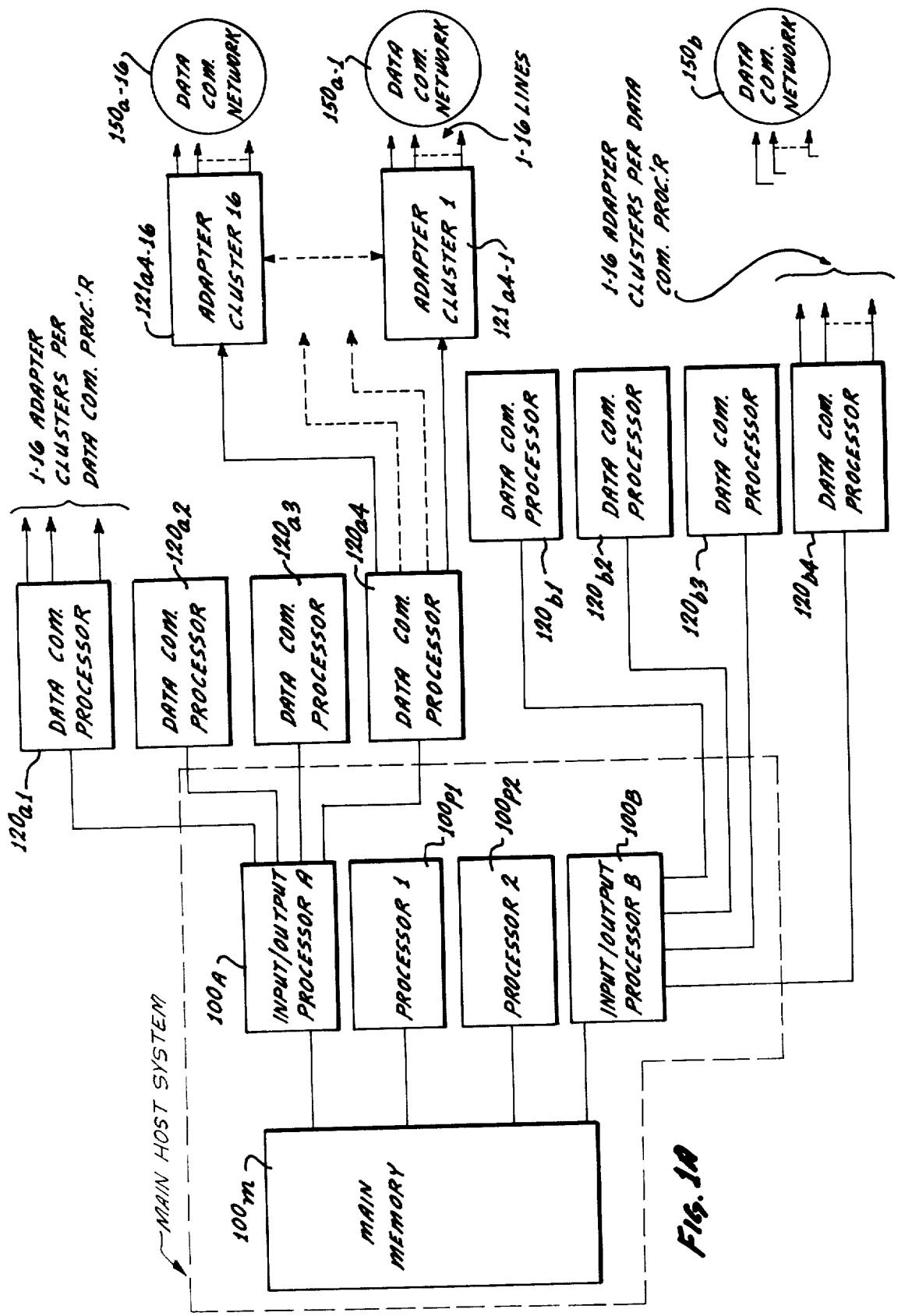
FIG. 1A is a schematic diagram of a complete system which may be used for a data communications network and which includes a Main Memory, two host processors, a plurality of data communications processors and adapter clusters for interfacing a data communications network involving a magnitude of remote terminals.

Referring to FIG. 1A there is seen the environment of the enhanced data communication subsystem. A series of main processors $100_{p1}$ and $100_{p2}$ work in conjunction with a Main Memory $100_m$ to provide the central processing unit of the system. Input/output processors $100_A$ and $100_B$ interface the Main Memory with groups of data comm processors (DCP), such as data comm processors $120_{a1}-120_{a4}$, and also with the group of data comm processors $120_{b1}-120_{b4}$. Each individual one of these data comm processors can be connected to up to 16 adapter cluster controllers and each one of which (such as $120_{a4-1}$, $120_{a4-16}$) have 16 output lines which connect to the data comm network such as $150_{a-1}$.

The relation of a main host system, such as Burroughs B6700 system, to a data communication subsystem, is described and illustrated in a reference manual entitled "Burroughs B6700 Information Processing Systems," Reference Manual 1058633, copyright 1969, 1970, 1972 and published by Burroughs Corporation, Detroit, Michigan 48232.

Figure 1B:
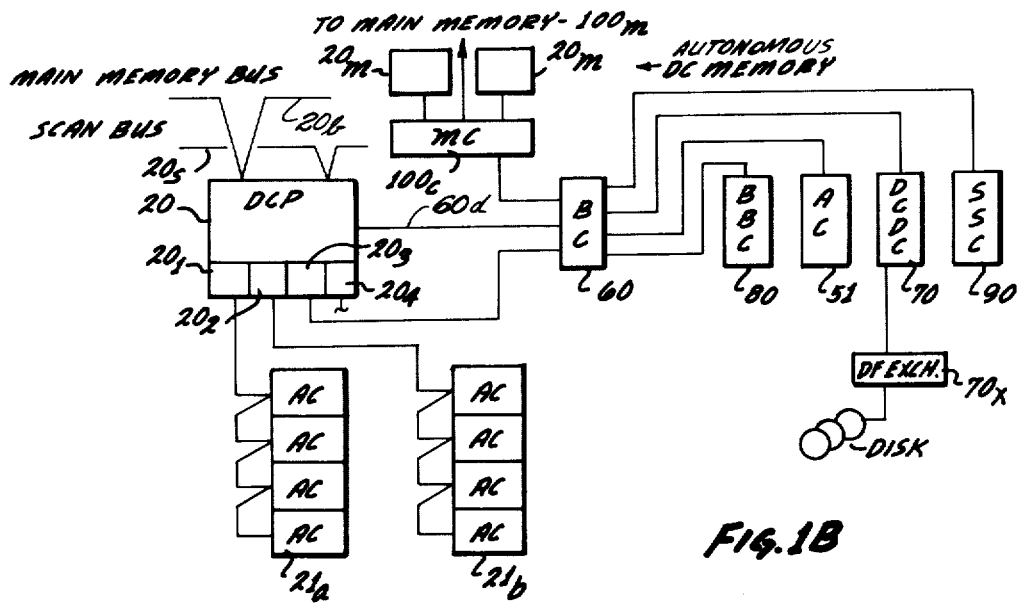
FIG. 1B is a block diagram of a data communications subsystem which may be used within the overall network.

An enhanced data comm subsystem is shown in FIG. 1B. Thus, one of the typical data comm processors which is shown in FIG. 1A can be built and enhanced into a data comm subsystem as shown in FIG 1B. Here, a data comm processor 20 is shown having cluster-interface hubs $20_1-20_4$. Each of the hubs, as for example $20_1$, $20_2$, are connected to a group of 4 adapter cluster controllers such as $21_a$ and $21_b$ of FIG. 1B. Each of the individual adapter clusters is capable of handling up to 16 lines of communication which connect to various parts of a data communications network, as shown in FIG. 1A.

The enhanced data communication subsystem is shown in FIG. 1B whereby one of the cluster interface hubs, such as $20_3$, is connected to an added specialized network of front-end controllers. The interface to the front-end controllers is a basic control interface unit 60 which interfaces a set of 4 front-end controllers designated as the Broad Band Controller 80, the Store-to-Store Controller 90, the Data Comm Disk Control 70 and a specialized Adapter Cluster Controller 51. The Data Comm Processor 20 connects to the central processing unit via a Main Memory Bus $20_b$ and a Scan Bus $20_s$.

A Memory Control $100_c$ connects to the Main Memory $100_m$. In addition, there is provided a facility for a local memory $20_m$ designated as "autonomous" memory which is used for independent operation of data transfers during periods when the main system is halted. This local memory resource is generally called DCM or Data Comm Memory for certain configurations, even though in the broad sense data communications memory refers to any memory resource available to the data communications subsystem.

The data Comm Processor 20 is a small special-purpose computer which contains registers and logic in order to perform all the basic command functions associated with sending and receiving data or controlling Front-End controllers which handle the actual data transfer operations. Up to 5 data comm processors can be connected to an Input/Output processor, FIG. 1A, with each Data Comm Processor capable of accommodating from one to two hundred and fifty-six communication lines. A processor system network holding up to 8 DCP's can provide a maximum system with the ability to serve 2,048 data communication lines to peripheral units.

Each communication channel requires an adapter which provides the logic to interface with a Data Set or to connect directly to a communication line.

A basic data communications processor and associated adapters have been described in U.S. Pat. No. 3,618,037 which issued Nov. 2, 1971, and which was also assigned to the assignee of the herein-described system.

The enhanced data communications subsystem provides innovative hardware and procedural combinations which are compatible with presently existing data comm subsystems and central processing units available in the art. The enhancements consist of a much larger and more readily available "data comm memory" which improves overall system performance by providing direct memory access (DMA) at the message level and which also provides self-arranging configurations with a continuous operation feature. Besides providing the expanded data comm memory feature, the enhanced data comm subsystem provides high-speed, computer-to-computer interface capability by means of Bi-sync and BDLC (Burroughs Data Link Control) procedures, plus data comm to disk tanking of messages and a back-up storage for this system, plus optimization of message handling for the terminal equipment connected to the system. Thus, in FIG. 1B there is provided a Data Comm Memory (autonomous memory) using core and designated $20_m$; combined with 4 front-end controllers and an interface unit (BC) which can be housed in a single cabinet having its own power supply. In FIG. 1B the basic control interface unit can provide memory access to Main Memory $100_m$ or to a local autonomous Data Comm Memory $20_m$.

As seen in FIG. 1B the basic control interface unit (BC) 60 provides the basic interface exchange function for the Broad Band Controller (BBC) 80, the Adapter/Cluster Controller 51, the Data Comm Disk Controller (DCDC) 70, and the Store-to-Store Controller (SSC) 90. Thus, the basic control interface unit provides configurations for communication with the autonomous Data Comm Memory $20_m$, the Main Memory $100_m$ and the Data Comm Processor 20, or a plurality of data communications processors.

Control information is exchanged between the Data Comm Processor 20 and the Front-End Controllers by means of a DCP/cluster interface hub $20_3$ (FIG. 1B). Command and data blocks are read or written either from or to the Data Comm Memory $20_m$ via a standard memory interface. The Data Comm Processor 20 will also be seen in the configuration of FIG. 5 to have direct connection to the system Main Memory $100_m$ by means of the Main Memory bus $20_b$ and to the host system via the Scan Bus $20_s$.

Briefly, the front-end controllers serve functions as follows: The Basic Control Module of FIG. 16A is a unit designed to allow up to 4 front-end controllers of any mix to be controlled by at least two Data C Communications Processors (FIG. 7) such as DCP $20_A$, $20_B$. The basic control interface unit 60 allows these front-end controllers to share one memory interface. The basic control interface unit 60 also has the function of establishing the priority for access-requesting front-end controllers and to forward the request to the memory resource. This is done by positional locations $67_a$, $67_b$, $67_c$, $67_d$, FIG. 16A, or by jumpers which can be changed in the field.

The Broad Band Controller 80 provides a wide band or broad band interface to the data comm subsystems of different types of existing central processing units. The purpose of the Broad Band Controller is to provide a means of high speed transmission without unduly overloading the data comm processor and other system components. Its general use is in network communication between host computers or for bulk message transfers at high transmission rates.

The Adapter Cluster Module Controller unit 51 provides the data comm subsystem with low and medium speed communications over the common carrier's voice-grade networks. Transfer of information between the Adapter Cluster Controller 51 and the "data comm memory" takes place at the message level rather than by mere transfer of a character or a word. Thus, by means of message optimization for each of the terminals in the network, there can be a more optimal handling of: the ready status, the data transmission and reception, the answer/call, and the disconnect functions by the minimization of turn around delays and the minimization of data comm processor overhead. The Adapter Cluster Controller 51 allows connection of up to 8 low/medium-speed, full duplex lines. Line adapters are used to provide connectivity from the A C Controller 51 to the interface units for various of the terminals in the data comm subsystem. The poll/select (POLL/SEL), the remote job entry (RJE) and the Burroughs Data Link Control (BDLC) line procedures are supported over lines of 1,200 to 9,600 bits per second (BPS) line speeds for a variety of terminal units in this system.

Figure 14:
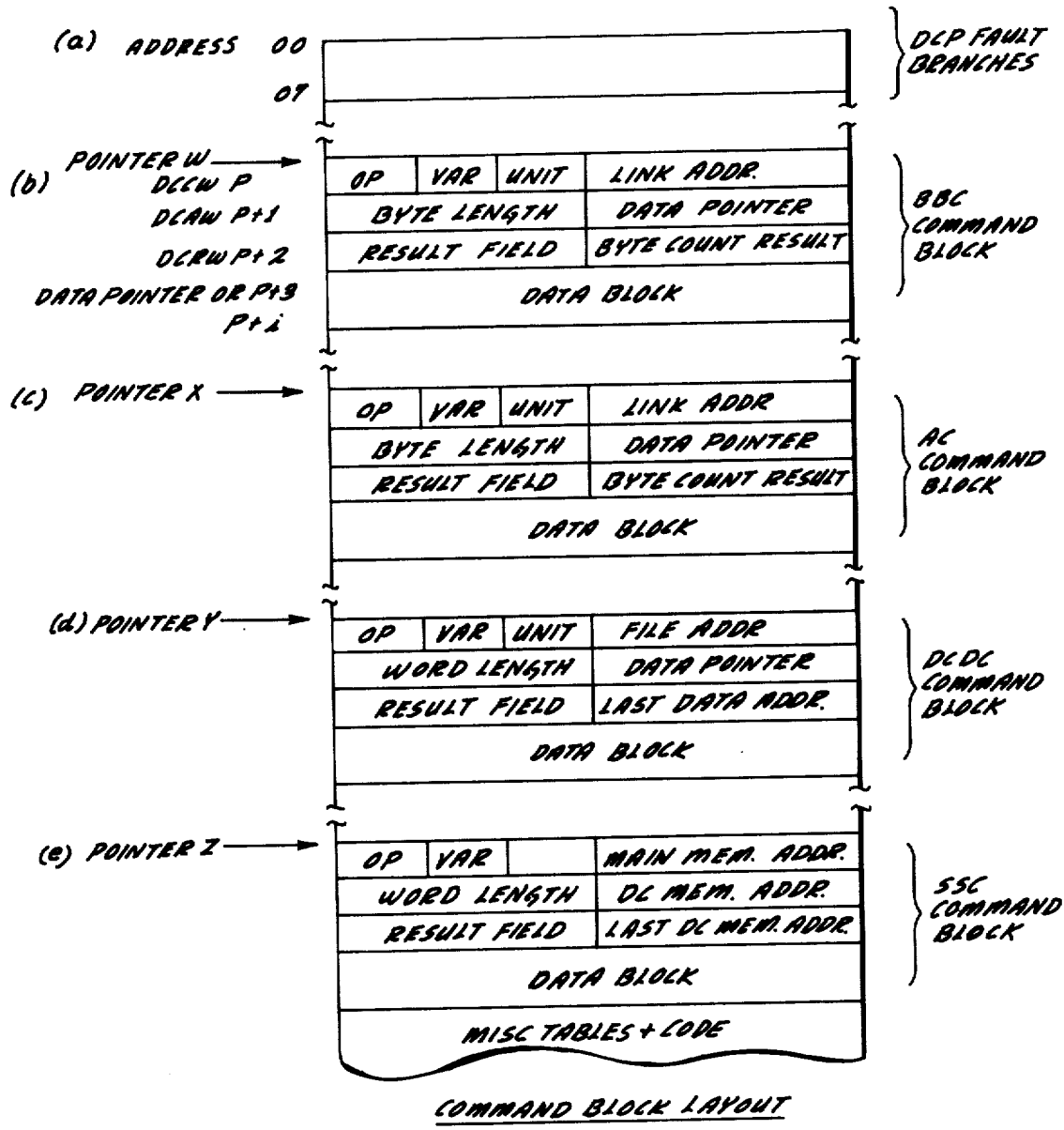
FIG. 14 is a schematic drawing of the Command Block layout which provides, in memory-space, commands and controls for each of the front-end controllers.

The Data Comm Disk Controller 70 provides the function of controlling the storing and retrieval of data communication information on disk. The Data Comm Processor (DCP) initiates data transfer either to or from the disk by taking an area in the memory resource (which may be Main Memory $100_m$ or autonomous Data Comm Memory $20_m$, FIGS. 1B 4, 5) consisting of a Data Comm Command Word (DCCW), an address word (DCAW) and also a result word (DCRW) in addition to a "data block," (FIG. 14). The Data Comm Processor 20 constructs a 20-bit address which points to the Data Comm Command Word in the memory. Then the Data Comm Processor 20 (via the basic control interface 60) sends a 20-bit memory address of the Data Comm Command Word. This is received by the Data Comm Disk Controller 70 which begins semi-autonomous operation. The Data Comm Disk Controller 70 will read the Data Comm Command Word from memory. The Data Comm Command Word contains an op-code (OP), a varient field, and a file address of the disk to be accessed. The next word in memory is the DCAW which contains the length of the operation, the number of words to be transferred and, optionally, a 20-bit address pointing to the beginning of the data area. After input-output operations are initiated, the Data Comm Disk Controller 70 begins to transfer information from memory to the disk or from disk to memory. After completion of this data transfer, a "result word" is formed by the Data Comm Disk Controller 70 and written into memory.

The Store-to-Store Controller (SSC) 90 is used by the DCP 20 to transfer blocks of data (one word at a time) to or from the Data Comm Memory $20_m$ and to or from the system Main Memory $100_m$. This frees the data comm processor to perform other operations. When the SSC 90 completes the operation, it stores a result word in the "data comm memory" and also notifies the DCP 20 that the operation is completed.

Figure 2:
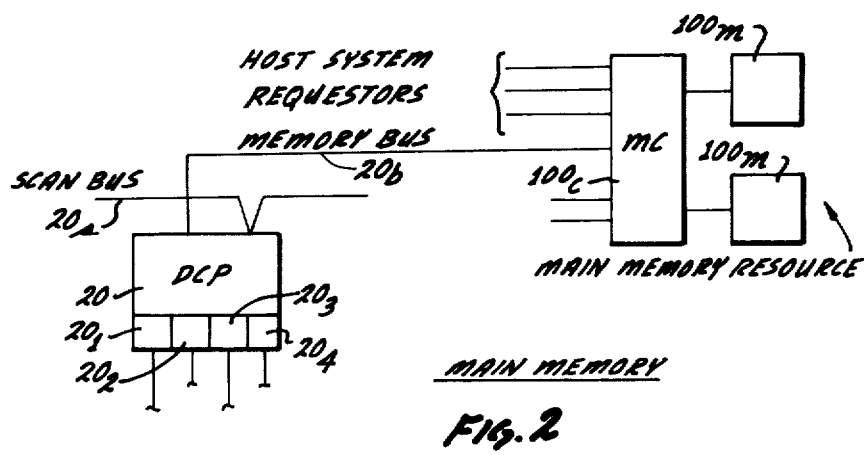
FIG. 2 is a block diagram showing a data communications processor connected to Main Memory.

The basic concept of "data communication memory" involved here broadly involves the concept that specialized instructions, data and information relating to data transfer operations are stored in a portion of memory resource space which will be readily available to the data communications subsystem to facilitate data transfer operations. This memory space, dedicated to data transfer operations, may be placed in the Main Memory $100_m$ (such as seen in FIGS. 1B and 2) or the memory space for data transfer operations may be placed in a local memory resource shown in FIG. 4 and which may be designated as "autonomous" or Data Comm Memory $20_m$ in that this local memory resource may be used as a data communications memory for continuous data transfer operations even though the main host system is halted. A local independent power supply P67 shown in FIG. 4 is an independent source of power for the data communications subsystem and provides local power to the Data Communications Processor 20, the basic control interface 60, to its appended Front-End Controllers, and also to the "autonomous" memory $20_m$ which is also called "Data Communications Memory" since the configuration of FIG. 4 provides the autonomous memory $20_m$ dedicated for continuous data transfer operations when the main system is halted or down.

In FIG. 2 the Data Comm Processor 20 is bussed directly into the Main Memory $100_m$ through the Memory Controller $100_c$. The Scan Bus $20_s$ connects the main system to the Data Processor 20.

Figure 3:
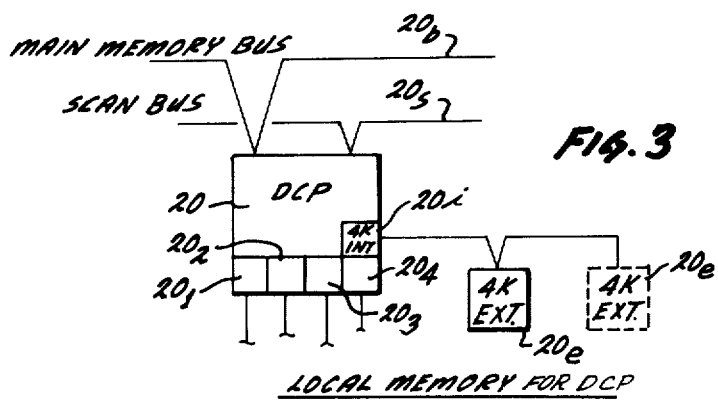
FIG. 3 is a block diagram showing expanded local internal memory for a data communications processor.

In FIG. 3, the Data Comm Processor 20 is seen to have a 4K internal memory $20_i$, which internal memory is enhanced by added local memory having external memory units of 4K bytes and designated as $20_e$. This DCP local internal memory is used to store DCP codes needed for DCP operation.

Figure 4:
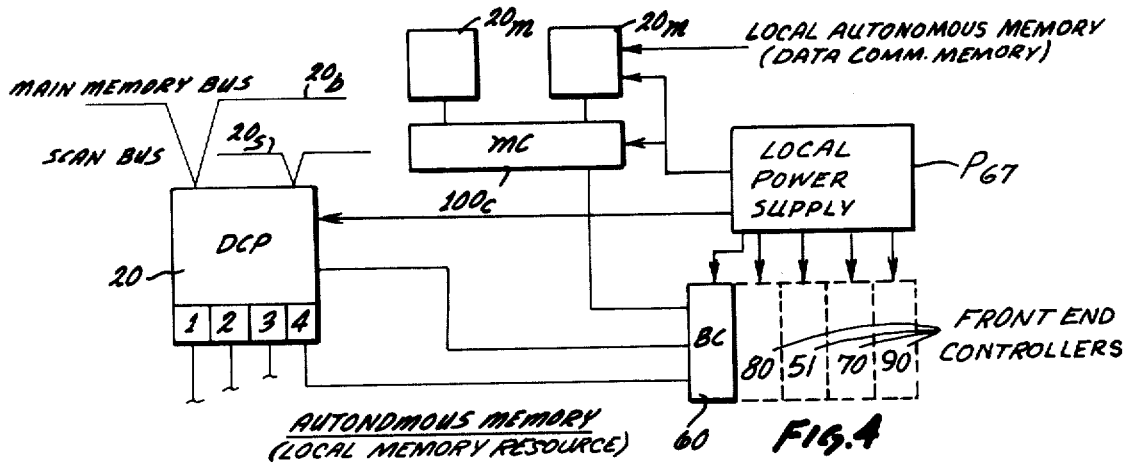
FIG. 4 shows a block diagram of the data communications processor using an autonomous local memory (Data Communications Memory) and a group of front-end controllers.

In FIG. 4 there is shown the use of "autonomous" Data Comm Memory whereby the local memory resource, consisting of the memory controller $100_c$ and the local storage of core $20_m$, is connected to the basic control interface 60, and which connects to the Data Comm Processor 20. Thus, the autonomous Data Comm Memory resource is provided to the Data Comm Processor 20 by means of the basic control interface 60.

The work "autonomous" is applied to the Data Comm Memory $20_m$ to indicate that when the main host computer is halted, the data communication subsystem can continue data transfer operations by itself, i.e., autonomously and continuously by using Data Comm Memory $20_m$ and the disk file resource.

Figure 5:
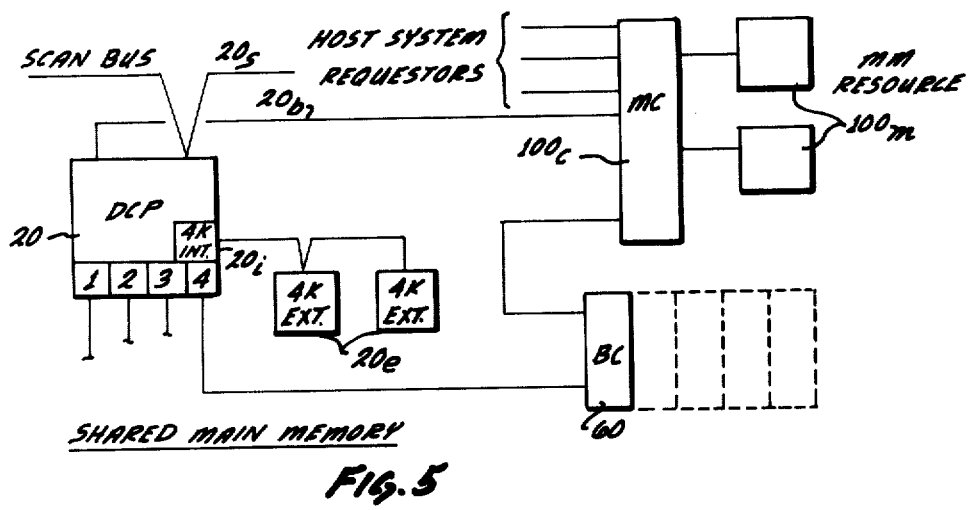
FIG. 5 shows a data-comm processor configuration wherein the data-comm processor and front-end controllers share the Main Memory resource.

FIG. 5 illustrates a configuration permitting the sharing of main memory $100_m$. Here the basic control interface 60 has its own private line to the main memory resource $100_m$ via the Memory Controller $100_c$. Likewise, the Data Comm Processor 20 has its own line $20_b$ to the main memory resource $100_m$. Thus the main memory is shared by the Data Communications Processor 20 and the basic control interface 60 which services the front-end controllers.

Figure 6:
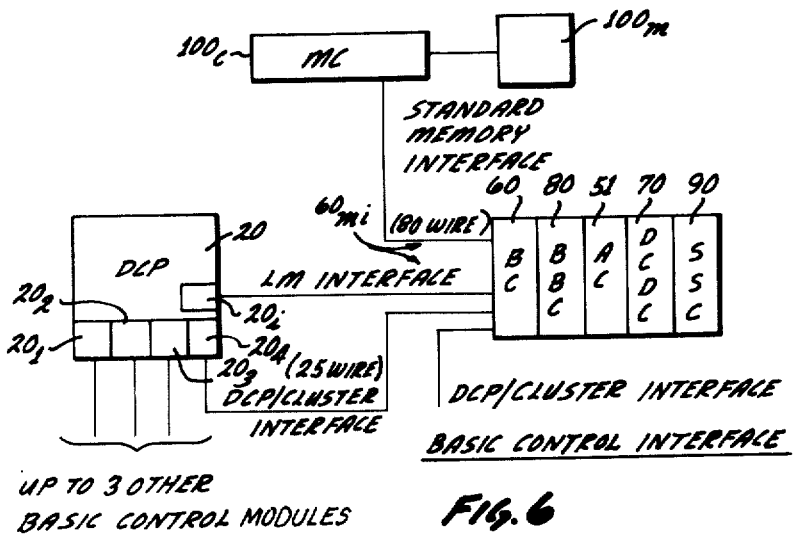
FIG. 6 shows a configuration wherein the data-comm processor uses one of its hubs to interface a basic control interface unit to a series of front-end controllers, which controllers have a channel, via the basic control interface unit, to the Main Memory of the system.

The basic control interface 60 is a key element in this system for handling the front-end controllers. The basic control interface 60 is the interface exchange element between the Data Comm Processor 20, the "data comm memory" (which may include Data Comm Memory $20_m$, Main Memory $100_m$, and the disk file controller 70 with its disk storage and the four front-end control modules. The DCP/cluster interface hub such as $20_4$ (FIG. 6) allows the receipt of a signal designated as CAN (cluster attention needed-interrupt). The DCP/cluster interface hub also provides the means for front-end controller (FEC) initiation by one or two DCP's and allows the receipt of the CAN response upon command completion by the FEC. The standard memory interface $68_{mi}$, shown in FIG. 6, provides a standard "48 data bit, 3 tag bit, 1 parity bit, 20 address bit" memory interface capability for the basic control interface 60. Thus, this allows memory access to autonomous memory $20_m$ (FIG. 4, autonomous configuration) or to Main Memory $100_m$ (non-autonomous configuration). The standard interface is multiplexed/demultiplexed for up to four controls by the basic control interface 60. As seen in FIGS. 4 and 6, the basic control interface 60 can handle one SSC 90, one DCDC 70, one BBC 80 and one Adapter Cluster 51 (four controllers). Each hub $20_1$, $20_2$, and $20_3$ of the Data Comm Processor 20 could support a separate basic control interface 60 or each hub could handle up to four Adapter Cluster controllers individually.

Figure 7:
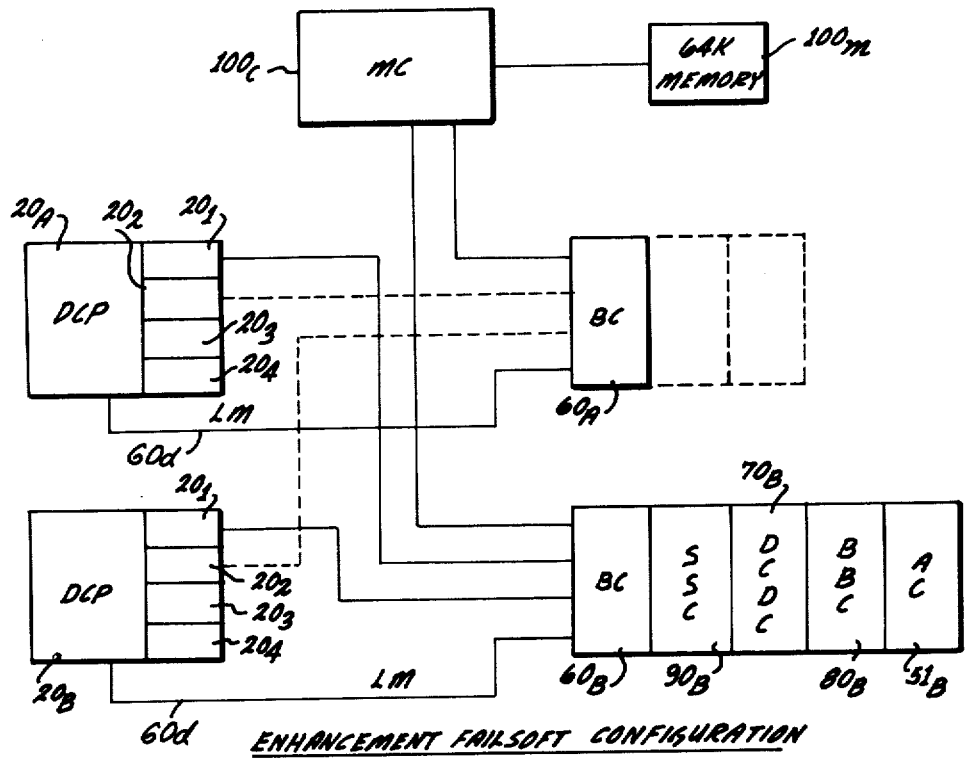
FIG. 7 is a block diagram of a fail-soft configuration wherein two data-comm processors are used with two sets of front-end controllers to provide a configuration permitting data transfer operations even though one of the data-comm processors should become inoperative.

In addition to allowing the data communications processor interrogation of the control register functions/states through the DCP/cluster interface, the basic control interface 60 also provides a fail-soft interface capability by allowing connection to two DCP's and a common memory resource $100_m$ as seen in FIG. 7. The code and the data areas of the memory (in this case $100_m$) are shared by both Data Comm Processors $20_A$ and $20_B$. In FIG. 7 the memory address of the command block (FIG. 14, described hereinafter) is transferred from the Data Comm Processor, such as $20_A$, to the specified front-end controller via the DCP/cluster interface hub such as $20_1$. Command words (within this command block previously built by the Data Comm Processor) are fetched by the front-end controller from the memory resource $100_m$ via the standard memory interface.

In contention for memory access by various front-end controllers, priority is handled by the basic control interface 60. With a plurality of front-end controllers, as in FIG. 16A, normally controller #0 ($67_a$) has the highest priority and controller #3 ($67_d$) would have the lowest priority. However, each of the four possible front-end controller locations might be assigned priority via jumper option.

Generally the setting of the various front-end controls requires establishing priorities such that the highest priority (in the basic control module) is given to the Broad Band Controller 80 and the Adapter Cluster Controller 80 and the Adapter Cluster Controller 51—while the lowest priority would go to the Data Comm Disk Controller 70 and to the Store-to-Store Controller 90.

Figure 8:
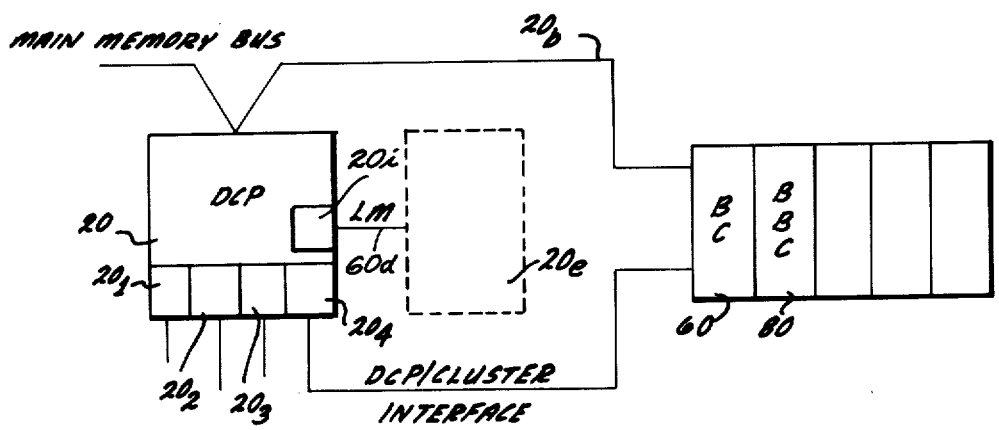
FIG. 8 shows a data-comm processor configuration where there is provided an expanded local memory for a data communications processor in combination with a series of front-end controllers connected to one hub of the data communications processor.

When the basic control interface unit 60 is connected as shown in FIG. 8, then the basic control allows the Broad Band Controller 80 access to main memory via the main memory bus $20_b$. As seen in FIG. 8, the local DCP internal memory, as $20_i$ and $20_e$, is associated with the Data Comm Processor 20. All running code access to the Main Memory is handled by the Data Comm Processor 20. The local memory $20_i$ (FIG. 8) may be extended to a full 16K words with the connection of the extended local memory $20_e$. The data comm processor-local memory interface $60_d$(LM) is seen in FIGS. 7, 8, and discussed hereinafter in conjunction with the basic control interface 60.

The interfaces and configurations as between the basic control interface 60 and the Broad Band Controller 80 are shown in FIG. 9. The Broad Band Controller 80 provides the data comm subsystem with the capability to communicate with other systems or the common carriers wide band interface by using either binary synchronous Bi-Sync or by using Burroughs Data Link Control (BDLC) line procedures. Various standard sets having line speeds ranging from 19.2K up to 1.344M bits per second can be handled by the data comm subsystem.

In order to allow complete message transmission and reception without interrupting the Data Comm Processor 20, a linking mechanism in the command word retrieves the next command block from the DC (Data Comm) Memory resource and the subsequent data transfer operation begins. Completion status of an operation for each linked command is sent to the Data Comm Processor 20, dependent on variant conditions in the command block and exception conditions in the result status. Each bi-synchronous controller (BBC 80) or each BDLC (BBC 80) controller provides the data comm subsystem with one high-speed full duplex line as per FIG. 9.

Referring to FIG. 10 there is seen the interface between the basic control interface unit 60 and various configurations which use the Adapter Cluster 51. As seen in FIG. 10 an Adapter Cluster 51 can provide eight low to medium speed lines or can be configured to use two adapter clusters for 16 lines or configured with four adapter clusters to provide 32 low-medium speed lines.

FIG. 11 shows the interface between the basic control interface unit 60 and the Data Comm Disk Control 70. The Data Comm Disk Control 70 provides the data comm subsystem with a "disk tanking" facility for augmenting the data comm memory resources and allowing the receipt and accumulation of requests and messages in the event of a main host system failure. Additionally, the Data Comm Disk Control 70 will alleviate the requirement to utilize only the Main Memory resource for any backed-up output messages. A fail-soft configuration is provided whereby the interface to the disk file system has two ports to provide fail-soft configuration in the event that a failure occurs in one of the disk file systems. Thus, the Data Comm Disk Control 70 interfaces with two disk file exchanges $70_{X1}$ and $70_{X2}$. These disk file exchanges are controlled by the disk file control $70_c$ which interfaces with the main processor system. The disk file exchanges interface with two storage selectors $70_{e1}$, $70_{e2}$, which connect to disk file storage facilities $70_{d1}$ and $70_{d2}$. The fail-soft capability allows the data comm to disk tanking to take place over an alternate path to the disk subsystem in the event of an exchange failure.

The Store-to-Store Controller 90 provides the data comm subsystem with a direct memory transfer capability between the autonomous Data Comm Memory $20_m$, and the Main Memory $100_m$. It can operate asynchronously from the main system, and the Store-to-Store Controller 90 is used in autonomous data comm subsystems in order to augment data block transfers to host system memory. Since data integrity has been established in the Data Comm Memory $20_m$, then initiation of subsequent block transfers to Main Memory $100_m$ allows the Data Comm Processor 20 to perform other operations. For example, the Data Comm Processor 20 may perform a block transfer retry, dependent on any Store-to-Store Controller 90 "exception-conditions" in the Data Comm Memory.

Memory control hub limitations may preclude separate main memory bus connections for both the Data Comm Processor and the Store-to-Store Controller in autonomous configurations. As seen in FIG. 12B, the Store-to-Store Controller 90 may share the Data Comm Processor memory bus $20_b$ in order to share transfers of data between the Data Comm Memory $20_m$ and the Main Memory $100_m$. FIG. 12A shows the configuration where the Store-to-Store Controller 90 has a separate channel to the Main Memory $100_m$ rather than sharing the data comm processor bus $20_b$ as was seen in FIG. 12B.

FIG. 13 shows a typical example of a modular configuration which can be used with the enhanced data comm subsystem. As seen in FIG. 13 a basic control interface unit 60 provides the interface to a first module containing a Broad Band Controller, an Adapter Cluster Controller, a Data Comm Disk Controller and a Store-to-Store Controller to provide, for example, nine lines.

Alternatively, the basic control interface unit may provide an interface for a second module of two Broad Band Controllers 80 and two Adapter Clusters 51 to provide a total of 18 lines. Or alternatively, the Basic Control 60 may provide an interface to a module composed of four Adapter Clusters 51 in order to provide 32 low/medium speed lines.

FIG. 14 indicates a portion of the "data comm memory" which is used as a command block.

This memory space is laid out such that the Data Comm Processor 20 can supply a 20-bit address pointer, such as pointer W, pointer X, pointer Y, and pointer Z, to access particularized command block areas respectively for the Broad Band Controller command block, for the Adapter Cluster command block, for the Data Comm Disk Controller command block, and for the Store-to-Store Controller command block.

Figure 15A:
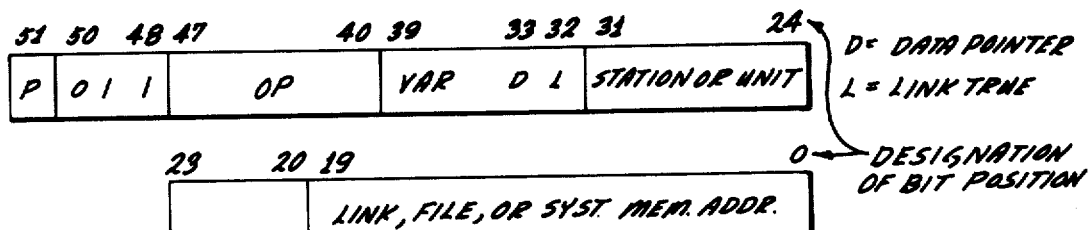
FIGS. 15A, 15B and 15C are schematic drawings of command words, address words and result words used in the data communications subsystem.
Figure 15B:
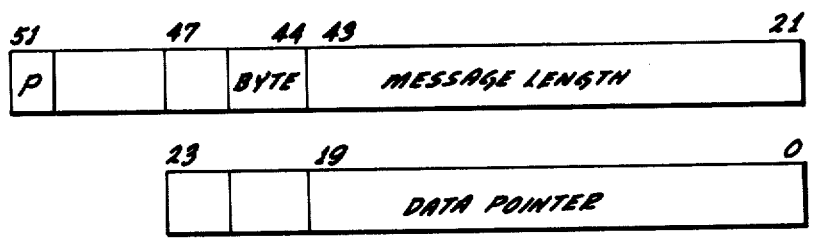
Figure 15C:
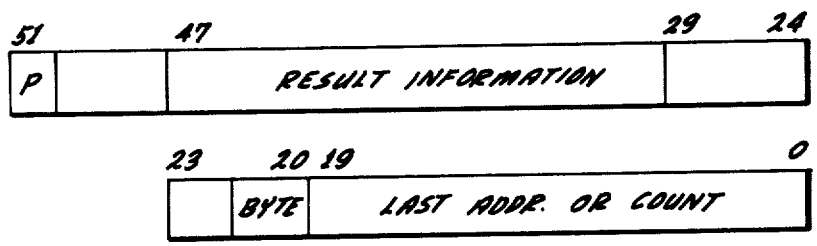

FIG. 15A shows the structure of the Data Comm Command Word (DCCW); FIG. 15B shows the Data Comm Address Word (DCAW); while FIG. 15C shows the Data Comm Result Word (DCRW).

The Data Comm Processor 20 places command blocks in a "data comm memory" resource. These command blocks are accessed by either the Broad Band Controller 80, the Adapter Cluster 51, the Data Comm Disk Controller 70 or the Store-to-Store Controller 90. Through the interfaces which are provided by the basic control interface 60, the controllers are initialized by the Data Comm Processor 20 which supplies a 20-bit address pointer through the DCP/cluster interface. The Front-End Controllers retain this pointer during execution of the command block.

Command blocks can also be linked to each other by a link address feature. This permits the Front-End Controllers (FEC) to begin execution of a subsequent command block while a result CAN (Cluster Attention Needed) interrupt is being serviced by the Data Comm Processor for the command block just completed. Thus, in addition to allowing faster turn around for command block initiation, the linking feature permits DCP/FEC simultaneous processing and reduces the controller idle time. Since a 20-bit command block address pointer is used, no absolute areas of "data comm memory" need be specified, with the exception of the fault branch address reservations for the Data Comm Processor 20.

The command block consists of three control words and a variable number of data words. The data comm words, shown in FIGS. 15A, B and C involve:

(1) Data Comm Command Word (DCCW)
(1) Data Comm Address Word (DCAW)
(1) Data Comm Result Word (DCRW)
(n) Data Words (which have a reserved portion in each command block as shown in FIG. 14).

Once the front-end control (FEC) has received the 20-bit pointer (P) through the DCP/cluster interface, the front-end control (FEC) uses P to address the data comm memory. In FIG. 14 a typical sequence would summarize the usual control operation:

1. The DCCW is read from P.
2. The DCAW is read from P plus 1.
3. The Data Transmission/reception begins at P plus 3 and continues until P plus i, to fill or exhaust the Data Block, FIG. 14.
4. The DCRW is written into P plus 2 upon completion, and a CAN interrupt is then sent to the DCP.
5. The Front-End Controller can use the Link Address as a new P to begin the execution of the next command block or to terminate the operation.

DATA COMM COMMAND WORD

The Data Comm Command Word provides each of the front-end controllers with the initial operation code and variants as can be seen in FIGS. 15A, B and C. The basic operations performed are READ (or RECEIVE), WRITE (or TRANSMIT) and TEST plus variant options for each. In addition to specifying a valid front-end controller type (BBC, AC, DCDC, or SSC) in the operations code, the Data Comm Command Word requires a TAG field equal to "3" to successfully initiate controller operation.

The address field of the Data Comm Command Word provides the controller with the following information:
1. Command Link Address (BBC or AC)
2. Disk File Address (DCDC)
3. System Memory Address (SSC).

DATA COMM ADDRESS WORD

The Data Comm Address Word is used to provide the front-end controller with data block length and location in the data comm memory as may be seen in FIG. 15B. The message length is described in terms of "words" for the Data Comm Disk Control and the Store to Store Controller. The Broad Band Controller and the Adapter Cluster message length is specified by "bytes". The data pointer portion of the Data Comm Address Word of FIG. 15B defines the beginning address of the data block and provides the option of specifying a non-contiguous data block. That is, the data block may be contiguous with the Data Comm Command Word, Data Comm Address Word and Data Comm Result Word (at P plus 3) or be located outside this memory vicinity (at the data pointer).

DATA COMM RESULT WORD

The Data Comm Result Word is used by the front-end controller to store operation result information in the "data comm memory". In addition to providing the Data Comm Processor with detailed result status, the Data Comm Result Word specified the last address of the current operation or the byte count of the data transmitted/received.

DATA COMM PROCESSOR

A diagram of one preferred embodiment of the Data Comm Processor 20 is shown in FIG. 21A. The Data Comm Processor is an auxiliary processor which performs the task of answering and terminating calls within the system, of observing formal line control procedures, of polling repetitiously and handling all the routine message formatting for the information received and for the information transmitted on the many data communication lines within the network.

The Data Comm Processor 20 has access to the system's Main Memory $100_m$ (FIG. 1A) along with the other main frame units such as the processors $100_{p1}$, $100_{p2}$ and units such as a peripheral control multiplexor (not shown). The memory allocation for a Data Comm Processor is controlled by the interaction of two programs which are used and called the Master Control Program and the DCP Programs. This interaction allows blocks of information to be exchanged. In operation, a data exchange occurs when the host Processor, as $100_{p1}$ or $100_{p2}$, initiates a DCP transaction, typically by setting an "attention needed" condition in the Data Comm Processor, and when the DCP finishes a transaction, which is typically indicated by an "interrupt" condition being set in a multiplexor.

The Data Comm Processor 20 obtains its program from the system's Main Memory $100_m$ or from an optical local memory ($20_i$, $20_e$) such as indicated in FIG. 3 or a specially dedicated local Data Comm Memory $20_m$ (FIG. 4). The use of a local memory reduces instruction fetch time and thus increases the through-put of the DCP. In another configuration, as FIG. 4, a local Data Comm Memory $20_m$ is provided to service the DCP 20 and the front-end controllers of the subsystem having a basic control interface 60. The DCM $20_m$ is called an "autonomous" memory since it can keep the subsystem operating even if the host computer is halted.

The Data Comm Processor 20 of FIG. 21A is an elementary store-to-program computer which contains a small array of inter-communicating registers (21, 22), a simple arithmetic-logical unit 26, an 8-word scratch pad memory $24_{sp}$ and an optional "local memory". This "local memory" could be the internal-external memory $20_i$-$20_e$ or the Data Comm Memory $20_m$ of FIG. 4. The instruction repertoire consists mainly of two and three address instructions which operate on 8-bit bytes in a single clock time. The byte organization fits into a basic half-word (three byte) structure which permits efficient half-word transfers.

REGISTERS

The bits of a 52-bit word ((Table I) are numbered 0 through 51 from right to left with bit 0 being the least significant bit. Bit 47 is the most significant bit of the information part of the word while bits 48, 49, and 50 are "tag" bits. Bit 51 is word parity bit, generally using odd parity.

The fields are designated such that a particular field in a register "R" is identified by using the nomenclature R[m:n], where little m denotes the starting bit position of a field extending n bits to the right.

Thus, D[6:4] would identify a four bit field of register D which consists of bits 6, 5, 4 and 3.

The 48-bit information part of the 52-bit word is divided into six 8-bit bytes. The bytes are designated 0 through 5 from left to right (however they are addressed by octal digits 1 through 6) and the tag field would be designated as byte 6.

The full word is divided into two 24-bit half-words. The L (left) half-word is comprised of bytes, 0, 1, and 2. The R (right) half-word is comprised of bytes 3, 4 and 5. The following Table I shows the bit numbering (1), the designation of fields (b), the byte designation (c) and the half-word designation (d).

TABLE I (a) Bit Designation 51 50 49 48 47 ... 0

(b) Designation of Fields

Example: D register — bits 7 6 5 4 3 2 1 0

← D[6:4] →

D[6:4] identifies the four-bit field consisting of bits 6, 5, 4, and 3.

(c) Byte Designation

47 ... 0

| 6 | 0 | 1 | 2 | 3 | 4 | 5 |

(d) Half-Word Designation

| L half-word | | | R half-word | | |
|---|---|---|---|---|---|
| 0 | 1 | 2 | 3 | 4 | 5 |

Referring to FIG. 21A there are three Adapter Interface Registers which are designated $21_A$, $21_C$ and $21_I$, each of which have a size of 8-bits. The Adapter address register, AA, contains an adapter designation. An Adapter is activately designated only during the execution of an Adapter Read, Adapter-Write or Adapter-Interrogate instruction. When the Adapter Cluster 51 (FIG. 1A) is used, then AA[7:4] contains the cluster number and AA[3:4] contains the adapter number within the cluster.

The AC register $21_C$, called the Adapter Control register, contains bits which typically describe the information on the Adapter Interface. For example, a particular code in the AC register may signify that the AI register contains a data byte whereas other codes may identify AI register contents as control information of various types.

The AI register, or Adapter Information register $21_I$, is the primary information register for the Adapter Interface; it can contain either data or control information.

There are three general purpose registers designated $22_X$, $22_Y$ and $22_D$ which are normally called the D, Y and X registers. Each register has a size of 8-bits. The D register is used as an address register when an indirect destination address is called for, otherwise its use is unrestricted. The Y register contains the indirect source address when one is called for, but the Y register is not used as an address register. When an indirect source address is used, the contents of Y register are copied in the instruction register, $IR_{23IR}$. The X register is referenced in a Branch Relative instruction, otherwise its use is unrestricted. Two Instruction Address Registers designated $22_{I1}$ and $22_{I2}$ are provided having a size of 8-bits each. These registers, labeled IA1, IA0, are concatenated to hold the instruction address. These registers either address DCP local memory $20_i$ directly or they provide the relative part of an address for the host system's main memory. The most significant bit in register IA1 determines which memory the address applies to. The least significant bit in register IA0 selects one of the two half-word instructions in a full instruction word. The two instruction registers are counted up automatically as each instruction is loaded. They are loaded by Branch Instructions and they can also be addressed like any other register. If an IA register is addressed as a destination, then a new instruction fetch occurs after the current instruction is completed.

The host system address register, HB $22_H$, has a size of 20-bits and contains the actual instruction address for instruction words in the main system's main memory $100_m$. The actual instruction address is the sum of the relative address in the IA registers and the instruction base address.

In FIG. 21A there are two full-word registers, these being the Instruction Register, $23_{IR}$, and also the Word Register, $23_W$. Each of these registers has a size of 52-bits. The instruction register holds a full instruction word containing two 24-bit instructions. It is loaded from either the DCP local memory such as $20_i$ of FIG. 3 or from the system's Main Memory $100_m$. The Word Register $23_W$ is a memory buffer register for data words. It is used for transferring full words to or from the Scratchpad Memory $24_{sp}$, the DCP local memory $20_i$ and the host system's Main Memory $100_m$ through the Main Memory Interface of FIG. 21A designated as $100_i$. The parity bit in the Word Register [51:1] is automatically generated and checked by a parity checker $23_p$.

The Instruction Register $23_{IR}$ is built to contain a full instruction word of 52-bits which is loaded in the instruction register on a fetch cycle. The instruction word contains two 24-bit instructions. An instruction word must have odd parity and the tag field must have the bit configuration IR[50:3] equal 110. If these conditions are not fulfilled, the instruction word is detected as invalid and the instructions are not executed. In the Instruction Register $23_{IR}$, there are shown several different fields designated as OP, A, B, C. The OP field contains the basic operation code. The A field may be an extension of the OP field or it may contain a register address. The B field typically contains the address of a source or it may contain a literal. The C field typically contains the address of the destination, or it may also contain a literal.

There are three memory address registers each having a size of 8-bits each. These memory address registers are labeled $MA_0$, $MA_1$, and $MA_2$, with respective designations $22_0$, $22_1$ and $22_2$. These three registers are used for addressing the host system's Main Memory $100_m$ and the DCP Local Memory $20_i$. The three registers are always used in the half-word transfer operation and may also be used in the full-word transfer operation. The MA registers receive a half-word selected from a variety of sources, a simultaneously the Memory Address registers are the source of a half-word that is sent to one of several destinations. These MA registers can be concatenated in various ways by means of "shift right MA" instructions in which their contents are shifted right. The MA registers can be also used individually as general purpose registers.

The Cluster Mask Gate $25_c$ contains 16 independent flip-flops, or one for each of the 16 possible Adapter Cluster units of FIG. 20A. The "1" output of each Cluster Mask flip-flop gates the "Cluster Attention Needed" signal from the corresponding Adapter Cluster. If a Cluster Mask flip-flop is off, the Data Comm Processor 20 does not detect a "Cluster Attention Needed" signal from that Adapter Cluster. In systems in which an Adapter Cluster is connected to two Data Comm Processors, the corresponding Cluster Mask flip-flops in each Data Comm Processor can be loaded so that only one Data Comm Processor responds to a "Cluster Attention Needed" signal. One of the 16 possible Adapter Clusters or pack units is shown by the designation 54.

The Scratchpad Memory $24_{sp}$ is an integrated circuit memory which utilizes memory cells and it contains eight 52-bit words. The information can be read out or stored in full-words, 24-half-bit words, or individual 8-bit bytes. The read-out is non-destructive; Read and Write are independent and can occur simultaneously in different locations. The Scratchpad Memory $24_{sp}$ is intended to be used for fast-access temporary data storage. The Scratchpad Memory locations are like flip-flop registers except that the same location cannot be used both as a source and a destination when the result is a complementary function of the source operand. If the same byte is improperly addressed both as a source and as a destination, an invalid operator fault interrupt will occur.

In FIGS. 1B and 4 the local memory (LM) $20_i$ is an optional word organized memory. A basic unit of the local memory has a capacity of 4,096 52-bit words. In FIGS. 5 and 21A, a local DCP internal memory is shown as $20_i$ and $20_e$ as part of the Data Communications Processor 20. A single full-word is either read or stored on each separately ordered access cycle. The read-out is non-destructive. The words are stored with odd parity and the parity is automatically checked after read-out. A parity error will create a "fault interrupt." The local memory $20_i$ can hold both data and instruction words with a primary use generally for instruction storage. An Access Control unit $20_{ac}$ (FIG. 21A) is used in the Data Comm Processor for accessing the local memory resource. Any access request is interlocked until it is released by an access obtain signal from the addressed local memory module. If the access obtained signal is not received with 8 clock periods, an invalid address fault interrupt will occur. Because the access time to local memory $20_i$ is less than the access time to system Main Memory $100_m$, the use of a local memory increases the processing capacity of the Data Comm Processor. The local memory $20_i$, $20_e$, is also expandable for larger memory storage.

A unique and singular aspect of the enhanced data communication subsystem in its relationship to the main host system is the provision whereby the data communication subsystem can continuously operate in an "autonomous" mode independently of the main host system should the main host system fail or be placed in a halted condition.

The relationship of the data communication subsystem may be illustrated with reference to a main host processor system such as the Burroughs B 6700 system which is described and delineated in a reference manual entitled "Burroughs B 6700 Information Processing Systems," Reference Manual 1058633 published by the Burroughs Corporation of Detroit, Michigan 48232, and Copyright 1969, 1970, 1972. This system provides for Input/Output Processors and Data Communications Processors to be interconnected to the main host system. The Input/Output Processor of the main host system provides a Scan Bus which is the communication link between the main host system and various subsystems, such as the data communication subsystem. The Scan Bus consists of 20 address lines, 48 data information lines, 1 parity line and 11 control lines. Input/output processing or data communication operations are initiated via the Scan Bus.

Another interface between the main host system and subsystems such as the data communication subsystem is a Memory Bus. This bus contains 20 address lines, 51 data (information) lines, 1 parity line and 8 control lines. It transmits information bi-directionally between the main memory and the host processor's "hard registers" A, B, C, X, Y, and P which are described and discussed in the above referenced manual.

The Scan Bus provides an asynchronous communication path between Burroughs' B 6700 processors and data communication processors. Scan operators are used to communicate between the main processor and the I/O subsystem, the data communication subsystem or other subsystems, via the Scan Bus. The "Scan-In" functions to read information from the subsystems to the "top-of-stack" register and the processor. The "Scan-Out" functions perform the operation of writing information from the "top-of-stack" registers in the processor to a particular subsystem such as the data communication subsystem.

The "Scan-In" (SCNIN) uses the A register to specify the type of input required and the Input/Output Processor that is to respond or the particular Data Communications Processor that is to respond. The input data is placed in the B register. The A register is empty and the B register is full at the completion of the operation.

Scan-Out places bits 0 through 19 on the "top-of-stack" word on the Scan Bus Address Line and also places the second stack word on the Scan Bus Information Lines; an "invalid address" interrupt results if the address word is invalid. The A and B registers are empty upon successful completion of a Scan-Out.

The Data Communications Processor of the data communications subsystem is a special purpose processor. It controls a group of Front-End Controllers which handle the transmitting and receiving of messages over the various types of data communication lines connected to peripheral terminals. In the enhanced data communication subsystem the major part of data-transfer functions are unburdened from the Data Communications Processor by use of a group of Front-End Controllers which handle the detailed programs and routines necessary to handle data transfer operations between sending and receiving peripheral units.

The Data Communications Processor is a stored program computer which can obtain its program instructions or control data either from the B 6700 main memory or from an optional local internal memory or a local "autonomous" memory (FIG. 4) called a Data Communications Memory. Through the use of the local internal memory $20_i$ of the DCP and the autonomous memory $20_m$ for the front-end controllers, the competition for space in main memory is reduced and the throughput of the Data Communications Processor and Front-End Controllers is significantly increased due to the reduction in instruction fetch time.

In addition to the elements in structures herein before described for the Data Communications Processor, a specialized "Host System—Data Communications Processor" relationship is provided whereby failures of halts in the main host system will not stop the data communication subsystem from operating and the data communication subsystem may continue to operate independently of the main host system in an "autonomous" mode for the autonomous configuration. This operation may be referred to as "bridging a halt-load".

These provisions for autonomous operations are illustrated in FIGS. 4A and 4B. FIG. 4A shows the functional logic circuitry which is used to sense when the main host system is inoperative or failed so that the data communications subsystem in its autonomous configuration may then operate in its autonomous mode until such time as the main host system returns on-line and is available for interchange of data transfers with the main memory of the host system.

As an illustration, the Burroughs B 6700 as a main host computer puts a Scan-Out signal known as a scan request (SREQ) which provides a "True" pulse every two seconds. Any of a plurality of Data Communications Processors, each having its own data communication subsystem, will continuously sense this pulse as a signal of normal operation in the main host system. These signals are used in conjunction with the circuit of FIG. 4A.

In FIG. 4A an on-line switch 201 provides a signal that the particular Data Communications Processor is on-line with the main host system. This signal is fed into a flip-flop 202 having a Q output which feeds to AND gate 211, while the $\bar{Q}$ output is connected to a 2 second multivibrator.

Three AND gates 211, 212 and 213 are provided wherein the first AND gate 211 has inputs LNON (Data Communications Processor is on-line) and a second input SREQ (Scan Request from host system on Scan Bus). The second AND gate 212 has one input from LNON and also another input from the signal TO2S (Time-out 2 second signal). The third AND gate 213 also has inputs from LNON and TO2S in addition to having inputs RUN (signal that the Data Communications Processor is running) and also HREG/signal (which means that the holding register in the Data Communications Processor is not set). The HREG/signal comes from a switch having three positions: (a) Hold position—used for off-line operations; (b) Stop on Fault position—which will stop the Data Communications Processor during main system halts and (c) Normal Run position—to permit autonomous operation of the Data Communications Processor during main system halts.

The output of AND gates 211, 212 connect to the J input to JK flip-flop 203 (set time-out). The K input to flip-flop 203 comes through an inverter 205 from the $\bar{Q}$ output TO2S of multivibrator 204.

A two-second multivibrator 204 (interval timer) is triggered on by a Q signal from the STTO flip-flop 203. This triggers the multivibrator on the positive going pulse (True). The other input to multivibrator 204 triggers the multivibrator on the negative going pulse (False). The $\bar{Q}$ output of multivibrator 204 provides a signal output both to the second AND gate 212 and third AND gate 213.

The output signal, when it occurs from AND gate 213, will set flip-flops 206 (122) and 207 (123). When both these flip-flops are set, this indicates that the main host system is "down" and the outputs of these flip-flops 206, 207 will be sensed by the software in the Data Communications Processor to cause a branch instruction to occur which will place the Data Communications Processor in an autonomous mode for continuous self operation independently of the main host system and which will also use the disk tanking facility of the disk files to temporarily store and hold all message data and control data which is intended for the main memory of the host system or for the main processor.

Under normal conditions, a signal SAN (System Attention Needed) is a signal that the main system sends to the Data Communications Processor to signify normal conditions of the main host processor and permits normal interchanges of data and information between the main host system and the data communication subsystem. Under these normal conditions the Data Communications Processor will only set the flip-flop 207 (I23F). It is only when both flip-flops 206, 207 (I22F, I23F) are "Set", that this signifies that the main host system is "down".

The scratchpad memory of the Data Communications Processor has a portion designated as IBA or Instruction Base Address.

Certain commands and signals operate between the main host system and each Data Communications Processor. These are:

SAN is a specific command from the host system to the Data Communications Processor to ask if the host system can talk to the Data Communications Processor.

SREQ is "scan request" sent by the host system to the Data Communications Processor as a pulse which recurs every two seconds. It tells a Data Communications Processor that the host system is active.

SAOF is a signal of the Data Communications Processor telling the host system that the Data Communications Processor is ready to accept information or commands.

TO2S SAN is a signal internal to the Data Communications Processor generated by the interval timer 204 during times the host system is halted.

SET IBA is a command which sets a main memory address into a register of the Data Communications Processor prior to the re-establishment of communication by the Data Communications Processor to the main memory and occurs only when the Data Communications Processor is in autonomous mode.

If the main host system does not generate a scan request SREQ every 2 seconds, the interval timer 204 times out and generates a unique SAN called "TO2S" (Time Out 2 Second).

TO2S sets the I23F flip-flop 207 and also sets the I22F flip-flop 206. The I22 being set differentiates the TO2S SAN from the regular SAN where only I23F flip-flop 207 is set during normal operations of the main host system. TO2S SAN does not set the SAOF (Scan Address Obtained Flip-Flop) as is done by the regular SAN.

Interval Timer Logic: The Interval Timer Logic in FIG. 4A shows gates 211 and 212 providing the logic conditions for triggering the 2 second timer. Gate 213 is time-out logic for the "TO2S" SAN (2 second time out—system attention needed).

The two second interval timer 204 is triggered (when the TO2S output is false) with the Data Communications Processor on-line switch in the "on-line" position. Gate 211 monitors the SREQ signal. As long as the SREQ's are received within a 2 second time interval from the scan bus, the STTO flip-flop 203 sets and re-triggers the 2 second timer (TO2S goes low). However, if the SREQ is not received within a 2 second interval, the 2 second timer is not re-triggered, causing the timer to time out (TO2S goes into the True state). With the TO2S in the True state, then the gate 212 is enabled which re-triggers the 2 second timer for a new timing period. In conjunction with the new timing period, gate 213 sets I22F and I23F which reflects the TO2S SAN signal.

If the main host system has gone down and the flip-flops 206, 207 have been set within the Data Communications Processor, it is necessary that the Data Communications Processor receives the Scan Request in order to re-start the timer multivibrator 204 and that it also receives from the host system a new "Set IBA" command so that the Data Communications Processor can send its Scan Access Obtained Signal (SAOF) and can receive a new Instruction Base Address (IBA) into its SMO-L, scratchpad memory-left at the zero location. However, the Data Communications Processor does not yet use the new Instruction Base Address for accessing main memory at this time but continues tanking operations with disk files until it gets the SCAN command (System Attention Needed). Then the Data Communications Processor re-sets the flip-flop 206 (I22F) and then can operate normally with the main system.

FIG. 4B shows the sequence of operation whereby a Data Communications Processor senses a failure or halt of the main host system and also how it regains communication with the main host system after recovery of the main host system.

Referring to FIG. 4B, there is seen a flow chart of Data Communications Processor autonomous operations during the occurrence of a halt-load or falure of the main host system. As seen in FIG. 4B, there are two flip-flops I22F and I23F (designated 206 and 207 in FIG. 4A). Normally when the main host system is operating it sends a pulse every two seconds to the Data Communicaions Processor to see if there are any requests being made to the main system (SREQ). In the normal conditions of operation the flip-flop I23F (element 207) is "set" to show that standard SAN commands are coming from the main system (System Attention Needed).

Referring to FIG. 4B it will be seen that as long as the system request pulses (SREQ) continue, the "yes" branch will restart the timer and the timer will not time-out. Thus, the standard situation of normal intercommunication between the main host system and the Data Communications Processor will continue. All Data Communications Processors in the network are connected to the host system Scan bus to sense host system activity regardless of which particular Data Communications Processor is actually being addressed.

If there are no longer any more system request signals, the "no" branch of FIG. 4B shows that the interval timer in the Data Communications Processor will "time-out" and thus set both flip-flops I22F and I23F.

When a Data Communications Processor senses the "set" of both flip-flops I22 and I23 (206, 207 of FIG. 4A) due to no "scan-out" signals from the main system and consequent time-out of the interval timer, then sensing logic from the software operations of the Data Communications Processor will recognize the "setting" of these two flip-flops (I22F and I23F) to cause a branch instruction to place the data communication subsystem into the "autonomous" mode.

At this point the Data Communications Processor begins "tanking" mode of operation whereby the data communications disk control will act as a surrogate for the main memory and will temporarily store all control and message data during the down time of the main host system. After the main system is back "on line", this information which is tanked on disk can then be communicated to the main system as necessary or to other peripheral terminals in the system.

As long as there ae no system request SREQ signals, the Data Communications Processor continues operating "autonomously" by initializing various of its Front-End Controllers so they will continue with data transfer operations between sending and receiving units and for storage of informational data on the disk file systems.

Once the SREQ signal returns to the Data Communications Processor, it restarts the timer 204, but this is yet not sufficient for re-initiating the main host system—data communication subsystem intercommunication, and the Data Communicatons Processor continues its autonomous operation including the "tanking" operation.

In order for the normal operating relationships to be re-established between the main host system and the data communication subsystem, the following actions must occur: the main host system, once it is operating again, will scan out a system request (SREQ) signal and also a "set IBA" command. The set IBA command (Instruction Base Address) provides an address of main memory for the Data Communications Processor to access, when normal relationships are re-established. This Instruction Base Address is placed into the zero position the left-hand side of the scratch memory $24_{sp}$ (SMO-L) of the Data Communications Processor, FIG. 21A.

Still however the Data Communications Processor does not use this new Instruction Base Address but continues its tanking operations until the Data Communications Processor can receive a system attention needed (SAN) signal from the main system. When the main host system scans out SAN command, then the Data Communications Processor will reset flip-flop I22 (element 206) and will then use the newly received Instruction Base Address (IBA) in order to access main memory of the main host system.

Thus, the system relationships are re-established in the "normal" fashion whereby the Data Communications Processor and its group of Front-End Controllers will have memory access to either data communications memory $20_m$ or to the main memory $100_m$.

Even however in the normal mode of operation, the Data Communications Processor 20 and the Front-End Controllers (such as 51, 70, 90) will still relieve the main host processor of data transfer functions and will relieve the main memory of memory storage functions since these functions will be handled by the Data Communications Processor and the data communications memory, DCM. Further, the Data Communications Processor 20 is relieved of the bulk of its data processing burdens by means of the specialized Front-End Controllers which handle the specific data transfer needs of a variety of peripheral terminal devices and line disciplines.

The Data Communications Processor has a Main Memory Interface $100_i$ which is basically a memory bus to the host system. The Data Communications Processor 20 can be connected to a host system's peripheral control multiplexor word-interface hub. Here the Data Communications Processor's requests to Main Memory are passed on to the host memory system through the multiplexor by sharing the multiplexor memory bus. If the Data Communications Processor and the multiplexor are not using the same 5 Megahertz master clock, the multiplexor word interface will then provide the synchronizing function.

Two Data Communications Processors, each acting as a requesting unit, can share one memory bus. If this is done, The Data Communications Processors must have intercommunication to prevent any conflicts in the use of the shared bus. This communicaton requires a separate interconnection of two signal lines.

Referring again to FIG. 21A, an arithmetic-logic unit 26 in the Data Communications Processor can perform operations on 8-bit bytes, providing such functions as add, subtract, logical AND, logical OR, logical exclusive OR. The logic unit 26 has two input buses A and B in addition to an output bus C.

A hardware translation unit $26_t$ is made part of the arithmetic logic unit in order to translate, on a byte-to-byte translation, as follows:

| | |
|---|---|
| EBCDIC to USASI | (8-bits to 7-bits) |
| EBCDIC to BCL | (8-bits to 6-bits) |
| USASI to EBCDIC | (7-bits to 8-bits) |
| BCL to EBCDIC | (6-bits to 8-bits) |

Fetch Cycle: The fetch cycle loads a full instruction word into the instruction register $23_{IR}$. The instruction word can be read from the Data Comm Processor Local Memory $20_l$ or from the host system's Main Memory $100_m$ via the Main Memory Interface $100_i$.

The host ($100_{p1}$, $100_{p2}$) or Master Processor (FIG. 1A) has ultimate control over the Data Comm Processor 20 by means of a scan bus 27 (FIG. 21A). This corresponds to $20_s$ of FIGS. 1B, 2, 3, 4, 5. The data Comm Processor accepts three different "scan-out" orders. These are: Initialize, Set Attention Needed, and Halt. The Data Comm Processor 20 does not accept a "scan-/in" order. A designation or address is a sign to each Data Comm Processor by means of pluggable jumpers. A Data Comm Processor recognizes only the scan orders that contain the specified Data Comm Processor address. Normally the Data Comm Processor will return a ready signal on the scan bus 27 when the Data Comm Processor 20 is addressed by any scan order. The ready signal allows the main system processor to maintain the scan order in anticipation of a scan access obtained signal. The scan access obtain signal is sent by the Data Comm Processor when it performs the scan-out operation as directed or when it detects an invalid scan order. The absence of a ready signal on the scan bus is detected by a time-out in the main system processor, which will then end the scan order. The Data Comm Processor is then identified as being not-present in the system or at least not available.

Initialize: When recognized by a Data Comm Processor, an Initialize scan-out turns on the run flip-flop and creates a fault interrupt. This fault interrupt takes precedence over any other fault interrupt. The 20-bit instruction base address (in the scan-out information word) is stored in the L half-word of the scratchpad memory word "O". The interrupt branch address is an "all-O" address for Main Memory; the special stop conditions that might otherwise prevent the fault actions are inhibited. The first instruction word is fetched from the Main Memory location that is addressed by the instruction base address.

System Operation: The Data Comm Processor 20 places command blocks in the Data Comm Memory which the Front End Controllers can access through the basic control memory interface 60. The Data Comm Processor 20 initializes the Front-End Controllers by supplying a 20-bit address through the cluster interface of the basic control interface 60. This 20-bit address constitutes a Pointer (P) (FIG. 14) and the Front-End Controller retains this Pointer during execution of the command block.

The command blocks can be linked to each other by the Link Address (FIG. 14) such that a Front-End Controller can begin execution of the next block while a result CAN (Interrupt) is being serviced for the previous command block. Thus, linking permits faster turn-around for the Front-End Controllers so they are not dependent on DCP servicing time. The DCP will have time to process the previous command block while the Front-End Controller is executing the next. Since a 20-bit pointer address is used, there are no absolute areas of Data Comm Memory which are required.

Use of Control Words: The command Block constitutes three control words plus a data block. These words are designated:
One word—Data Comm Command Word (DCCW)
One word—Data Comm Address Word (DCAW)
One word—Data Comm Result Word (DCRW)
n words—Data Words Once a Front-End Controller has received the 20-bit pointer (P) through the cluster interface from the Data Comm Processor 20 (FIG. 16B), the Front-End Controller places the address in the address register of the memory interface 61 and reads the first Command Word. This word contains information about operation and variants of it to be performed. These operators are transferred to the command register of the Front-End Controller while the address register in incremented by "1".

Using P plus 1 as an address, another memory read is performed; this "P plus 1" address will thus access a control word which will contain address information such as the length of the data block (FIG. 14) plus a data pointer which indicates the data block.

The address register (or data pointer) is incremented by "plus 2", thus directing the Data Comm Processor past the result word area and over to the first data word. Now transmission can begin according to the required characteristics of the Front-End Controller.

When this operation is completed, a CAN (Interrupt) will be given to the Data Comm Processor 20 through the cluster interface $20_4$ (FIGS. 8, 16B), and the results of this operation will be stored in the Result Word of the Command Block. If an error was detected, a special control CAN interrupt will be given to inform the Data Comm Processor 20 of any special action needed. Operation of Front-End Controllers: The following brief sequence will serve to indicate a typical operational sequence in the subsystem using the Front-End Controllers (BBC 80, AC 51, DCDC 70, SSC 90 of FIG. 1B):

1. The Data Comm Processor 20 finds the appropriate command block in data comm memory, such as the BBC command block of FIG. 14.

2. The Data Comm Processor 20 executes a cluster write command to the designated unit, such as the BBC 80. These "Writes" will contain the address pointer or command information.

3. The "AC" field of the cluster write information (CWI) points to certain registers in that Front-End Controller. The Data Comm Processor 20 can control the Front-End Controller, as BBC 80, through the cluster interface, as $20_4$ to initialize procedures or to initialize data transfers.

4. The Front-End Controller, BBC 80, now uses the Pointer to request a memory read through the Basic Control 60 memory interface unit 61 for command words.

5. The Front-End Controller, BBC 80, now completes its operation and notifies the Data Comm Processor 20 by a CAN signal that it is finished.

6. The Data Comm Processor 20 interrogates the Front-End Controller during operation to test the state of a modem or a peripheral interface. It can also read or write buffer areas and registers for testing purposes. The Data Comm Processor can also halt a Front-End Controller or clear it during an operation.

The Basic Control Module: In the peferred embodiment the basic control module is a cabinet housing a basic control interface unit and four front-end controllers (FIG. 16A).

The basic control interface unit 60 is the central element for connection of the data communications processor, the front-end controllers and the data communications memory (which may be main host memory, autonomous memory, or other memory resource). The basic control interface unit provides access to the data communications memory for the data communications processor and for the front-end controllers. Data words are used to address the "data communications memory" such that any area of storage or memory resource of the system can be accessed by the data communications processor or any of the front-end controllers.

Communication lines from the front-end controllers are multiplexed by the basic control 60 into one standard memory interface of eighty coaxial wires. The basic control interface unit 60 also allows the data communications processor to communicate to any selected one of four front-end controllers (FEC) which are conected to the basic control interface unit in the basic control module. A command block address is written into the front-end controller by the data communications processor causing the FEC to retrieve a command word from a data communications memory resource. This command word, which was previously built by the data communications processor, contains the command information for the selected one of the front-end controllers. The front-end controller then executes the command and reports its results back to the data communications processor 20 by an "interrupt" (CAN).

The basic control interface unit 60 requests access to data communications memory (whether main memory or autonomous memory, or other memory resource) through the memory control of the data communications memory. Once memory access is granted, the word is read from or written into the memory. Also, the basic control interface unit transfers memory words to and from the front-end controllers, or to/from the data communications processor.

The basic control interface unit also allows data communications processor control information to pass from the data communications processor to the front-end controller. Thus, in this manner the DCP 20 starts, stops and interrogates each front-end controller (FEC). Each front-end controller stores up to one word of data before it requests a transfer of the word. Thus, in an adapter cluster module controller which has 16 transmission lines, there can be up to 16 words waiting for memory access. As the central connective element, the basic control interface unit 60 also resolves priorities as between the front-end controllers, the data communications processor and the data communications memory resources.

Figure 16B:
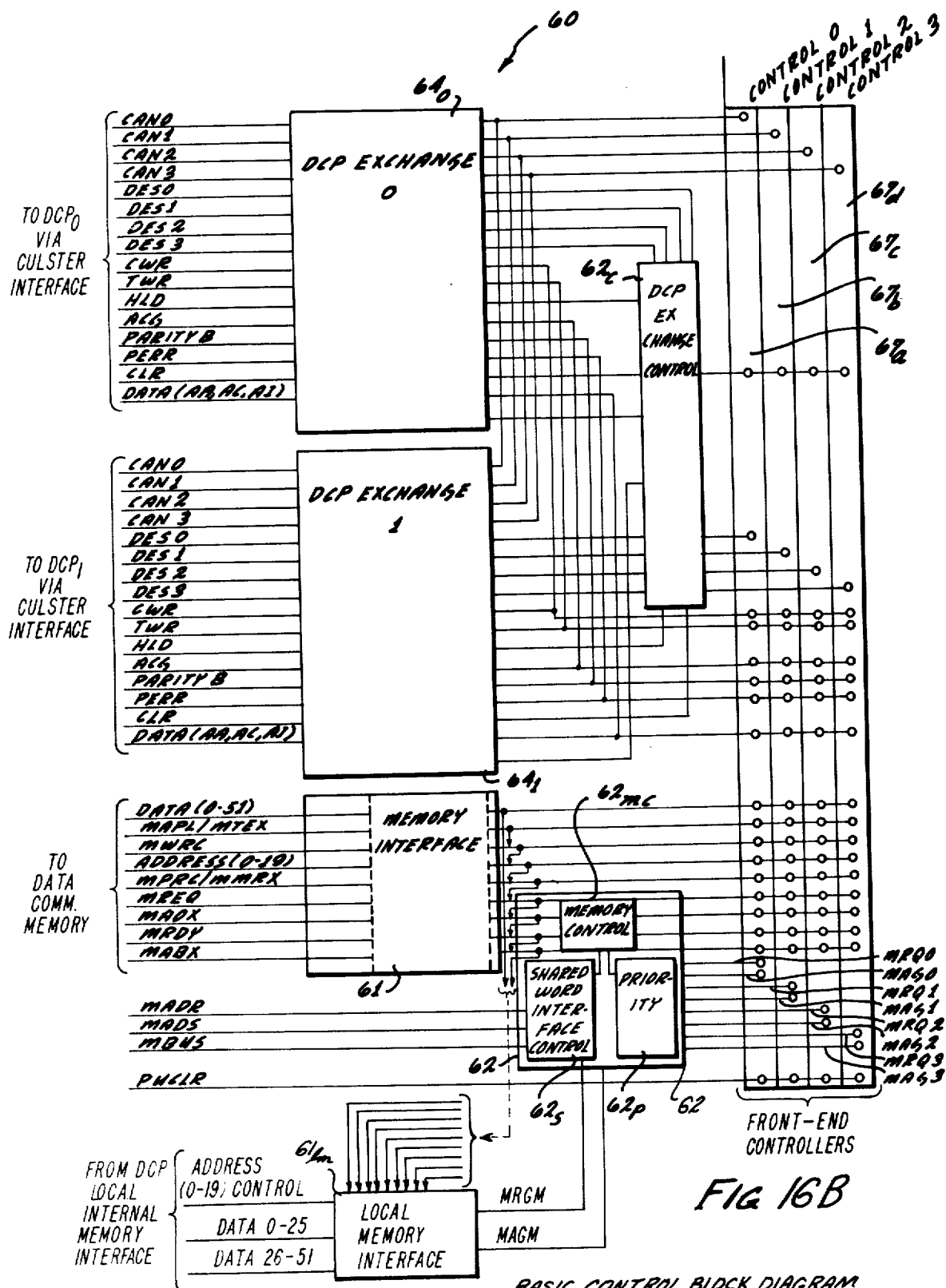
FIG. 16B is a more detailed block and line diagram of the basic control interface unit.

As seen in FIG. 16B, the basic control interface unit 60 of the basic control module provides interfaces $67_a$, $67_b$, $67_c$, $67_d$ (FIG. 16B) for up to four front-end controllers. These interfaces to the front-end controllers are connected to a data communications memory interface 61 to provide communication to the available memory resources; in addition the basic control inerface unit provides connection lines $60_{do}$, $60_{di}$ for up to two data communications processors. In additon the basic control interface unit provides an interface, known as the local memory interface, $61_{lm}$, which permits one data communications processor to access the data communications memory resources through the basic control memory interface 61.

As seen in FIG. 16A, the basic control 60 provides an interconnection to each front-end controller through two 80-pin interframe jumpers (IFJ1, IFJ2). IFJ1 ($68_1$) contains all the signals for the DCP cluster/control interface and also the address and control lines for data communications memory resorces. IFJ2 ($68_2$) contains all the data communications memory information lines, the control request lines ($MRQ_n$) and the memory access granted ($ACG_n$) signals (FIG. 16B).

The control signals are thus passed to each front-end controller through the interframe jumpers connected to each of the front-end controllers located at $67_a$, $67_b$, $67_c$ and $67_d$, FIG. 16A.

The basic control interface unit 60 is arranged to allow up to four front-end controllers (FECs) to be controlled by at least two data communications processors, $DCP_O$ and $DCP_1$ of FIGS. 16A, 16B). The basic control interface unit also is provided with capability to permit at least one data communications processor, through a local memory interface $61_{lm}$ of FIG. 16B, to share the data communications memory resources with the four front-end controllers.

As seen in FIG. 16B the basic control interface unit 60 provides for four types of interfaces:

(a) DCP cluster interface $60_{do}$ and $60_{di}$: here the exchange O and the exchange 1 connect to a $DCP_O$ cluster exchange $64_O$ and to a $DCP_1$ cluster exchange $64_1$.

(b) A data communications memory interface 61: here, at the memory hub, address lines and information lines can be connected to the autonomous memory in the autonomous mode or to the host system main memory in the non-autonomous mode.

(c) Local memory interface $61_{lm}$ to a single data communications processor: this interface connects lines to one of the local data communications processors in order to provide the data communications processor with the capability of accessing a data communications memory resource through the basic control interface unit.

(d) Interface to the front-end controllers: as seen in FIG. 16A this interface is formed of two interframe jumpers IFJ1 and IFJ2 which provide lines to each of the four front-end controllers $67_a$, $67_b$, $67_c$, $67_d$, in the basic control module.

The basic control interface unit also transfers the interrupt signal CANs (control/cluster attention needed signal) to the data communications processor. When a front-end controller is designated for selection by a data communications processor, the signals are synchronized and transmitted to the designated front-end controller. The basic control interface unit 60 provides the synchronization and the priority resolution on the DCP/cluster interface. Otherwise this interface will only operate asynchronously with the data communications processor.

The basic control interface unit's memory interface 61 is shared by the local memory interface $61_{lm}$ and also by the for front-end controllers. The basic control interface unit resolves requests for priority via priority selection unit $62_p$ and also initiates a data communications memory cycle. The data communications memory requests are given priority as follows:

(a) DCP local memory interface (MRQM);
(b) Positional priority according to location of each of the front-end controllers. Thus, location O has the highest priority and location 3 has the lowest priority. This, however, can be altered by the arrangement of jumper strips.

The basic control memory interface 61 is connected to "autonomous" memory $20_m$ when in the autonomous configuration, and it is connected to the host system main memory when it is in the non-autonomous configuration. The basic control interface unit 60 shares a common word interface $62_s$ with a data communications processor coordinated via control lines $62_{sc}$. Further, the basic control interface unit will detect the "memory not ready" condition and will transfer the signal to the particular front-end controller involved. The front-end controller involved will process these error signals by using the Result Word format used by that particular front-end controller.

As seen in FIG. 1B, the basic control interface unit 60 provides the interface between the data communicatons processor 20, the autonomous data communications memory $20_m$, and the four front-end controllers 51, 70, 80 and 90. The basic control unit 60 provides interfaces to the host system memory $100_m$ in the "non-autonomous" configuration, and to both the DCP 20 and the autonomous data communications memory $20_m$ in the "autonomous" configuration.

FIG. 16A is a block diagram which illustrates the major elements of the basic control 60. FIG. 16B is a more detailed schematic drawing showing the elements and interconnections which comprise the basic control unit.

One preferred configuration of the basic control unit 60 is to interface at least two data communications processors to the four "frontend controllers" (Data Comm Disk Control; Broad Band Control; Adapter Cluster Control; Store-to-Store Control). In addition the basic control 60 permits the front-end controllers to share a memory interface 61 with the autonomous data communications memory $20_m$, main memory $100_m$ (FIG. 1B) or internal memory $20_i$ (FIG. 3). The basic control does not modify any data which passes through it but is basically "transparent" to such data passing through. A signal designated as the CAN (Cluster/ Control Attention Needed) is used in the system and this signal is passed by the basic control 60 to the data communications processor 20.

Further, the basic control 60 also provides the necessary synchronization and the priority resolution of the interface between the data communications processor and the adapter cluster or other front-end controllers. One of the functions of the basic control 60 is to establish the request priority and to forward this request to the data communications memory accessed. The "priority" on the memory request is handled by means of a jumper. These jumpers can be set in a certain position to determine priority. For example, in FIG. 16A the control section "0" will have the highest priority and the control section "3" will have the lowest priority. This, however, can be changed or rearranged according to the physical location of jumpers attached to the basic control mudule.

As seen in FIG. 16A, the bus 61 to the memory interface enters the basic control interface unit 60 where it connects to a memory priority and exchange control unit 62 having a data storage area 63. Buses 65 and 66 connect first and second data communications processors into the data communications processor exchange section 64. The basic control 60 has four control sections designated 67$_a$, 67$_b$, 67$_c$, 67$_d$, each housing a front-end controller.

The memory interface 61 can be connected directly to the memory control 100$_c$ or the autonomous memory 20$_m$ of FIG. 4. This memory interface 61 has the capability of being connected directly to memory control 100$_c$ or to a multiplexor word interface. Logic is made available to allow the basic control to share a common word interface (62$_s$, FIG. 16B) with a data communications processor (or any unit designated in the same manner) which thus allows sharing of a memory word interface hub, as previously described.

The basic control interface unit 60 can detect the "memory-not ready" error and then pass the error signal to the front-end controller. However, all other errors are transparent to the basic control 60; thus, it is the individual responsibility of each controller to process the error signals according to the result word format of the particular front-end controller.

In FIG. 16A the elements 68$_1$ and 68$_2$ are Interframe Jumper number 1 (IFJ-1) and Interframe Jumper number 2 (IFJ-2). The number 1 Interframe Jumper has all the signals for a data communications proceessor interface and also the address and the control signals for the data communications memory resource. The number 2 Interframe Jumper has all the memory data lines, the control request lines and the memory access granted (MAG$_n$) signals.

Referring to FIG. 16B, there is seen a more detailed schematic diagram illustrating the various elements and connecting lines of the basic control module 60.

Referring to FIG. 16B the four control sections of the basic control module are shown as 67$_d$, 67$_c$, 67$_b$ and 67$_a$. Communications to two data communications processors are provided through the Exchanges 64$_0$ and 64$_1$ which are designated as DCP Exchange 0 and DCP Exchange 1. The activity of the DCP Exchanges 64$_0$ and 64$_1$ are handled by a control unit designated as the DCP Exchange Control 62$_c$. (The general configuration using two DCP's is shown in FIG. 7).

The DCP Exchanges 64$_0$ and 64$_1$ (FIG. 16B) are provided with control logic which:

(a) resolves priority as between the DCP Exchanges 0 and 1. That is to say, when two data communications processors are connected to a basic control interface unit 60, only one data communications processor (DCP), at any given time, can access and operate the front-end controllers attached to the basic control interface unit 60.

(b) generates a hold (HLD) signal to inform the other non-using DCP that the first DCP is using the system at that moment.

(c) encodes the four "designate" signals from each DCP exchange into four individual signals (DES$_0$, DES$_1$, DES$_2$, DES$_3$) which are then sent to the selected front-end controller, FEC.

(d) encodes the clear (CLR) signal from each DCP Exchange 64$_0$ and 64$_1$ to one signal line common to all four of the front-end controllers.

One function of the DCP Exchange Control 62$_c$ is to provide logic to ensure that a DCP read/write, or interrogate operation, does not interrupt a current operation controlled through the other DCP Exchange. This is accomplished through the use of flip-flops in 62$_c$ (not shown) which may be designated as the SYNC$_n$, HLDF$_n$, and XPTF$_n$ flip-flops, where n can be 0 or 1 to refer to the DCP Exchange 64$_0$ or 64$_1$.

The four designate (DES$_n$) signals are wired-ORed to the input of the SYNC$_n$ and the HLDF$_n$ flip-flops. A TRUE on any of these lines sets SYNC and HLDF flip-flops on the next clock. This gives the signals for DCP Exchange 0 to have priority over the signals from DCP Exchange 1. With the HLDF flip-flop set, a hold signal (HLDX$_n$) is sent back to the respective DCP causing that DCP to retain the AA, AC, and AI lines until the front-end controller returns the access granted ACG signal. The access granted ACG signal overrides the HLD signal in the DCP, thus releasing the DCP to the front-end controller.

Communications to the data communications memory resource are handled by the memory interface unit 61. The memory interface 61 provides its output to a unit 62 having a memory control 62$_{mc}$, a shared word interface control 62$_s$ and priority logic 62$_p$. The designations and functions of the communication and control lines illustrated in FIG. 16B are discussed hereinbelow under a series of tables.

The attached Table II indicates the interframe jumper signal lines which are designated in FIG. 16B.

TABLE II

INTERFRAME JUMPER SIGNAL DESCRIPTION

Signals From the Basic Control to a Front-End Controller

| SIGNAL | DESCRIPTION |
|---|---|
| DES$_n$ | DESignate front-end controller n. |
| n = 0–3 | The designate signal is an individual line to each front-end controller. When high the designate signal indicates that a DCP is executing a command to the designated front-end controller. |
| CWR | Control WRite |
| | This line is a common signal to all front-end controllers indicating a control write. When high, this line in conjunction with the designate signal, indicates that either a write command or the write portion of an interrogate command is in progress. |
| IWR | Interrogate Write Read |
| | This line is a common signal to all front-end controllers. When high this line in conjunction with the DES signal indicates that an interrogate command is being executed by the DCP. During the write portion of the interrogate command DES, CWR, and IWR will all be true. |
| CLR | CLeaR |
| | This line is a common signal to all front-end controllers. The signal is the Programmatic clear from the DCP, which is activated by ACS signal during a DCP AW1 command. |

TABLE II-continued

INTERFRAME JUMPER SIGNAL DESCRIPTION
Signals From the Basic Control to a Front-End Controller

| SIGNAL | DESCRIPTION |
|---|---|
| | This signal should not be acted upon by the front-end controller unless the designate signal is high also. This line is intended to clear all necessary control and interface flip-flops unconditionally. |
| $CAN_n$ | Control Access Needed unit n |
| n = 0-3 | The CAN signal is a single line unique to each front-end controller. When high this signal indicates to the DCP that the controller has information for the DCP. The signal will be held true until a read is performed by the DCP. |
| ACG | ACcess Granted |
| | The ACG line is a common signal to the DCP. The ACG signal is to be held true for two (2) clock periods during a write and three (3) clock periods during a read. The clock periods are the same as described above for the write and read portions of the Interrogate Command. |
| | There must be at least a one clock separation between the write ACG and read ACG of the interrogate command. |
| PARITY B | The PARITY Bit line is a bidirectional line. This line is the add parity bit on the following eighteen (18) interface signals. (Note: See Table I for explanation of the bracketed notation).<br><br>AA[3:4]<br>AC[4:5]<br>AI[8:8] |
| PERR | The Parity ERRor line is a common signal to the DCP. It is used to notify the DCP that a parity error was detected on a Write (CWP). |
| PUCLR | The Power Up CLeaR line is true during the power on cycle and is an unconditional clear to all controls. |

The information lines of the basic control unit 60 and bi-directional (half duplex) lines which are common to all front-end controllers. When the (CWR) Write line of FIG. 16B is "high", then the information lines are driven by the data communications processors. On the other hand, when the (CWR) Write line is "low", the information lines are driven by the Data Comm Control (Front-End Controllers) on lines designated ($DES_n$). A "high" level on any of these lines would indicate a "1" bit. The term "Data Comm Control" is equivalent to "Front-End Controller".

The following Table III lists the signal names of the information lines (FIG. 16B) and a brief description of their functions.

TABLE III

| Signal Name | Description/Function |
|---|---|
| AA0<br>AA1<br>AA2<br>AA3 | The $AA_n$ lines are equivalent to the low order 4 bits of the DCP 'AA' register. These lines are used to identify an adapter or subunit within a front-end controller. |
| AC0<br>AC1<br>AC2<br>AC3<br>AC4 | The $AC_n$ lines are equivalent to the low order 5 bits of AC register of the DCP. These lines are used in a coded manner to give meaning to the AI lines described below. |
| AI0<br>AI1<br>AI2 | The AI (0-7) lines are equivalent to the AI register in the DCP. The AI8 line can be used as a parity bit on the AI (0-7) lines and is equivalent to 121F in the |

TABLE III-continued

| Signal Name | Description/Function |
|---|---|
| AI3 | DCP. |
| AI4 | The AI lines are used to transfer data to and from the |
| AI5 | DCP. |
| AI6 | The parity bit is not to be checked on each transfer. |
| AI7 | It is intended to be the parity for the data transferred |
| AI8 | to the line, which can be even or odd depending on the type of control. |

As seen in FIG. 16B there are a number of memory lines which go to the basic control unit 60. All signals in the memory portion of the interface (except for MRDY, MRU, MAG) are logically equivalent at the front-end controller to those as generated at the memory control $62_{mc}$ or word interface $62_s$. All lines except MRQ and $MAG_n$ are common signals to or from all front-end controllers. The $MRQ_n$ and the $MAG_n$ lines are unique to the individual front-end controller. The following Table IV will identify and briefly describe the memory lines to the basic control interface unit 60.

TABLE IV
MEMORY LINES TO BASIC CONTROL

| Signal Name | Description |
|---|---|
| MRQO | Memory ReQuest n |
| MRQ1<br>MRQ2<br>MRQ3 | $MRQ_n$ is the individual request signal for memory access from each front-end controller.<br><br>This signal is used for the priority resolution in the basic control. $MRQ_n$ is equivalent to the MREQ signal on the memory interface. The MRQ signal must be removed from the interface by the control at least by the first clock after the recognition of MABX which follows $MAG_n$. |
| MAPL | Memory Address Parity Level<br><br>This level is generated by the front-end controller and is the odd parity bit on the address lines MA00-19, $MRQ_n$, MWRC, and MPRC.<br><br>This line is time shared with MTEX (Memory Transmission Error). MAPL should be active from the receipt of $MAG_n$ to MABX which is the write portion of the request. |
| MPRC | Memory PRotect Control<br><br>This signal is generated by the front-end controller if it intends to use the memory protect function.<br><br>The MPRC line can only be active during the write portion of the cycle, which is the period from $MAG_n$ to MABX time. This line is time shared with the MMRX signal from memory. |
| MWRC | Memory WRite Control<br><br>This signal is generated by the front-end controller and is used to indicate to memory that the associated request is for a write cycle. MWRC is required to be active during the write portion of the request. |

As seen in FIG. 16B there are a number of lines which proceed away from the basic control unit 60. The following Table V shows the designation of the signals and a brief description of their functions.

TABLE V

LINES FROM THE BASIC CONTROL UNIT

| Signal Name | Description |
|---|---|
| MAG0<br>MAG1<br>MAG2<br>MAG3 | Memory Access Granted Control n<br><br>This signal is returned to the control when its request has been given priority and the cycle is to start. |
| MABX | Memory Access Begun<br><br>This is a one clock signal from memory control or a two clock signal from the multiplexor word interface.<br><br>The signal indicates that the memory has started its cycle. It is required that at the first clock with MABX the following lines are no longer driven by the front-end controller:<br>MRQn<br>MWRC<br>MPRC<br>MAPL<br>MIOO-51<br>MAOO-19 |
| MRDY | Memory ReaDy<br><br>This signal is a common line to all front-end controllers. The signal will be held high at all times except for a one clock period when the basic control has not received a ready signal from memory for at least 8 clocks after a request has been started. |
| MAOX | Memory Access Obtained<br><br>This signal is one clock period from memory control or two clock periods from the multiplexor word interface.<br><br>The signal indicates that at the next clock the read data and control signals are available for strobing. |
| MTEX | Memory Detected Transmission Error<br><br>When this signal is high it indicates that the memory has detected a transmission error. For a Read request this an address parity error or an internal memory control error, or an information parity error. For a Read or Write request to a Mass Memory this will be a Multiple Read-Error if MMRX is also high.<br><br>The MTEX signal time shares the line with MAPL. |
| MMRX | Memory Module Read Error<br><br>When this signal is high with MAOX it indicates that the Mass Memory has detected a single or multiple Read Error. When MMRX and MTEX has detected a multiple bit error and the data is not corrected, the MMRX signal time shares the line with MPRC. |
| MI$_{mm}$ | Memory Information Bit$_{mm}$<br><br>These lines are bidirectional and are the data lines. Line 00-47 are the information lines, bits 48-50 are the word tag bits and bit 51 is the odd parity bit on bits 00-50. When the request is a write the front-end controller should drive these lines at their proper state for the same period as the MA$_{nn}$ lines. When the request is a Read the control should sample these lines one clock after detecting the MAOX signal. |

Referring to FIG. 16A, the memory interface 61 permits operation with the memory controls 62. The basic control unit 60 can operate in the "synchronous" mode via the memory control 62 or to a multiplexor word interface. The basic control unit also has the capability to operate in the "asynchronous" mode to a multiplexor word interface. The basic control unit 60 is also provided with the capability of sharing a common word interface 62, with a given data communications processor.

Referring to FIG. 16A the data communications processor Exchange 64 is seen connected through buses 65 and 66 to two separate data communications processors. This interface from the data communications processor to the basic control unit 60 is always operated in the "asynchronous" mode. Thus, any data communications processor hub going to a basic control unit must be configured for asynchronous operation.

The setting or the changing of priority from basic control unit 60 for access to main memory is done by a jumper. This requires two jumpers per control unit (FIG. 16A). These jumpers are placed on the MRQ and MAG lines of each control (FIG. 16B). These lines must always be changed as pairs.

In summary, the basic control interface unit 60 is the central element for connection of the front-end controllers (51, 70, 80, 90) and the data communications memory resources. The basic control unit functions to provide access to any available data communications memory resource for the front-end controllers. The basic control unit converts the standard memory interface to a backplane interface for the front-end controllers. Data words consist of 48 data bits, three tag bits, one parity bit and 20 bits of address plus parity address. The "data communications memory resource" is organized such that any area of storage can be accessed by the data communications subsystem.

The basic control unit 60 multiplexes four of these interfaces to one standard memory interface of approximately 80 coaxial wires.

In addition, the basic control unit 60 will provide an interface for a data communications processor to communicate to any selected one of four front-end controllers connected to the basic control unit. A command block address will be written into the front-end controller by the data communications processor 20 causing it (front-end controller) to retrieve a command word from a "data communications memory resource". This command word (previously built by the DCP) will contain command information for one of the adapters assigned to the front-end controllers. The front-end controllers will then execute the data transfer command and report results back to the data communications processor 20 by an interrupt signal (CAN).

The basic control unit 60 requests access to a "data communications memory resource" through the memory control of a global, a local autonomous or the main memory. Once memory access is granted, the word (Command Word) will be read from or written into the memory. The basic control unit transfers memory words to and from the front-end controllers to the data communications memory interface 61.

The basic control unit also allows DCP control information to pass from the data communications processor 20 to designated front-end controllers. In this way the data communications processor can start-stop, or interrogate, each front-end controller and associated line adapters. Since each front-end controller will store up to one word of data before requesting a transfer, then up to 16 words can be waiting for memory access in each front-end controller (in the case of the Adapter Cluster Module Controller 51). It will be up to the basic control unit 60 to resolve priorities for memory access between the data communications processor, and the front-end controllers such that any conflicts or overflow situations are handled.

The Broad Band Control

As seen in FIG. 1B, the Broad Band Control 80 consistutes one of the front end controllers which interface with the Basic Control 60. The Broad Band Control provides a wideband or "broad band" interface to the host computer data comm subsystem. The Broad Band Control is used to provide a means of high speed transmission, without unduly overloading the data comm processor and other system components. Generally the Broad Band Control will be used in network communications between host computers for large bulk message transfers at high transmission rates.

The Broad Band Control can be made in several models to provide the wideband interface. In the preferred embodiment the Broad Band Control will have two major transmission protocols, specifically "Binary Synchronous" and "Data Link". In the preferred embodiment specified herein below, the Broad Band Control will be described in terms of the Binary Synchronous Protocol. This version of the Broad Band Control will be referred to as "BBSC" to designate its use of Binary Synchronous Protocol.

Each front end controller, such as the Broad Band Control is connected to the Basic Control 60. The Basic Control connects to the front end controllers by means of interframe jumpers (two) which jumpers supply the memory and cluster interface signals to the front end controller involved. When using Broad Band Controls which operate at 1.344 megabits per second, the highest priority is assigned to the Broad Band Control in relation to the Basic Control unit 60.

While the Basic Control 60 will have two interframe jumper positions, there are four interframe jumper positions required on each of the front end controller units, such as the Broad Band Control 80.

As seen in FIG. 17, the particular embodiment of the Broad Band Control, known as the Broad Band Binary Synchronous Control (BBSC), is shown. The Broad Band Synchronous Control 80 is made of a Basic Control interface 81 (which interface connects the Data Comm Processor 20 and the memory) and a central control (ROM control 82 and a common carrier interface 83). The bus structures $84_A$ and $84_B$ are a unidirectional 24-bit current-type-logic bus between the logically connected elements of the unit.

The Central ROM Memory Control 82 controls data transfers to and from the logical elements of the control. The Central Control ROM 82 and its related logic operates to store and to retrieve bytes and words from a 24-bit by 8-word scratch memory 85. Thus, the ROM Control 82 moves the bytes and words to or from the common carrier and the Basic Control interfaces. The scratch memory 85 stores control and data information for full duplex control. Data pointers, link addresses and status information are stored in the scratch memory 85 during operation.

The ROM Control 82 can initiate memory cycles, can communicate with the data comm processor interface through the Basic Control 60 and thus control and communicate to the common carrier interface 83.

In FIG. 17 a cyclic redundance checking circuit $83_c$ is provided to develop a 16 bit redundant character. This redundant character is added to the end of a transmission block for the purpose of error detection and control.

FIG. 9 shows various configurations which can be used for the Broad Band Control 80 in relation to the Basic Control 60. One, two or four high speed line capabilities may be provided by multiple Broad Band Controls such as $80_1$, $80_2$, $80_3$, $80_4$.

Referring to FIG. 17, a memory address register $88_m$ is used for the storage of Main Memory addresses and for autonomous memory addresses. Transmissions to and from the Basic Control 60 and the Broad Band Binary Synchronous Control 80 are handled by a Data Comm Processor control unit $81_d$ and a Memory Control unit $81_m$.

A transmitter line buffer TLB $83_t$ and a Receiver Line Buffer $83_r$ provide parallel-serial or serial-parallel conversion in conjunction with a first-in-first-out register $83_f$. A bus logic isolator $85_i$ provides logical gates for the switching of data bytes between the modem interface 83 and the registers $88_m$, $88_R$ and $88_L$.

Referring to FIG. 17, a translator 86 is used to provide ASCII to EBCDIC code translation. Certain special characters are detected during operation to change the message states in the control.

Address incrementation and byte count decrementation are provided by a incrementer/decrementer card under control of the ROM Control 82.

The memory interface via 81 allows the memory protect write feature as a variant feature of the command control words. This prevents the control from over-writing important information in the data comm memory when storing data in the system's main memory. The results of memory operations are recorded in the ROM Control 82 and reported in the "result word" at the end of a command block operation. Unusual memory errors are reported directly to the Data Comm Processor 20 via the Basic Control/DCP Interface 87.

Data Comm Processor Interface: The Broad Band Synchronous Controller 80 (BBSC) is capable of giving a CAN (Cluster Attention Needed) signal interrupt for an intended data comm processor Read operation. On detecting the CAN signal, the data comm processor will read information from the ROM Control 82.

The BBSC 80 responds to data comm processor Write signals and stores the information into the data comm processor interface register 87 and optionally checks odd parity on the 18 bi-directional signal lines. If an error occurs, the ROM Control 82 will indicate the error condition.

The BBSC 80 will respond to "interrogate" commands from the Data Comm Processor 20. Certain control registers can be interrogated and written into by the Data Comm Processor 20 for testing in control operations. Parity is tested during the "Write" portion of the interrogate. The ROM Control 82 will not respond to the Read portion of the interrogate operation if a parity error occurs.

Common Carrier Interfaces: The BBSC 80 has interfaces, 83, to most common carrier wideband interfaces, which usually range in the band from 19.2K to 1.344 megabits per second speed range. Interface "adapters" are provided which match these differences to the BBSC 80. The interfaces may include such items as a Western Electric 303 Data Set, Western Electric 306 Data Set, Datel 8A Data Set, etc.

BBSC Control 80 will not allow automatic dialing, or answering or disconnect. However, "Data Set Not Ready" and "Carrier Quality Detection" will be reported to the BBSC 80 and to the Data Comm Processor 20.

Operation: The BBSC Control 80 is initiated from the Data Comm Processor 20 by the writing of a command block pointer into the control's pointer register. The BBSC control then reads two words of the 3-word command block from the "data comm memory". The control words had been previously stored in data comm memory by the Data Comm Processor 20. Upon readout of the words, the BBSC 80 Control will begin operation as specified by the OP fields and variant fields of the command word (DCCW). This mode is called the "message mode".

The BBSC provides a means of linking from command blocks in addition to the above so that combinations of command blocks can be utilized to implement the Binary Synchronous Procedures at a very high data rate (1.344 megabits per second).

The data pointer variant bit can be used when a text portion of a message is separated from the contiguous memory area of the command block. When this option is used, the words of memory following the command block can then be used to store Binary Synchronous Header information—up to 256 bytes of Header can be transmitted and received from this data area following the command block.

As discussed, the preferred embodiment of the Broad Band Control described herein may be designated as the BBSC or Broad Band Synchronous Control, since this embodiment is directed to the use of Binary Synchronous Protocol. The line speed of BBSC 80 (of FIG. 17) is determined by the clock rate of the common carrier interface. By using the interface adapters described in this embodiment, the serial bit line speeds may be available from 19.2K to 1.344 megabits per second. The BBSC is made capable of full duplex simultaneous operation. Under software control, the BBSC can operate in the following modes:
1. USASCII Basic
2. USASCII Transparent Character Format: The BBSC provides ASCII to EBCDIC code translation by means of the translator 86 of FIG. 17. Depending on mode selected by a mode register, the BBSC communicates with the Broad Band interfaces in a serial bit mode using seven or eight bits per character. The data set supplies the bit timing information. The BBSC establishes the character synchronization with the line when the synchronization codes are received at the beginning of the message.

In the "Write" operation, the BBSC 80 operates in a message mode when the "Write" operation is initiated from the Data Comm Processor 20. The BBSC 80 will read and then set up the scratch memory 85 for its parameters and initiate the line and transmit data. The results of initiation are reported by the BBSC (including data comm processor interrupt and result words) into memory. In the "Read" operation, the BBSC operates in a message mode when the "Read" operation is initiated from the Data Comm Processor 20. The BBSC will read the necessary control words from the memory store parameters in the scratch memory 85 and then initiate the line for receiving data and then wait for it to be stored. After receipt of an ending condition or data or error condition, the BBSC 80 will report to the Data Comm Processor 20 via the data comm processor interrupt and via the result word.

Whenever synchronization is to be established by the BBSC with a remote site, the transmitting station sends a unique synchronization character, designated SYN. The synchronization character is transmitted three times contiguously. The receiving station searches the received data stream for these synchronization characters, and synchronization is established upon the receiving station having received two contiguous synchronization characters.

Once character synchronization has been achieved, the receiver verifies establishment of synchronization by examining two of the characters to insure that all are synchronization characters. If the characters are determined to be "synchronization characters" then character synchronization has been achieved. The synchronization character bit pattern for ASCII is:

```
ASCII P 7 6 5 4 3 2 1
      0 0 0 1 0 1 1 0
                   ↑
                   └─These bits are transmitted first.
```

As shown in FIG. 14, the data comm memory provides storage for a command block of which one portion provides the storage space for the Broad Band Control command block. This block is prepared by the Data Comm Processor 20 before initialization.

The Data Comm Processor 20 places command blocks in the "data comm memory" after which the BBSC 80 can access these from data comm memory through the memory interface of the Basic Control 60. The Data Comm Processor 20 initializes the BBSC 80 by supplying a 20-bit address through the cluster interface of the Basic Control. The BBSC 80 stores the pointer (during execution of a command block) in its scratch memory 85 of FIG. 17A.

Command blocks can be linked to each other by the link address, FIG. 14, such that the BBSC 80 can begin execution of the next block during the time that a result CAN (Cluster Attention Needed) is being serviced for the previous command block by the Data Comm Processor 20. Linking allows faster turnaround for the BBSC 80 so that it is not dependent on the Data Comm Processor 20 service time. Since a 20-bit pointer address is used, no absolute areas of "data comm memory" are required except for the fault branch addresses of the Data Comm Processor 20.

The command block (FIG. 14) for the Broad Band Binary Synchronous Control consists of three control words plus a data area (and/or a Header data area), as follows:

| | |
|---|---|
| 1. Data Comm Command Word | DCCW |
| 2. Data Comm Address Word | DCAW |
| 3. Data Comm Result Word | DCRW |
| 4. 0-255 Header Bytes | Header Area |
| 5. n Data Words | DATA AREA |

The DCCW and the DCAW are prepared by the Data Comm Processor 20 prior to initialization of the Broad Band Control 80. The DCRW will contain the results of the operation of the BBSC. The data area or data block will usually contain text information but can contain other than text. The Header Area is usually allocated to header or control information.

The BBSC 80 is initialized by a three data comm processor Writes of a command block pointer through the Data comm Processor 20 to the Basic Control 60 interface. The BBSC having received the pointer will begin operation by reading the DCCW and the DCAW from the data comm memory. The BBSC 80 manipulates and stores the two control words and initializes the operation according to the OP code and the variants in the DCCW.

As seen in FIG. 17, the BBSC 80 uses two logic blocks designated as Word Right $88_R$ and Word Left $88_L$.

The second word of the BBC command block of FIG. 14 is the Data Comm Address Word (DCAW). It is used for a byte limit and the data pointer fields.

Table VII shows the Data Comm Address Word (DCAW-L) showing bits 47 through 24 and the DCAW-R with bits 23 through 0.

TABLE VII

DCAW-L

| 47 | 40 | 39 | 24 |
|---|---|---|---|
| ENDING CHARACTER | | BYTE LENGTH WRITE (LIMIT ON READ)* | |

Bits (39:16) of the Data Comm Address Word (DCAW) are used for the Byte length of the Data area on Write. The Control decrements this count until zero.

On a Read operation, the Data Area Limit in Bytes is contained here. The Control decrements when receiving each byte and, if zero, an overflow condition exists.

Bits (47:8) of DCAW contain the ending character on Write operators when variant bit DCCW (36:1) equals zero (0.)

DCAW-R

| 23 | 20 | 19 | 0 |
|---|---|---|---|
| RESERVED | | DATA POINTER ADDRESS | |

Bits (19:20) of the DCAW is used to address the beginning of the Data Area when DCCW bit 33 = 1. If DCCW bit 33 = 0, Data will be transmitted or stored starting at address DCRW + 1.

*MAX NUMBER BYTES $2^{16} = 65{,}536$

The Data Comm Command "Word Left" (DCCW-L) contains the operational variants and the header byte count when it is used. Also certain "protect" bits are associated with the DCCW-L which identifies the DCCW to be valid for this specific control. The following table VI indicates the layout of the DCCW-L plus a description of the bits from 51 to 24:

TABLE VI

DCCW-L

| 51 | 50 | 48 47 | 44 43 | 40 39 | 36 35 | 32 31 | 24 |
|---|---|---|---|---|---|---|---|
| P | TAG | 0100 | OP | VAR | OPTIONS | HEADER COUNT | |

Description of DCCW bits 51 to 24

| BITS | |
|---|---|
| 51 | Memory Parity bit tested on all memory Reads. Generated on Writes and stored. (Odd) |
| (50:3) | Tag bits tested by control to always be equal binary 3. If DCCW tag not 3 error CAN generated to DCP. |
| (47:4) | Code used by program to specifically identify this DCCW as Broadband Command (47:4) = 0100 |
| (43:4) | Broadband Control Operator Code. |
| | Write = 0100 |
| | Read = 0010 |
| (39:4) | OPERATION VARIANT FIELD |
| | Variant Field of Read and Write Operators. These bits augment the operators and specify message framing options and turnaround time-outs. |

The DCRW of the BBSC 80 is written by the BBSC at the end of each operator. The bits which are set describe the results of the operation. A data comm processor cluster attention needed (CAN) interrupt is optionally given on linked messages to indicate if significant information has been written.

the Data Comm Result Word (DCRW-L) contains three major fields:

1. Header bytes received during reception of non-data.
2. Common carrier interface Result bits
3. Memory opertion Result bits.

the "right" result word (DCRW-R) contains two major fields:

1. The Resultant byte count of data received.
2. The ending character on a Read Operator when the DCCW (36:1) equal "0".

The Broad Band control will always attempt to "right" the result word even if no significant error information is to be written. This clears the result word to the most recent condition of the BBSC.

Table VIII shows the format of the left and the right Data Comm Result Words, as follows:

TABLE VIII

BBC DATA COMM RESULT WORD

| DCRW-L | | DCRW-R | |
|---|---|---|---|
| 24 | DATA COMM MEMORY PARITY (REC) | 0 | RE- |
| 25 | TRANSMISSION ERROR (MTEX·$\overline{\text{MMRX}}$) | | SUL- |
| 26 | UNCORRECTIBLE (REC) | | TANT |
| 27 | MEMORY NOT READY | | BYTE |

TABLE VIII-continued
BBC DATA COMM RESULT WORD

| 28 | | | DC MEMORY CORRECTED ERROR (MMRX*$\overline{\text{MTEX}}$) (REC) | | COUNT |
| --- | --- | --- | --- | --- | --- |
| 29 | | | DC MEMORY PROTECT ERROR (REC) | | |
| 30 | | | SPARE | | |
| 31 | | | BUFFER OVERFLOW (MEMORY) (T or R) | | |
| 32 | | | DATA SET NOT READY | | |
| 33 | | | LOSS OF CLEAR TO SEND (During Transmit) | | |
| 34 | | | LOSS OF CARRIER | | |
| 35 | | | SYNC FILL | | |
| 36 | | | PAD CHECK ERROR | | |
| 37 | | | PARITY ERROR VRC/CRC/LRC | 15 | |
| 38 | | | DATA LOSS (FIFO OVERFLOW) | 16 | END- |
| 39 | | | TIME-OUT (T or R) | | ING |
| 40 | HEAD- | Number | | | CHAR- |
| 41 | ER | of | | | ACTER* |
| 42 | BYTES | Charac- | | | |
| 43 | REC'D | ters | | | |
| 44 | | in | | | |
| 45 | | Re- | | | |
| 46 | | ceived | | | |
| 47 | | Header | | 23 | |

NOTE:
Maximum bytes = $2^{16}$ = 65,536 bytes
*Ending Character on READ when DCCW [36:1] = 0

The BBSC 80 communicates from the Data Comm Processor 20 through the Basic Control 60. The Basic Control 60 interfaces through the data comm processor cluster interface and the Basic Control uses a 24-bit word (0-23) which conforms to the format shown hereinabelow in Table IX.

TABLE IX
DCP TO BBSC INTERFACE

| 23 22 | 21 20 | 19 18 17 16 | 15 14 | 13 | 12 11 10 9 8 | 7 6 5 4 3 2 1 0 |
| --- | --- | --- | --- | --- | --- | --- |
| BC | BBSC | N.U. | T R | NU | C L R | OP | DATA |

|← AA →|← AC →|← AI →|

The A register is broken into 3 fields:
  AA = A [23:8]
  AC = A [15:8]
  AI = A [7:8] Plus DCP I21 = AI8

Note:
The interface between the Data Comm Processor 20 to the Basic Control 60 for the BBSC 80 has the "A" register of the data comm processor being used to communicate commands to BBSC 80. The "AA" field contains addressing information, the "AC" field contains an operation code and "AI" field contains data pertaining to the OP code given. The Data Comm Processor 20 is able to issue commands to the BBSC 80 in order to initialize a command block, to interrogate a specific register, or to receive CAN interrupts over the cluster interface through the Basic Control 60.

Address Field AA
The bits of the A register AA [7:8] specify the BC, BBSC address.
  A [23:2] =   BC address
  A [21:2] =   BBSC address
  A [16:1]     Transmit = 1
               Receive = 0
  A [19:3]     are not used in the BBSC except for parity generation and checking.

When the Data Comm Processor 20 communicates "Write" commands to the BBSC 80 it does so via the cluster/DCP interface and through the Basic Control 60. The control words which are written into the BBSC 80 use the format shown below here in Table X:

TABLE X

| BBSC DCP WRITE COMMAND | | |
| --- | --- | --- |
| AC | AI | |
| 4 3 2 1 0 | 8 7 6 5 4 3 2 1 0 | DESCRIPTION |
| 1 0 0 0 1 | *P 7 6 5 4 3 2 1 0 | Command Pointer (7:8) and Start |
| 1 0 0 1 0 | P 15 14 13 12 11 10 9 8 | Command Pointer (15:8) |

TABLE X-continued

| BBSC DCP WRITE COMMAND | | |
| --- | --- | --- |
| AC | AI | |
| 4 3 2 1 0 | 8 7 6 5 4 3 2 1 0 | DESCRIPTION |
| 1 0 0 1 1 | P 0 0 0 0 19 18 17 16 | Command Pointer (20:4) |

*NOTE:
"P" bit not specified to be used presently, is designated as a "DON'T CARE" signal.

Commands are used by the DCP command pointer. The BBSC is initialized in "word mode" by the trannsfer of a 20-bit command block address from the Data Comm Processor 20. Three data common processor "Write" commands are required to initialize the BBSC 80. These commands are shown in THE AC and AI fields in the following Table XI:

TABLE XI

| DCP COMMAND POINTER COMMANDS | |
| --- | --- |
| AC | AI |
| 1 0 0 0 1 | Command Pointer Bits  The Control |

TABLE XI-continued

| | DCP COMMAND POINTER COMMANDS | |
|---|---|---|
| AC | AI | |
| | (7:8) | will initialize following this Write |
| 1 0 0 1 0 | Command Pointer Bits (15:8) | |
| 1 0 0 1 1 | Command Pointer Bits (19:4) | |

When the CAN signal occurs which signifies that "cluster Attention is Needed", the BBSC 80 can cause an "Interrupt" of the Data Comm Processor 20 by using its individual CAN signal line. The BBSC 80 will wait for the data comm processor Read signal and then load the AC - AI register (Table IX) with the appropriate information. After the "Read", the CAN signal is cleared and the BBSC register is also cleared. The Data Comm Processor 20 can be made to check parity on the 18 signal lines when parity option is installed. The following Table XII shows the data comm processor "Interrupts" which are implemented by the BBSC 80:

TABLE XII

| AC Field | | | | | | | | | | | | | Description |
|---|---|---|---|---|---|---|---|---|---|---|---|---|---|
| 4 | 3 | 2 | 1 | 0 | 8 | 7 | 6 | 5 | 4 | 3 | 2 | 1 | 0 | |
| 0 | 0 | 0 | 1 | 0 | X | 0 | 0 | 0 | 0 | 0 | 0 | 0 | 0 | Op OK No Result. |
| 0 | 0 | 0 | 1 | 0 | X | 0 | 0 | 0 | 1 | 0 | 0 | 0 | 0 | Invalid Command Word (DCCW) or (DCRW) |
| 0 | 0 | 0 | 1 | 0 | X | 0 | 0 | 0 | 1 | R | R | R | R | Control Fault Op Discontinued |
| | | | | | | | | | | | | | | Mem. Parity on Control Word |
| | | | | | | | | | | | | | | Mem. Transmission Error (Address) |
| | | | | | | | | | | | | | | Mem. Uncorrectable on Control Word |
| | | | | | | | | | | | | | | Mem. Not Ready |
| 0 | 0 | 0 | 1 | 0 | X | 0 | 0 | 1 | 0 | 0 | 0 | 0 | 0 | Operation Complete But Result Word Contains Error Condition |

The Data Comm Processor 20 is functional to interrogate certain control registers of the BBSC 80 in order to obtain the present state and status of the BBSC. A lead called the "interrogate control lead" (IWR) indicates that an interrogate command is taking place. The following Table XIII shows the interrogate formats:

TABLE XIII

| | INTERROGATE FORMATS |
|---|---|
| AC | AI (READ DATA) |
| 4 3 2 1 0 | 8 7 6 5 4 3 2 1 0 |
| 0 0 1 0 1 | Mem Status |
| 0 0 1 1 0 | Modem/Line Status IR REG (Input Register) |

The Modern/Line Status can be tested during operation. The following Table XIV shows the AI bits which represent the interface state (Input Register IR).

TABLE XIV

| MODEM/LINE STATUS AC = 6 | |
|---|---|
| AI | DATA SET SIGNAL |
| 0 | BB Received Data |
| 1 | CB Clear to Send |
| 2 | CC Data Set Ready |
| 3 | CE Ring Indicator |
| 4 | CF Carrier Detect |
| 5 | CA Request to Send |
| 6 | CD Data Terminal Ready |
| 7 | Reserved |

In summary, the data comm subsystem may be provided with a single or a multiple number of Broad Band Controls which interface to the Basic Control 60 in order to provide the host computer and the data comm subsystem with a wide band or "broad band" interface to high capacity wide band modems and data-sets for the handling of high speed communications between remote terminals and the data comm subsystem.

The Broad Band Control 80 is capable of interrupting the Data Comm Processor 20 to request a read operation whereby the data comm processor will read informational data from the ROM Control 82 of the Broad Band Control 80.

The Broad Band Control 80 responds to Write signals from the Data Comm Processor 20 and can store the information into a data comm processor interface register 87 (FIG. 17). The Broad Band Control 80 can respond to "interrogate" commands from the Data Comm Processor 20 for testing, parity and control operations.

The Broad Band Control 80 operates within the data comm subsystem by using control words from a command block in the data comm memory of the data comm subsystem.

Since the command blocks can be linked to each other by link addresses, the Broad Band Control 80 can begin execution of the next block during the same time that an "interrupt" (Result CAN) is being serviced for the previous command block by the Data Comm Processor 20, this linking allowing faster turnaround for the Broad Band Control 80 which makes it independent of the Data Comm Processor 20 for service.

Thus, the Broad Band Control provides a completely controlled and unique service to the data comm processor subsystem in providing command, control, and servicing of wide band, high speed transmission tor remote terminals via data sets using common carrier lines.

DATA COMM DISK CONTROLLER (DCDC)

The Data Comm Disk Controller 70 of FIG. 1B is used to provide control for the storing and retrieval of data communication information placed on a disk. The Data Comm Disk Controller is initiated by the Data Comm Processor 20 via the Basic Control Module, particularly by the basic control interface which sends a 20-bit memory address of the data comm command word. Upon arrival of the 20-bit address at the Data Comm Disk Controller 70, the Data Comm Disk Controller begins a semi-autonomous operating condition. Once initiated, the Data Comm Disk Controller will read the data comm command word from the memory address given. As seen in FIG. 14, the data comm command word is composed of an operations code "OP", a variant field, and a file address of the disk to be accessed. The next word in memory is the data comm address word which contains the length of the "operation cycle"—that is to say, the number of words to be transferred—and optionally, a 20-bit address pointing to the beginning of the data area. After the input/output operation is initiated, the Data Comm Disk Controller 70 begins to transfer information either from the addressed memory to the disk or from the disk to memory. will cause 20-bits of address to be passed to the Data Comm Disk Controller 70. The cluster interface information passed to the Data Comm Disk Controller is formatted as shown in Table XV below.

TABLE XV

CLUSTER INTERFACE INFORMATION PASSED TO DCDC

| | | | | | ADDRESS OF DCDC | | COMMAND CODE | MEMORY ADDRESS | | | | |
|---|---|---|---|---|---|---|---|---|---|---|---|---|
| | | | | | AA | | AC | AI | | | | |

The AC (Command Code) and AI (Memory Address) fields are as follows:

| AC | | | | AI | | | | | | | | MEANING |
|---|---|---|---|---|---|---|---|---|---|---|---|---|
| 4 | 3 | 2 | 1 | 0 | 7 | 6 | 5 | 4 | 3 | 2 | 1 | 0 |
| 1 | 0 | 0 | 0 | 1 | 7 | 6 | 5 | 4 | 3 | 2 | 1 | 0 | Memory Address bits 7 through 0 are passed to DCDC. DCDC is to start initialization process. |
| 1 | 0 | 0 | 1 | 0 | 15 | 14 | 13 | 12 | 11 | 10 | 9 | 8 | Memory Address bits 15 through 8 are passed to DCDC with no action on the part of the DCDC. |
| 1 | 0 | 0 | 1 | 1 | X | X | X | X | 19 | 18 | 17 | 16 | Memory Address bits 19 through 16 are passed to DCDC with no action on the part of the DCDC. |

As before mentioned, the addressed memory may be Data Comm Memory $20_m$, Main Memory $100_m$ or local internal memory $20_i$.

After completion of the data transfer, a "Result Word" is formed by the Data Common Disk Controller 70 and is written into memory. The cluster attention needed signal (CAN) is thereafter passed on to the Data Comm Processor 20 and the operation is terminated.

FIG. 11 shows a schematic of the disk subsystem. The basic control interface 60 provides an interface from the Data Comm Processor and the data comm memory to the disk subsystem control DCDC 70. The Data Comm Disk Controller 70 handles two Disk File Exchanges (DFX) shown as $70_{X1}$ and $70_{X2}$. A Disk File Control $70_c$ works with the Data Comm Disk Controller to select and use Disk Files $70_{d1}$ and $70_{d2}$. Failsoft connections are provided to use another disk should one disk system fail.

The Data Comm Disk Controller 70 has three interfaces. These include: the Data Comm Processor Cluster Interface via the Basic Control 60, the memory interface and the interface to the disk subsystem.

The Data Comm Processor Interface is via the basic control interface 60 over to the cluster interface of the Data Comm Processor 20. Data is transferred to the Data Comm Processor in a "CAN" format that is similar to the cluster in operation. Address information for initialization is transferred to the Data Comm Disk Controller 70. Since 20-bits of address are required, then three "writes" to the Data Comm Disk Controller 70 must be furnished by the Data Comm Processor 20 for initialization.

The Memory Interface: the interface from the Data Comm Disk Controller 70 to the memory is via the basic control interface 60. The Data Comm Disk Controller 70 communicates with the memory, similar to normal memory operation by means of the memory bus.

Disk Interface: the Data Comm Disk Controller 70 is provided with the necessary logic to interface with the disk subsystem, as seen in FIG. 11. This interface is organized to handle an information transfer rate of 400,000 8-bit bytes per second.

The Data Comm Disk Controller 70 is initialized from the data comm processor cluster interface via the basic control interface 60. The Data Comm Processor 20 will normally perform three adapter writes which The Data Comm Command Word (DCCW) contains the following elements of disk control information: operator, variant, unit number, and file address.

The Data Comm Address Word (DCAW) contains the following disk control information: word length and an optional data pointer.

The Data Comm Result Word (DCRW) is located at address DCAW plus one.

Data Block: The start of the data block area will be optionally addressed by the data pointer or start immediately after the DCRW and it is of the length defined in the DCAW.

The Data Comm Command Word (excluding the tag field) consists of 48 bits as shown in the following Table XVI.

TABLE XVI

DATA COMM COMMAND WORD (DCCW)

| 51 | 50 | 48 | 47 | | | 0 |
|---|---|---|---|---|---|---|
| P | TAG | | I/O CONTROL INFORMATION | | | |

| 47 | 40 | 39 | 32 | 31 | 24 | 23 | 0 |
|---|---|---|---|---|---|---|---|
| OP | | VAR | | UNIT NO. | | FILE ADDRESS | |

Operation Code Field (47:8)

| OP CODE (43:4) | FUNCTION |
|---|---|
| 0001 | WRITE |
| 0010 | READ |
| 0011 | CHECK |
| 0000 | TEST |

Variant Field (39:8)

This field is a variant of the OP functions. The Variants are specified as follows:

| BIT | FUNCTION |
|---|---|
| 39 | Reserved |
| 38 | Tag Transfer |
| 37 | Maint. Seg. |
| 36 | Reserved |
| 35 | Causes Loading and unloading of internal segment buffer when used with Write and Read OPs respectively. Causes no action on disk. |
| 34 | Protected Write |
| 33 | Causes Address in Data Pointer Section of the DCAW to be used. |
| 32 | Reserved. |

Write Operator

Data is transferred from the addressed memory to the Data Comm Disk Controller 70 as six eight-bit bytes at a time (one memory word). The Data Comm Disk Controller will terminate the Write operation when all data has been transferred to disk and a segment boundary has been noted. If the data is exhausted before the end of a segment, the remaining portion of the segment will be filled with zeroes.

Read Operator

Data is transferred from disk to the Data Comm Disk Controller 70 in eight-bit bytes. The DCDC 70 will accumulate six bytes (one memory word) and then write them into the addressed memory. The Controller will stop data transfer to memory when all data has been transferred and will terminate operation at the end of the segment being read.

The Data Comm Address Word, excluding the tag field, consists of 48 bits as shown in Table XVII.

TABLE XVII

DCAW FORMAT

| 47 | 44 43 | 24 23 | 20 19 | 0 |
|---|---|---|---|---|
| RESERVED | WORD LENGTH | RES. | DATA POINTER | |

BITS (47:4)   Reserved
BITS (43:20)  Word Length - The binary number of words to be transferred.
BITS (23:4)   Reserved
BITS (19:20)  Data Pointer - Optionally points to the first word of the Data Block (used in conjunction with bit 33 of DCCW).

Data Comm    47                                    0
Address Word:  | I/O CONTROL INFORMATION |

Data Comm Result Word Format:

A result word is generated by the control 70 and is written into memory after each operation. The Data Comm Result Word contains a 24-bit "conditions" field and a 20-bit memory address.

The Data Comm Result Word format is shown in Table XVIII together with various conditions signals.

TABLE XVIII

DATA COMM RESULT WORD (DCRW)

| 47 | 24 23 | 20 19 | 0 |
|---|---|---|---|
| CONDITIONS | RES | LAST MEMORY ADDRESS + 1 | |

Conditions Field (47:24)

Conditions reported in the DCRW are as follows:

| BIT POSITION | FUNCTION |
|---|---|
| 24 | Memory Parity Error |
| 25 | Memory Transmission Error |
| 26 | Uncorrected Read Error |
| 27 | Memory Not Ready |
| 28 | Corrected Read Error |
| 29 | Memory Protect Error |
| 30 | Disk Not Ready |
| 31 | Segment Buffer Parity Error |
| 32 | LPC Error |
| 33 | EU Busy |
| 34 | Write Lockout |
| 35 | Timeout |

The Store To Store Controller

As seen in FIG. 1B, the Store to Store Controller 90 constitutes one of the front end controllers which is interfaced to the Data Comm Processor 20 and the Data Comm Memory $20_m$ by means of the Basic Control 60. The Store to Store Controller 90 also has a memory bus which connects to the host system and may thus use the main memory of the host system for transfer and/or relocation of data, as in FIG. 12A.

Since the preferred embodiment of the subject data comm subsystem is made to provide great flexibility in accessibility (by the data comm subsystem) to all the forms of memory available within the overall system, then the memory concept herein can be called a "Data Comm Memory" which is defined to be any memory facility within the system which is utilized by the data comm subsystem primarily for data storage. It is in this regard that the Store to Store Controller is used to enhance the flexibility for use of any and all memory facilities within the entire system.

The Store to Store Controller 90 is used by the Data Comm Processor to transfer blocks of data, one word at a time, as follows:
   (a) Transfers to and from the Data Comm Memory $20_m$. (b) Transfers to and from the system's Main Memory $100_m$.

Once the Store to Store Controller is started or initiated by the Data Comm Processor, the Store to Store Controller performs the required data transfer and thus leaves the Data Comm Processor free to perform other operations. When the Store to Store Controller completes its operation, the Store to Store Controller will then store a Result Word in the data comm memory and it will notify the Data Comm Processor that the operation has been completed. After this the Store to Store Controller will be available to execute another operation.

The Store to Store Controller 90 (FIG. 1B) communicates with the Data Comm Processor 20 and the data comm memory through the basic control interface unit 60.

Figure 19:
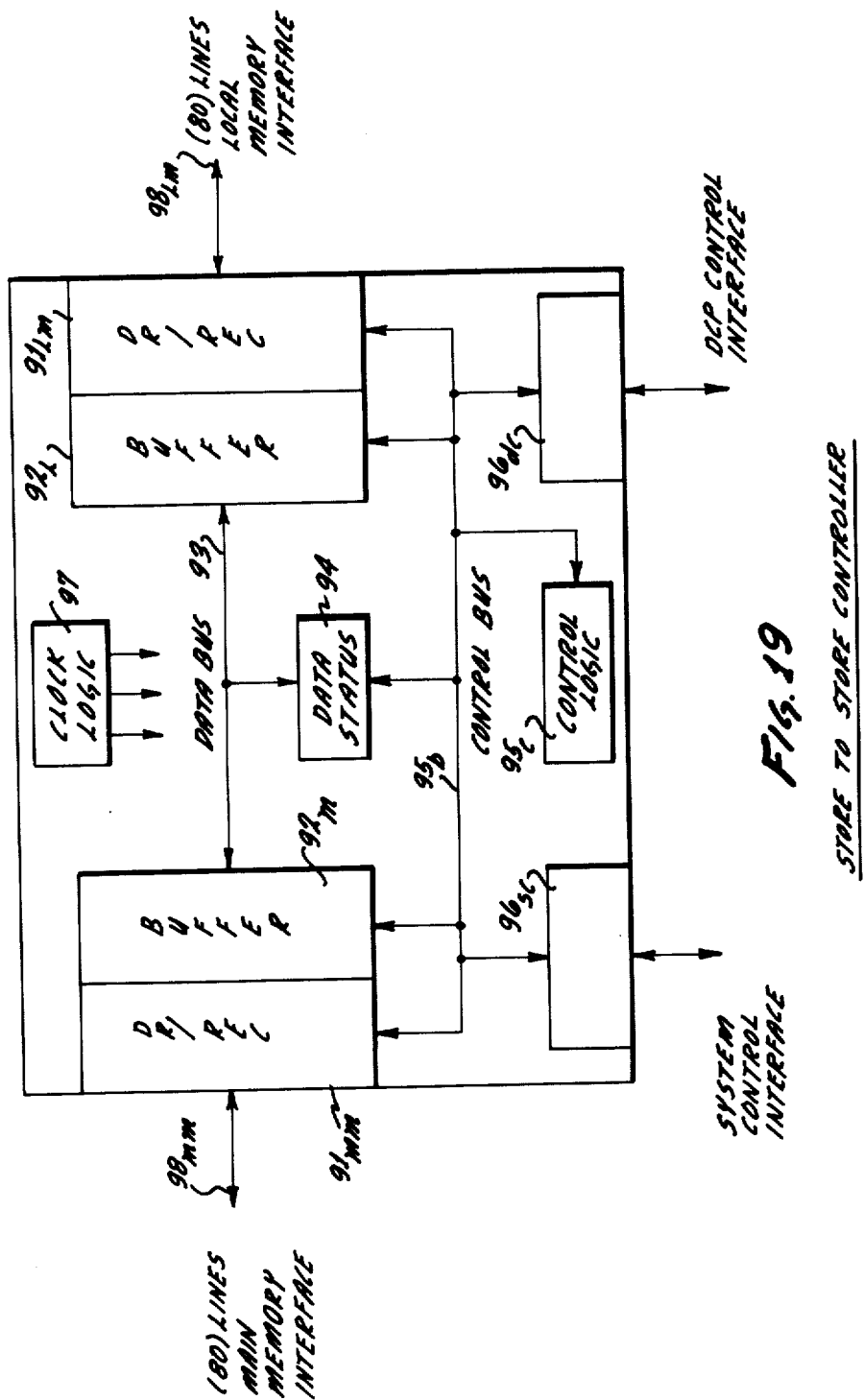
FIG. 19 is a block diagram of the front-end control known as the store-to-store controller.

FIG. 19 indicates a block diagram of major elements of the Store to Store Controller 90. The communication between the Data Comm Processor 20 and the Store to Store Controller 90 is accomplished through the Control Interface $96_{dc}$ of the basic control interface 60.

As seen in FIG. 19, the Store to Store Controller 90 has a main memory interface $98_{mm}$ and a local memory interface $98_{1m}$. Further, there is a main system control interface $96_{sc}$ and a Data Comm Processor control interface $96_{dc}$. The main memory and the local memory interfaces connect to drive-receivers $91_{mm}$ and $91_{1m}$, these driver-receivers having buffers $92_m$ and $92_1$. A data bus 93 connects these buffers to a data status register 94. Likewise, a control bus $95_b$ connects the system control interface $96_{sc}$ and the Data Comm Processor control interface $96_{dc}$ to the driver-receivers, the buffers and to a control logic section $95_c$. A clock logic unit 97 provides clocking for the entire Store to Store Controller 90.

The control interface operates basically as follows:
   (a) The Data Comm Processor 20 sends a 20-bit address (3-bytes) over to the Store to Store Controller 90. This address then points to a data comm control block (in data comm memory) which block contains the parameters to perform a data transfer operation.
   (b) When the data transfer operation is complete, the Store to Store Controller 90 then notifies the Data Comm Processor 20 that the operation is complete. The Data Comm Processor then reads control information from the Store to Store Controller to determine the "result" of that operation.

Referring now to FIG. 6 the memory interface $60_{mi}$ (of the basic control interface unit) is used to establish data paths between the Store to Store Controller 90 and the data comm memory, which may include the Main Memory $100_m$ and Local Memory $20_i$.

As shown in FIG. 5 the data comm memory may consist of a memory $20_i$ directly within the Data Comm Processor 20 and in addition may also be enhanced by a group of memories $20_e$ which are external to but connected to the internal memory of the Data Comm Processor.

Once the Basic Control 60, FIG. 5, has resolved the "requestor" priority and then granted memory access to the Store to Store Controller 90, the memory cycle is then executed by the Store to Store Controller according to the timing and gating rules used on the Main Memory bus $20_b$ (FIG. 5) of the host system.

The main memory interface $98_{mm}$, shown in FIG. 19, provides a data path between the Store to Store Controller 90 and the host system's main memory. This main memory interface $98_{mm}$ operates in conjunction with the host system's memory bus and a multiplexer word interface.

Upon command of the Data Comm Processor 20, the Store to Store Controller 90 initializes the operation by fetching a Data Comm Command Word (DCCW) and a Data Comm Address Word (DCAW). The contents of these words are distributed into hardware registers for execution. The Store to Store Controller then holds the address of the Data Comm Result Word (DCRW) to store "Result" information at the end of the operation.

The Data Comm Processor 20 starts initialization by sending, via the cluster interface, a 20-bit address (3 bytes). Table XIX hereinbelow shows the format for the 3 bytes and also shows a 20-bit pointer (P) which is the data comm memory address of the data comm control block.

TABLE XIX

|  | AC | AI |  |
|---|---|---|---|
|  | 4 3 2 1 0 | 8 7 6 5 4 3 2 1 0 |  |
| (1st CWR) | 1 0 0 1 1 | 0 0 0 0 0 [19:4] | ⎫ |
| (2nd CWR) | 1 0 0 1 0 | 0 - [15:8] ——— | ⎬ Address bits |
| (3rd CWR) | 1 0 0 0 1 | 0 - [ 7:8] ——— | ⎭ |

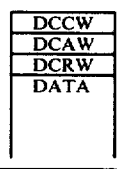

Tables XXA, XXB and XXC respectively show the formats for the Data Comm Control Word, the Data Comm Address Word and the Data Comm Result Word used by the Store to Store Controller.

TABLE XXA

DCCW

| 50 48 | 47 40 | 39 32 | 31 20 | 19 0 |
|---|---|---|---|---|
| TAG | OP | VB | R | MMA |

TAG must = 011
OP must = 001000xx (xx = 1,2,3)
VB = Variant Bits
R = Reserved

TABLE XXA-continued

DCCW

| 50 48 | 47 40 | 39 32 | 31 20 | 19 0 |
|---|---|---|---|---|
| TAG | OP | VB | R | MMA |

MMA = Main Memory Address

TABLE XXB

DCAW

| 50 48 | 47 44 | 43 24 | 23 20 | 19 0 |
|---|---|---|---|---|
| TAG | R | L | R | DCMA |

TAG = not used
R = Reserved
L = Length of op in words
DCMA = Data Comm Memory Address
(if V33 = 1 of DCCW)

TABLE XXC

DCRW

| 50 48 | 47 24 | 23 20 | 19 0 |
|---|---|---|---|
| TAG | Results | R | LDCMA |

TAG = not used
R = Reserved
LDCMA = Last DC Memory Address
Results = 24 - DC Memory Parity Error
25 - DC Memory Transmission Error
26 - DC Memory Uncorrectable Read Error
27 - DC Memory Not Ready
28 - DC Memory Corrected Read Error
29 - DC Memory Protected Write Error
30-31 - Reserved
32 - MM Parity Error
33 - MM Transmission Error
34 - MM Uncorrectable Read Error
35 - MM Not Ready
36 - MM Corrected Read Error
37 - MM Protected Write Error The Store to Store Controller contains logic to execute the following operators:

RDMM—Read from main memory
WRMM—Write to main memory
WRDM—Write data comm memory
RDDM—Read data comm memory When the Store to Store Controller 90 has completed an operation or decides to terminate because of an error, a CAN signal (cluster attention needed) is sent to the Data Comm Processor 20. This CAN signal instructs the Data Comm Processor to read status information from the Store to Store Controller. At the completion of the cluster read, the Store to Store Controller returns to its idle state. The format and bit assignment for this particular status information is shown below in Table XXI.

TABLE XXI

| AC | AI |  |
|---|---|---|
| 4 3 2 1 0 | 8 7 6 5 4 3 2 1 0 |  |
| 0 0 0 1 0 | 0 0 0 0 1 0 0 0 0 | - Invalid DCCW |
| 0 0 0 1 0 | 0 0 0 0 1 0 0 0 1 | - DC Memory Parity Error on CW |
| 0 0 0 1 0 | 0 0 0 0 1 0 0 1 0 | - DC Memory Transmission Error on CW |
| 0 0 0 1 0 | 0 0 0 0 1 0 1 0 0 | - DC Memory Read Error on CW uncorrect |
| 0 0 0 1 0 | 0 0 0 0 1 1 0 0 0 | - DC Memory Not Ready on CW |
| 0 0 0 1 0 | 0 0 0 1 0 0 0 0 0 | - Exception in DCRW |
| 0 0 0 1 0 | 0 0 0 0 0 0 0 0 0 | - No Exception in DCRW |

In summary, the Store to Store Controller provides the data comm subsystem with a direct memory transfer capability between the data comm memory, the host system and the main memory. Operating independently and asynchronously from the system, the Store to Store Controller 90 is used in "autonomous" (self running) data comm subsystems to augment data block transfers to the host systems. Since data integrity has been established in the data comm processor memory, the initiation of subsequent block transfers to main memory allows the Data Comm Processor 20 to perform other operations without continual interruption. Description of the Preferred Embodiment: Adapter Cluster Module In FIG. 20A there is seen a block diagram of the enhanced Adapter Cluster Module 510, which includes an Adapter Service Unit 530, which Adapter Service Unit (ASU) is shown in more detail in FIG. 18.

The enhanced data communications Adapter Cluster Module is a "Front-End Controller" which provides the control means for permitting remote terminals to communicate to and from the Data Communications Subsystem via telephone lines (using data sets) and/or microwave transmission lines. The preferred embodiment allows the connection of up to eight adapters $550_a$–$550_h$ in full-duplex or half-duplex (slow and medium speed) modes. Thus, the enhanced Adapter Cluster Module 510 operates as a "Front-End Controller" in the Data Comm Subsystem and it serves to provide interfaces to various types of modems and direct-connect interfaces.

The enhanced Adapter Cluster Module also interfaces to the host computer system through the Basic Control Unit 60 (as seen in FIGS. 1B and 20A); in addition, however, the ACM 510 may communicate to another computer system through one of its adapters and communications lines. The enhanced Adapter Cluster Module also provides standard protocols in Basic and BDLC (Burroughs Data Link Control) modes at both asynchronous and synchronous line speeds from 300–9600 bits/second.

One major advantage gained by use of the enhanced Adapter Cluster Module 510 in the Data Comm Subsystem is the provision of a specialized communication interface (FIGS. 1B, 4, 12B) which can go directly to DCM (Data Comm Memory) which can thus relieve the "overhead" processing burden away from the Data Communications Processor 20 and thus relieve the many housekeeping functions which generally are handled by the Data Communications Processor. In addition, the ACM relieves or reduces the DCP requirement for a large number of accesses to Main Memory and Data Comm Memory.

As was previously discussed in connection with FIGS. 14, 15A, 15B, 15C, the Adapter Cluster Module 510 operates on a Command Block contained in a Data Comm Memory $20_m$ (FIGS. 1B and 4). This Command Block is prepared by the DCP 20 before initialization of the ACM occurs. The Command, Address and Result Words of FIGS. 15A, 15B and 15C conform to the basic format which is used in the overall enhanced Data Communications System described heretofore.

The Data Comm Processor 20 places Command Blocks in the Data Comm Memory $20_m$. These Command Blocks are accessed by the Adapter Cluster Module 510 through the memory interface of the Basic Control 60 (FIG. 1B). The DCP 20 initializes the ACM 510 by supplying a 20-bit address through the cluster interface (FIG. 6) of the Basic Control 60. The enhanced Adapter Cluster Module 510 stores the Pointer, during execution of a Command Block, in its RAM scratch memory $520_{sm}$ (FIG. 20A).

Command blocks can be "linked" to each other by the "link address" shown in FIG. 14 so that the ACM 510 can begin execution of the next block of commands while a "Result Word" is being serviced for the previous Command Block by the DCP 20. Thus, "linking" allows faster turnaround for the ACM 510 so that it is not dependent on the Data Comm Processor service time.

Since a 20-bit pointer address is used, no absolute areas of Data Comm Memory $20_m$ are required (except for the "fault branch" address of the Data Comm Processor, DCP 20).

The Command Block for the ACM 510 consists of three Control Words (plus a Data area and/or a Header Data area): DCCW, the data Comm Command Word; DCAW, the Data Comm Address Word; DCRW, the Data Comm Result Word; of which these are shown in FIGS. 15A, B, and C. Further, as an example, the Header area which may be provided may contain 0–255 Header bytes, and the Data Block area may typically provide for 0–65,536 bytes (10,923 words).

The DCCW and the DCAW are prepared by the DCP 20 prior to initialization of the ACM 510. Thereafter, the Result Word (DCRW) will contain the results of the control operation. The "Data Area" usually contains text information but can also contain other than text. The "Header Area" is usually allocated to Header or Control information.

The Adapter Cluster Module, ACM 510, is initialized by three DCP "Writes" of a Command Block Pointer by the DCP 20 via the Basic Control Interface Unit 60. The ACM 510, having received the Pointer, will begin operation by reading the DCCW and the DCAW from the Data Comm Memory $20_m$. The ACM 510 then manipulates and stores the two Control Words and initializes the operation according to the OP-code and the variants in the DCCW.

In former systems, the Data Comm Processor handled the "request set" control data and also the control functions. This burden has now been relieved from the DCP and these functions are now done internally within the enhanced Adapter Cluster Module 510. Furthermore, the enhanced Adapter Cluster Module, ACM 510, does polling, selecting, byte manipulation, transmission and reception of data from the remote terminals and from the Data Comm Memory $20_m$.

As soon as a "Word" of data (6 bytes or 48 bits) has been collected by the enhanced Adapter Cluster Module 510, or if the ACM 510 has a "Word" ready for transmission, then immediately the ACM will process this data through the Basic Control 60 and/or the Adapter Service Unit, ASU 530, FIG. 20A.

The enhanced Adapter Cluster Module 510 also provides the functions of controlling data-set leads such as "ready status", turnaround delays, answering, calling, and also disconnect functions, in addition to certain other types of message processing which would normally be done by the Data Comm Processor, DCP 20.

As seen in FIG. 20A, the enhanced Adapter Cluster Module 510 may be designated as composed of two selections. These would be the Central Control Section 540 and the Adapter Service Unit, ASU 530, wherein the ASU 530 includes a series of eight line Adapters $550_a$–$550_h$.

Again referring to FIG. 20A, it will be seen that the Central Control Section 540 has a RAM memory $520_M$.

This RAM is capable of storing two half-words (six bytes) for each of the eight full duplex lines, in addition to storing the necessary control information associated with these lines. This RAM $520_M$ is mapped into three areas: a scratch area of 16 words, addresses of the call-return stack, and the data/instruction area.

On a "Receive" cycle, the ACM 510 will request access to the local Data Comm Memory $20_m$ when any one of eight data word registers has been filled (and when end conditions are encountered) via the input lines of the line Adapters, in order to store the six accumulated bytes in the Data Comm Memory $20_m$. Likewise, when a "transmit word buffer" is emptied (one of eight) on a transmit cycle, the Adapter Cluster 510 will request memory access to read the next data to be transmitted.

The Adapter Cluster Module 510 may preferably be constituted as a controller-processor with means of communication using standard protocols in Basic or BDLC modes at limit speeds from 300-9600 bits per second. The ACM 510 interfaces through the Basic Control interface unit 60 to a large processor (FIG. 1A) such as the Burroughs B 7700/B 6700 /B 6800. Because the ACM 510 has a specialized communication interface directly to DCM $20_m$, FIG. 20A, this results in much less "overhead" for the Data Communications Processor 20.

The ACM 510 permits connection of up to eight full-duplex line adapters operating at slow/medium speeds. The ACM 510 functions as a front-end controller for the message-oriented Data Communications Subsystem. The ACM 510 handles part of the "request set" and the general control functions including byte manipulation, transmission and reception of data from the Data Communications network. Once a "word" of data (six bytes) has been collected or is ready for transmission, the ACM 510 will process the data as required.

The ACM 510 also functions to control data set leads including the ready status, turn-around delays, answering, calling, and the disconnect functions.

The ACM 510 is composed of three major sections called:
 (a) the central control unit (540, FIG. 20A);
 (b) the adapter service unit (530, FIG. 18);
 (c) the line adapters ($550_{a-h}$, FIGS. 18, 20A).

THE ACM 510; GENERAL

The ACM 510 has sufficient RAM scratchpad memory, $520_{m3}$, (32 words of 24 bits per full-duplex line) in order to store two words of six bytes for each of the eight full-duplex lines, along with the required control information. The ACM 510 recognizes the beginning and ending control conditions either by an ending address limit or by control information imbedded in the message. The ACM 510 will process data on a particular line according to a control block stored in the Data Communications Memory $20_m$. Using connections to the Basic Control Unit 60, the ACM 510 may provide interfaces to the Data Communications Processor 20, to Data Communications Memory DCM $20_m$, and the Main Memory $100_m$. Using its Adapter Service Unit 530, the ACM 510 will control any one of eight adapter interfaces shown in FIG. 18.

The ACM 510 is capable of the following functions:
1. It will process message addresses, terminal addresses, limits, special control characters, and other data pertinent to operation of a data communications line.
2. Modem and line control functions include:
   —auto answer
   —dialing
   —ready status timing and checking
   —disconnect
   —turn-around delay
   —data break control functions
   —reverse channel interpretation.
3. Headline error control:
   —vertical parity, even or odd
   —longitudinal parity CRC/BCC generation and checking
   —retry capability in conjunction with DCP 20
   —memory error reporting
   —DCP 20 interface error detection.
4. Bit timing:
   —asynchronous bit timing for selected common asynchronous speeds
   —message turn-around delays programmatically selected.

Referring to FIG. 20D the central control 540 has 1024 words of RAM memory $520_M$ logically split into a data and instruction area $520_{M1}$, a scratch memory area $520_{m3}$, and a stack memory area $520_{m2}$. The RAM memory is 32 bits wide when instructions are used. It is 24 bits wide when data is used.

The Line Adapters: The line adapters of the ACM 510 provide the circuit and control conversion logic to interface various modems and direct connect equipment. The adapters may be "interface" adapters such as $580_a$-$580_h$ of FIG. 18 or may be "control" adapters such as 551-558 of FIG. 18. The interface adapters may be those of the type designated as RS 232 C, direct connect adapters, or telephone direct CBS. The control adapters may be made of UART/USRT or be made of a BDLC multi-protocol LSI chip.

All of the line adapters have full-duplex simultaneous transmission capabilities. Micro-code can be used to select half-duplex mode if required in addition to the full-duplex.

In terms of hardware the ACM 510 may be seen to be logically organized as follows:
1. The central control, CC 540
2. The basic control interface $510_i$ (DCP/memory)
3. Adapter Service unit 530
4. The eight common carrier or direct interfaces, $550_a$-$550_h$.

Central Control 540: A ROM memory adapter controls data transfers to/from the logical elements of the central control 540. The central control ROM $520_{rm}$ and the related logic will store and retrieve bytes and words (48 bits per word) and move them to/from the adapter interface and the basic control interface. Control and data information are stored in the memory $520_M$ for full-duplex control. Data pointers, line addresses, and status information are also stored in the memory $520_M$ during operation.

The ROM control $520_{rm}$ can initiate memory cycles, communicate with the DCP interface through the basic control and also control and communicate to the network. Micro-operators are defined which access and control the central control 540 logic.

Micro-Operators: The ACM 510 central control section 540 is controlled by logical micro-operators stored in ROM $520_{rm}$ of FIG. 20. The ACM 510 uses eight separate operators to perform functions with the data communications processor DCP 20, the memory (DCM $20_m$ or Main Memory $100_m$) and the adapter interfaces.

Each operator is fetched and executed from ROM in one, or two, or five Mhz clock times with one extra clock for fetch and execution from RAM.

Micro-operators can also be fetched and executed from the lower RAM addresses (0-751) for test, maintenance, and for text processing functions. These RAM addresses are normally used to store network definition language (NDL), generated micro-operators which perform the text editing, processing, and controlling functions. It is also possible to load special micro-code into the RAM for execution by the Adapter Cluster Module 510 when temporary or special features are desired.

ACM Return Function: The ACM 510 micro-operators provide a 16 level stack $520_{M2}$ for the sub-routine CALL/RETURN. This feature can be used for the sub-routine entry/return within the micro-code. Bit 24 of the instruction is used to flag the micro-code execution controller that a CALL or a RETURN is needed.

During a RETURN when the return bit is "on" and the instruction is one of the "move type" operators, then following execution of a Move operation, the stack is "popped" and a return is made to the instruction "one" after the Caller and the stack pointer is decremented.

Sixteen levels of "Call/Return" stack are available but it is the micro-coders responsibility to keep track of stack levels and to keep the stack pointer operating properly.

Scratch Addressing: The ACM scratchpad $520_{M3}$ of FIG. 20A is organized into two blocks of 16 words of 24-bits each. Each block is meant to be used for one simplex line, or two blocks for a full-duplex line.

Register Addressing: Each of the registers in the ACM 510 can be addressed via the C-field of FIG. 20B. These registers include the working registers 543-546, the clear stack pointer register $520_p$, the sequencer $540_s$, the top of stack register, the ASU scan register in 592, the write/read adapter registers, the write/read interface adapter, the memory control result register and the tag register. External registers are selected as a SOURCE or as a DESTINATION when the "D" bit [7:1] is equal to one. The clear stack pointer signal bit SPCL sets the stack pointer to 0, but does not alter the contents of the stack. The TOS, or top of stack register gives the contents of the RAM location being pointed at by the stack pointer.

The Adapter Cluster, in its Central Control Section 540, has the job to recognize beginning and ending control data, either by an ending address limit or by control information embedded in the message itself.

As previously stated, a Command Block is stored in Data Comm Memory $20_m$ to provide instructions as to the handling of data coming from or going to a particular line. The Central Control Section 540 can "process" this data. As seen in FIG. 20A, the Adapter Cluster Module has interfaces to the Data Comm Processor 20 and to the Data Comm Memory $20_m$, via Basic Control Interface $510_i$.

The Central Control Section 540 of the Adapter Cluster Module will control any one of eight adapters $550_a$-$550_h$ through the Adapter Service Unit 530. Depending on the characteristics of the data communications line involved, the Central Control Section 540 is capable of the following functions:

(1) By taking directions from the "control blocks" and via DCP commands, the Central Control 540 can execute a poll list until a data "hit" is encountered.

(2) The Central Control 540 will then process message addresses, addresses of terminals, limits to be observed, special control characters, and any other data which is needful to operation of a data communication line.

(3) Control of modems and line control such as: automatic answering, dialing, ready status timing and checking, disconnect, turn-around delay, data break control, reverse channel interpretation.

(4) Control of error situations such as: checking vertical parity (even or odd); longitudinal parity generation and checking; retry possibilities working with the DCP; reporting of memory errors; detection of errors with the DCP interface.

(5) Bit timing functions as: asynchronous bit-timing for selected common asynchronous speed; message turnaround delays programmatically selected by the Central Control 540.

The Line Adapters $550_a$-$550_h$ and the Adapter Service Unit 530 of FIGS. 18 and 20A provide the circuit and control conversion logic to interface to different types of attached modems and also to "direct-connect" equipment. Each of the Adapters 550 will generally consist of two circuit cards which are functionally divided between interface circuitry and bit-to-byte conversion logic.

The Adapters 550 could be divided into various classes or types and the "interface and control" cards can be adjusted accordingly to fit into a standard backplane bus structure. The interface adapters 550 may include such a mix as: an RS232C interface unit; a Direct Connect Adapter; an 801A Auto Call Interface; a Telephone Direct CBS.

These types of adapter cards are used to convert data signals and control signals as between the Data Set, the line, and the Adapter bus (A bus and B bus, FIG. 20A) through which it is necessary to communicate with the Central Control Section 540. The above list of adapters involve "interface" adapters. Other classes of adapters which may be used can be designated "control adapters". These may include: UART/USRT (Universal Asynchronous Receiver Transmitter and Universal Synchronous Receiver Transmitter), and serial-to-parallel conversion using MOS LSI technology.

Each Control Adapter 551-558 (FIG. 18) provides a timer or timers to allow modem and message timing for each individual line. The timer value is set by the Central Control 540 of the enhanced Adapter Cluster Module 510.

All of the line adapters have full duplex (simultaneous transmission) capabilities. However, the simultaneous transmission capability will not be utilized when only half-duplex lines are used.

the Central Control 540 provides for "bit timing" and this can be programmatically selected by the Central Control 540.

Generally, two cards are used for each modem or direct-connection. One card will contain the universal asynchronous receiver transmitter (UART) or a universal synchronous receiver transmitter (UART) MOS chip, and its drivers and control. The second card will generally have the necessary interface reception and transmission logic for interfacing to the networks of terminals.

As seen in FIG. 1B, the Adapter Cluster Module 51 is supported by the Basic Control 60, the Data Comm Processor, DCP 20, the interface adapters 550 (FIG.

20A), the Data Sets or Common Carrier interface units, and associated cabling.

The logical organization is seen in the block diagram of FIG. 20A whereby the ACM 510 involves a Central Control Section 540; a Basic Control Interface 510, (which interface connects to the Data Comm Processor, DCP, and to the DCM, Data Comm Memory); and an Adapter Service Unit 530 including eight common carrier interfaces or adapters 550. The DCP 20 and DCM $20_m$ are functionally independent, but the Interframe Jumpers (FIG. 16A) of the Basic Control 60 provide physical connection.

In FIG. 20A, the Central Control Section 540 provides Working Registers 543, 544, 545, 546 which are used to control data transfers both to and from various logical elements of the Central Control Section 540. The Central Control 540 and its related logic provides for storage and for retrieval of bytes and/or words and will handle the movement of a byte, or even 24 bits (half word) at a time, to and from the Adapter Interface $550_{a-h}$ (FIG. 18), and/or to the Basic Control Interfaces $510_i$. the Central Control can also manipulate bits.

For the control of full duplex (simultaneous 2-way) transmission, the RAM scratch memory $520_{sm}$ stores the necessary control and data information. During the operation of various activity cycles, the scratch memory $520_{sm}$ also stores data pointers, link addresses, and status information.

The Registers 543, 544, 545, 546 could also be denoted as Working Registers, or DCP Interface Register 543 and Memory Data Registers 544, 545, 546.

The logic units of the Central Control Section 540 are motivated and controlled by a set of micro-operators which are placed in Instruction Register 570. These micro-operators are shown in FIG. 20B. Thus, the three Registers 544, 545, 546 can be controlled in order to initiate memory cycles; and Register 543 to communicate with the DCP interface through the Basic Control 60; and to control and communicate to the common carrier network interface through the Adapter Service Unit 530 (using Registers 543, 544, 545, 546).

The logical micro-operators of FIG. 20B are stored in the Instruction Register 570 or in RAM $520_M$. There are eight separate micro-operators shown in FIG. 20B to perform various functions related to the Data Comm Processor (DCP), Data Comm Memory (DCM) and the Adapter Interfaces 550. The Instruction Register 570 of FIG. 20A will be seen to have five sections: OP, A, B, C, D (in FIG. 20B), which shows the relationship between the instructions and micro-operators as they relate to these five sections. FIG. 20C illustrates the OP-codes of the eight micro-operators and their functions as instructions.

Each micro-operator can be executed in one or two clock times (at 5 megahertz), which function is regulated by the Fetch Control $520_f$.

One portion of the RAM memory $520_M$ (the lower RAM addresses) can be used to store yet other extra micro-operators as instructions or as data. These micro-operators can also be fetched and executed for purposes of test and maintenance routines. Further, Random Access Memory $520_M$ can also be loaded with special micro-code which is used for execution by the ACM 510 when the terminal text-editing mode of operation is used by the system software. These special micro-codes will be provided by the Network Definition Language (NDL) as set by compiler definitions. When the special micro-code is used for non-standard situations, all the micro-operators are lengthened by one clock time.

A programmable read only memory (PROM) $520_{rm}$ contains the instruction set for operation of the enhanced Adapter Cluster Module. Further, auxiliary instructions can also be stored in the memory RAM $520_M$. A RAM address multiplexor $520_{mx}$ works in conjunction with a Stack Pointer $520_p$ in order to access data locations in the RAM $520_m$.

A Sequencer $540_s$ works with the programmable PROM $520_{rm}$ in order to step the PROM through its instructional sequences. The Sequencer is also used by the RAM memory address when instructions are executed from RAM $520_M$.

The Fetch Control $520_f$ controls the memory cycles for both the PROM $520_{rm}$ and the $RAM_{520}M$ since the PROM instruction takes only one memory cycle or clock time, while the RAM takes two 5 Mhz clocks.

The Instruction Register 570 receives its code from the PROM $520_{rm}$ or from the RAM $520_M$ for conveyance to either the "A" bus or to the "L" bus (FIG. 20A) which connects this data to the Working Registers 543, 544, 545, 546. Branching can be done either from the PROM $520_{rm}$ to the RAM $520_M$, as well as vice versa, that is, from RAM to PROM.

As seen in FIG. 6, the Adapter Cluster Module 51 (now identified as element 510 in FIG. 20A) is one of the front-end controllers which operates through the Basic Control 60 to DCP 20, to the DCM $20_m$ and the Main Memory $100_m$ via Memory Control $100_c$. As heretofore mentioned, in regard to FIG. 20A, the improved Adapter Cluster Module 510 is made up of two basic portions which are:

(1) Central Control Section 540, (2) Adapter Service Unit 530 which includes line Adapters 550, in addition to the Interfaces to the DCP 20 and DCM $20_m$.

The Central Control Section 540 has sufficient RAM memory $520_M$ to store two half words of six bytes for each of the eight full duplex lines—along with the pertinent control information.

The Central Control Section: An Instruction Register 570 controls data transfer to and from logical elements of the Adapter Cluster Module 510. The Central Control 540 and related logic stores and retrieves bytes and words (24 bits per half word) and moves them to or from the Adapter Interface 550 and the Basic Control Interface $510_i$.

The control and data information is stored in the RAM scratchpad memory $520_{sm}$ for the full duplex control. Data pointers, link addresses, and status information are also stored in scratch memory $520_{sm}$ during operation.

The Central Control 540 can initiate memory cycles, it can communicate with the DCP interface through the Basis Control 60, and can control and communicate to the common carrier network by direct interface. Micro-operators are used which access and control the Central Controller logic.

Micro-Operators: The Central Control Section 540 is controlled by logical micro-operators stored in the read only memory, PROM $520_{rm}$. Eight separate operators are used to perform functions with the Data Comm Processor (DCP), the Memory (DCM) and the Adapter Interfaces. FIGS. 20B and 20C show the eight operators and their format.

Micro-operators can also be fetched and executed from the lower RAM addresses of $520_{sm}$ for test and maintenance functions. It is also possible to load special micro-code into the RAM $520_{sm}$ for execution by the Adapter Cluster Module when unusual non-standard features are desired. It is also possible to set up branching to and/or from the PROM/RAM and vice versa.

The PUSH/POP Move Instruction: A PUSH/POP move instruction is provided which allows the reading or writing of the Top of Program-stack with one of the four move-class instructions (SHMK, MVLB, MVBT, MOVE). This is useful for placing operands on the top of stack prior to calling a subroutine, or for extending use of the stack by placing some of it in temporary registers.

To implement this, the Top of Stack (TOS) is treated as a separate external register (just like the MAR, WR, or DCP) but instead access is to the current Top of the Stack. When the Top of the Stack (TOS) (CCCC 7) is used as a source in the B or C fields, the stack pointer is decremented by one. This type of access is termed a POP. When the Top of Stack is used as a "destination" (in the D field), the stack pointer is "incremented" by one. This is termed a PUSH.

If both the Source and the Destination fields are a 7, the stack pointer will not change. This allows modification of the Top of the Stack without changing the stack pointer in the "one" instruction. When using the MVBT instruction, special rules are followed. The TOS address is in the C field source only. The B field should not be used since POP cannot occur when the B field is used as a Source.

The TOS (Top of Stack) is provided with rules which govern other move-class instructions. One restriction to the use of the Top of Stack is that it may not be used in the BRAN or the BRIN instruction B fields. Also, a PUSH, POP or a PUSH/POP with the RETURN bit ON will cause the stack pointer to be decremented normally as with any other RETURN, but after the PUSH or the POP. If PUSH/POP (no stack pointer change) is used, the RETURN will be to the address just modified on the Top of Stack.

Memory Controller: When the memory controller 574 of FIG. 20A is initiated, a memory cycle will start. CC 540 (of the ACM 510) will then fetch the next instruction while the memory cycle is taking place. If the next instruction attempts to access (Source or Destination) the Word Register (WRL or WRR), the memory address register (MAR) or the memory error register (MERR), then the Adapter Cluster Module Controller will halt until the memory cycle is finished. In this way other program steps which do not depend on memory access can take place during a memory control access.

If a memory error should take place, a memory interrupt will occur when a BRIT, DCPI instruction is expected, and/or the MERR register can be read which will clear the error.

The Adapter Cluster Module 510 has the ability to both Read and Write the data communications memory, DCM $20_m$. This is done by using the B field control option or certain of the ACM instructions.

Referring to FIG. 20A, remote terminals may connect via communication lines, such as telephone lines, to the Adapter Service Unit 530 via the eight line adapters $550_a$–$550_h$. The ASU 530 is provided with a ROM logic unit 531 and micro-controller 532 and a data or holding register 533. A character of information when received by the ASU 530 may then be fed to the byte adjusters 577 and 578, and vice-versa, when information is going in the other direction.

An Arithmetic Logic Unit 579 works in conjunction with an index register $581_a$. The register 581 also includes a special character detection logic unit $581_b$, a translation unit $581_c$ and a shifter $581_d$. The translation unit $581_c$ can provide various types of translation, for example from ASCII to EBCDIC code translation, or vice versa. The special character register section $581_b$ provides means by which certain characters can be detected during operations in order to change the message state in the Central Control Section 540.

The shifter $581_d$ permits the shifting of various bits in a byte in order to select out certain desired bits, such as flag bits, etc.

The Working Registers 543 through 546 provide logic storage for execution of micro-code operations as well as for execution of instructons placed in the scratch memory $520_{sm}$. The Instruction Register 570 has five fields, as illustrated in FIG. 20B, which five fields include the OP, A, B, C, D fields. This Instruction Register 570 is used in conjunction with the Working Registers 543–546 and the memory $520_M$. The Instruction Register 570 has subunits within, which constitute a micro-control unit and a sorce-destination decoder.

Working in conjunction with the Working Registers 543–546 are a number of axuiliary registers. These include a DCP/Memory Control Register 574, a Tag Register and Data Parity Generator 575 and a DCP/Memory Interface 572.

The Fetch Control Logic $520_f$ and Stack Pointer $520_p$ work in conjunction with the multiplexor $520_{mx}$, the Sequencer $540_s$, the Programmable Read Only Memory PROM $520_{rm}$, and with the RAM memory $520_M$ in order to select instructions for the Instruction Register 570, thus to control and operate the Working Registers 543–546.

The Adapter Cluster Module 510 is provided with a Program Timer which is set by the Data Comm Processor 20 with an "AWI" (Adapter Write Immediate) Command. The time value is counted down on each Adapter Timer Drive clock. When the Receive timer or transmit timer expires, an "interrupt" is given to the Central Control Section 540. The Central Control 540 will then cause a CAN signal (DCP interrupt) for that particular line. The interrupt is stored until the Data Comm Processors, DCP 20, services the CAN signal, and after such service is completed, then the timer function is disabled. The timer can also be cleared by a DCP "Write" to the adapter involved.

When it is desired to initialize the Adapter Cluster 510, three timer parameters are set in each line which specify: transmit time out, transmit-to-receive turn-around delay, and message time-out values. The Adapter Cluster Module will use these values at the appropriate time to allow the data set and terminals involved to reverse direction to mute the line, or other desired functions.

There are four "timer field parameters" which can be loaded from the DCP 20 to the Adapter Cluster Module 510 for each specific line involved. These are:

(1) Modem Transmit Delay
(2) Modem Transmit to Receive Delay
(3) Message Time-Out
(4) Program Timer.

The memory control 574 allows the function of "memory protection" on Write operations as a variant feature of the command control words. This prevents the Adapter Cluster Module 510 from over-writing important information in the Data Comm Memory (DCM,$20_m$) or when storing data in the system's Main Memory $100_m$. Results of memory operations are recorded in the Central Control 540 and reported in the "Result Word" at the end of a Command Block operation. Any unusual memory errors are reported directly to the Data Comm Processor, DCP 20, via the Basic Control/DCP interface $510_i$.

In regard to the memory interface $510_i$ between the Adapter Cluster Module 510 and the Basic Control 60, the Adapted Cluster Module conforms to match the requirements of the Basic Control 60. A request for memory access is made and, when granted, data (including Tag bits 48, 49, 50 and parity bit 51) is moved to or from a 48-bit data register in the Adapter Cluster Module 510. Tag bits are not checked except when the Data Comm Command Word is read at Command Block initialization time. In case of malfunction, the following errors are reported:

(1) Memory parity error
(2) Transmission error
(3) Uncorrectable error
(4) Memory not ready
(5) Memory error corrected
(6) Memory protect error.

Data Comm Processor Interface: The Adapter Cluster Module 510 is capable of giving a CAN (interrupt) signal for an intended DCP "Read" operation. The Data Comm Processor, DCP 20, upon detecting the CAN signal, will subsequently read information from the Central Control 540 of the Adapter Cluster Module 510. Odd parity is generated on the 18 bidirectional signal lines by the Central Control.

The Adapter Cluster Module 510 responds to DCP "Write" signals and it stores the information into the Working "DCP Interface" Register 543 and optionally checks odd parity on the 18 bidirectional signal lines. If an error occurs, the Central Control 540 will indicate the error condition by making the PERR signal "true" during ACG (Access Gating) time.

The Adapter Cluster Module 510 will respond to "Interrogate" Commands from the DCP 20. Certain Central Control registers can be interrogated and written into by the DCP for testing and control operations. Parity is tested during the "Write" portion of the "Interrogate".

Protocols: The Adapter Cluster Module 510 operates in three basic line protocol modes. These are: BDLC (Burroughs Data Link Control procedures), the BLC (Basic Line Control procedures), and RJE (Remote Job Entry).

Basic Mode Format: The basic mode formate operates in a data transfer moe. Data is moved to or from the header area until the byte count limit is reached. Recognition of special characters in the header area is performed by the special character detector $581_b$ in the Adapter Cluster Module 510 of FIG. 20A. In Basic mode on "Receive", a predefined character such as STX (Start of Transmission) will cause subsequent data to be stored in the date area when the variant bit (33.1) of DCCW is set. If not set, data will be stored until the header byte limit is reached or the Ending Condition is met. The Adapter Cluster Module 510 also uses its micro-program to perform some of the line procedure functions.

The Adapter Service Unit (ASU) 530, seen in FIGS. 20A and 18, multiplexes eight interface or Line Adapters $550_a$–$550_h$. The Adapter Service Unit is connected to the Central Control Unit 540 via the data buses (A bus, L bus, B bus, I bus).

The Adapter Service Unit 530 (FIG. 18) also provides a real time check 590 to provide timing for the asynchronous lines and timers. The ASU 530 has the purpose of providing special timing and logic circuits for the various Line Adapters, and the ASU is composed of an Adapter Scan Selector 592, ASU Service Control 532, ASU Gating 596, including Bus drivers, holding Register 533, the Real Time Clock 590, and Data Set Interface signals and control.

Adapter Selector: The Adapter Scan Selector 592 (FIG. 18) can accept "Interrupts" or attention signals from the eight adapters on the "service" bus A or B. When attention is needed, the Adapter Selector 592 scans the adapters in sequence and latches on to the requesting adapter through the Adapter Service Unit Bus (ADP A and ADP B). The Central Control 540 (FIG. 20A) enables the Adapter Selector 592 via the "L" bus. Either automatic scanning or programmable scanning (via codes in PROM $520_{rm}$) can be accomplished by the Central Control 540 in this way. The automatic scanning via the hardware is such that only the installed adapters are scanned, thus saving scanning time. For example, if only two adapters were installed, then the hardware would scan only these two units and not be involved in scanning all of the eight possible adapter positions.

Once the latch condition is obtained, the Central Control 540 of FIG. 20A is notified, by its interrupt structure, that adapter service is needed. The Adapter Selector 592 then provides a three-bit address to the Central Control 540 for handling the adapter being serviced. This vector is used to index the memory $520_M$ for parameters pertaining to that particular line. ASU Gating Logic 596 brings data, via B bus, to the Adapters 550 and sends data from the Adapters via the A bus. (Bytes can also be inverted through this unit 596 under control of the L bus).

When the Central Control 540 (FIG. 20A) writes or interrogates the Adapter 550 (selected one of eight), the line selector address is determined by the DCP/Cluster Interface or special micro-code from the Adapter 550. A byte can be transmitted or an "interrogate" operation can be performed to read "status information" from the Adapter. The six control lines of the L bus select the function which the Adapter is to perform and they provide data control for the information bus. At "interrupt" time, the control leads (of I bus) specify the type of interrupt. During the interrupt time, the I bus contains the index value of the interrupt which is stored in Index Register $581_a$. The L bus and I bus from Adapter Cluster Module 510 (FIG. 20A) enter the Adapter Service Unit 530 via an ASU Service Control Unit 532 (FIG. 18).

Real Time Clock: A real time clock generator 590 will generate bit timing clocks for the asynchronous data comm lines. The clock provides a timing signal to each Adapter 550 for Program Timer and bit timing functions.

Cyclic Redundancy Check Controller: A CRC control ($593_a$–$593_h$) is provided for each of the eight Adapters 550. Once eight bits are read out from an Adapter, then CRC generations are accomplished at a high speed in the CRC controller. The CRC is generated and stored in the Adapter itself. The CRC generation type is selected by hardware option or micro-code. The micro-code of the Central Control 540 can test the "transmitted" or "received" byte to decide if CRC generation is appropriate as bytes are processed. It is also possible to generate CRC by using micro-code from the Adapter Cluster Central Control. Block check or LPC (eight bit) generation is provided by micro-operators in the Central Control 540.

The Adapter Service Control 532 and the Holding Register 533 for the Adapters 550 are capable of driving each of the eight adapters and also conveying information to the Central Control 540 which can thus move the information to the DCP/memory interface. The enhanced Adapter Cluster 510 of FIG. 20A has data paths from the Adapter Service Unit 530 to the memory 520$_M$ or to the Working Registers (543-546) or to the DCP/Memory interface via the Basic Control Interface 510$_i$.

There are a number of buses which operate with the Adapter Service Unit 530 of FIG. 18. For example, there are a series of eight adapter attention lines which are unique to each Adapter and which provide the adapter "Interrupt" signal to the Adapter Service Unit 530. Likewise, a similar set (B bus) of "adapter select lines", eight in number, are unique to each adapter and these provide a line from the ASU 530 over to each adapter for selection of an adapter by the ASU 530.

In FIG. 18, another group of eight lines, 593, are called the "adapter clock" lines which are unique timing signals going from the ASU 530 to each Adapter 550 for providing the "asynchronous" mode. The Adapter is itself provided with a baud rate generator for speed selection.

There is an Adapter A bus composed of eight individual lines from the individual Adapters 550 over to the Central Control 540 via Gating Logic 596. Also, there is the Adapter B bus which receives data and control signals from the Gating Logic 596 for conveyance to Adapter Controllers 551-558.

In FIG. 20B, it was noted that the micro-operators have five fields—OP, A, B, C, D. The OP and A fields contain the operations (OP) codes. The B field contains control information, literal information or source address information.

Literals consist of eight bits which are placed on the "L" bus to the eight bit lower portion of the Arithmetic Logic Unit, ALU 579 (FIG. 20A). Control field information is used to control DCP Memory, and Adapter Service Unit interfaces. The B and C fields (FIG. 20B) are used for "source" addressing and the D field for "destination" field addressing.

In FIG. 18, a line designated "SORS" is used whereby a specific adapter holding data register 533 (FIG. 20A) is selected as a "source" (of data to be transferred) and there is a signal line designated DEST used to select the B bus to convey data to an addressed adapter (one of eight in 550$_a$–550$_h$) as a "destination".

In FIG. 18, a set of three lines designated ABROW is used to select a register of the adapter as a "source"; further, another group of three lines designated BBROW is used whereby its decoded value selects a register of the adapter as a "destination".

The B bus provides eight individual lines which are information lines to an Adapter whereby the selected Adapter accepts information from the Central Control 540. The particular register selected is determined by the decoded value of the three lines designated BBROWn. The A bus (eight lines) carries information from a selected adapter to the Central Control 540.

A group of eight lines are designated as the L bus. These lines go from the Central Control 540 to the ASU 530. The I bus consists of eight lines which carry control information from the selected Adapter to the Central Control 540 to specify the type of "interrupt" by an index value.

There is one group of three lines designated ASUAD (not shown) which constitute address lines from the ASU of an Adapter 550 for line control interrupt addressing. Likewise, there is a group of three ASUAD (ASU address) lines to the Adapters 550 via an ASU address register to select an adapter. This provides "Rapid Context" switching. When an ASU 530 "interrupt" is serviced, an auto-index of the adapter address is placed in the AA register 543 (FIG. 20A) for subsequent signaling of the DCP. This helps to speed servicing of ASU "interrupts" and automatic addressing of memory 520$_M$.

The following types of adapters may be used in the enhanced Adapter Cluster Module 510. Each adapter has two parts of cards. One card provides the control functions and the other interface capability (580$_a$–580$_g$) to the data set line.

The types of Adapters 550 which can be used are:
(1) Asynchronous conrol adapter
(2) Synchronous control adapter
(3) BDLC-Sync control adapter
(4) Auto Call adapter
(5) RS232/CCITTV.24 Interface adapter
(6) Direct disconnect interface adapter
(7) DDS/DSU.

Operation: Operationally, the Adapter Cluster Module 510 of FIG. 20A is initiated from the Data Comm Processor, DCP 20, by the "writing" of a Command Block pointer into a Pointer Register of memory 520$_M$, FIG. 20A. The Adapter Cluster Module, ACM 510, then reads two words of the three-word Command Block from the Data Comm Memory 20$_m$. The control words of the Common Block were previously stored and assigned in the Data Comm Memory 20$_m$ by the Data Comm Processor DCP 20. Upon reading the two words (Data Comm Command Word, DCCW, and the Data Comm Address Word, DCAW), the ACM 510 will then begin operation as specified by the operation field and the variant field of the Data Comm Command Word, DCCW (see FIG. 14).

The Adapter Cluster Module, ACM 510, alternately has another method of initialization of a Command Block by means of a "linking" from one Command Block to another. The Command Pointer is contained in the previous block to the next-used block. This linking mechanism provides The ACM 510 with a feature which greatly reduces the overhead in the Data Comm Processor, DCP 20. The "linking" is specified by a variant bit in the Data Comm Command Word, DCCW. (See FIG. 14, AC Command Block).

The Data Pointer Variant bit can be used when a text portion of a message is separated from the contiguous memory area of the Command Block. When this particular option is utilized, words of memory following the Command Block can be used to store header information. Up to 255 bytes of header can be transmitted and received from this data area following the Command Words. The number of header bytes are specified by the software in the Command Words.

As seen in FIG. 18, the adapter service unit 530 is connected to eight adapters 550$_a$–550$_h$. These adapters are connected via a data set and telephone lines to remote terminals $RT_1$–$RT_8$. Since these remote terminals operate at different baud rates (and thus operate at different clocking rates) the adapter service unit 530 has a real time clock 590 having eight outputs, one for each of the adapters 550 in order to provide the correct timing period for each individual adapter and its remote terminal.

Under the prior art system using earlier types of adapter cluster units, when a remote terminal, RT, transferred a byte of data to its own associated adapter, it was necessary for the adapter to then interrupt the controller to get instructions on what to do with the byte of information that was just received. In the present improved system, the adapter service unit 530 is provided with universal asynchronous and synchronous receiver-transmitters (UART, USART) which will build a complete "byte" (six bits) in each adapter; after each adapter has a full byte then an interrupt will be sent to the central control 550 (FIG. 20A) in order to process and to accumulate a complete message of 48 bits. This will continue until a message has been accumulated, and only then the Data Communications Processor 20 will be interrupted for instructions regarding the transfer of this message block of information into the main memory $100_m$. Thus, there is eliminated the large quantity of overhead which would normally be required in interrupting the Data Communications Processor 20 each time a single byte of information was transferred from a remote terminal (RT) into one of the eight adapter units 550.

When the adapter unit, such as $580_a$ of FIG. 18, has accumulated (in its holding register 533) a complete "byte" of information, then the adapter service unit ASU 530 sends an interrupt signal on the I-bus to indicate that a byte of information is ready. Upon such interruption, the operation sign in the central control 540 contained in ROM $520_M$ (which is operated by the fetch control $520_f$, FIG. 20A) will then provide instruction routines via instruction register 570 (FIG. 20A) for the transfer of the "byte" in the adapter holding register 533 (FIG. 18).

These instructions will take the accumulated byte and transfer it to the scratchpad memory $520_{M3}$. Once the scratchpad memory has the information, it will be processed into a message format. Once a complete message is compiled, it may be transferred to the data communications memory DCM $20_m$ via the memory inerface or to the Data Communications Processor 20 via the DCP interface.

In a reverse fashion, the Data Communications Processor 20 can send an interrupt signal to the central control 540 (FIG. 20A) with the message that data is going to be transferred from the data communications memory DCM 20 $_m$ into the central control 540 for eventual transfer to a remote terminal, such as $RT_1$.

The ROM $520_{rm}$ is actually a burned PROM. It has been burned in a micro-computer storage.

In FIGS. 20B and 20C there is seen the instruction set micro-operators for the ROM $520_{rm}$. For example, a micro-operator "branch-on-condition" will respond to an interrupt "condition" which calls up a special routine. Then the central control 540 will branch to another area of code supplied by the ROM $520_{rm}$ which will proceed to service the interrupt request depending on the "type" of interrupt. For example, if the interrupt was requested by the adapter 550 it will be recognized as such and the program will unload the accumulated "byte" of information from the adapter service unit 530 into one of the working registers 545, 546, after which this "byte" of information may be stored in the scratchpad memory $520_{M3}$. Thus, the scratchpad memory $520_{M3}$ (which has an area dedicated for each individual adapter) will have its dedicated memory section loaded up with additional bytes until an accumulation of a full message block is accomplished in the scratchpad memory $520_{M3}$. Once a message block of data is accumulated in a dedicated portion of the scratchpad memory $520_{M3}$, then the central control section 540 will load this information (to the working registers 545, 546) for transmittal to the data communications memory DCM $20_m$. The central control 540 also provides other handling features such as: translation of messsage form from ASCII into EBCDIC (or vice versa), or checking for "control characters" such as EOT (end of text) character or other control characters at the same time.

Another versatile feature of the improved Adapter Cluster Module is that new program routines may be loaded for use into certain areas of the memory RAM $520_M$; in addition, the ROM $520_{rm}$ has already been filled with program routines. Each time an instruction is selected by the fetch control $520_f$ and the sequencer $540_s$ (FIG. 20A), the instruction is placed in the instruction 570 for subsequent instruction. The fetch control $520_f$ brings up the next instruction, loads it into the instruction register 570 from either the RAM memory $520_M$ or from the ROM $520_{rm}$.

As seen in FIG. 20A, the instruction register 570 includes a source (SORS) decode and a destination (DEST) decode signal which are used to specify a "source" of data to be handled and a "destination" where this data is to be placed or sent. The "source" and the "destination" are registers which can be identified and located as either a source or a destination. Thus, for example, the data in particular location (such as working register 543 or 544 or 545 or 546) may be specified as a "source" or a starting point of data which is to be transferred to a "destination" which may, for example, be another working register or, for example, the scratch memory $520_{M3}$. Similarly, the "source" could be one of the working registers and the "destination" could be another working register (or the scratch memory $520_{M3}$ or some such register).

This means that the next instruction is going to take the "byte" of information specified as the "source 38 and is going to perform a transfer or other function (translate, add, subtract, shift) and route it through the arithmetic logic unit 579 to some other "destination". It is also possible that the source and destination locations could be the same except for the fact that the source information is processed (for example, translated or manipulated in some way) and then returned to the same location as a "destination".

In FIG. 20A, the sequencer $540_s$ provides addressing circuitry to the memory RAM $520_M$, and to the ROM $520_{rm}$. A stack pointer $520_p$ is used to keep track of the return addresses which will be used where a subroutine has been called and executed; once this subroutine has been completed, the stack pointer will provide the address which will return the program to its point of origin.

The RAM address multiplexor $520_{mx}$ provides for selection of various source addressing. Dependent upon the source chosen, direct addressing may be used or vectored addressing may be used. Also, the stack pointer word register left [11:12] or the instruction register 570 can be a source or a destination.

The working register 543 (similar to the Data Communications Processor 20) provides an adapter address for the scratchpad memory $520_{M3}$; register AA which designates the line adapter 550 scratch being serviced or handled; the AC or adapter control register holds control information which describes the type of information received from the DCP in a given DCP write or read command as to whether it is (a) data information or (b) control information; while the AI register is the DCP information register which indicates the type of information on the DCP interface, as interface $580_a$ of FIG. 18. Using the DCP interface line of FIG. 20A, the information in the AA, AC, AI registers can be provided either from the DCP 20 or to the DCP 20 (via the Basic Control 60).

Thus, if the central control 540 is servicing, for example, adapter No. 2 ($550_b$ of FIG. 18), the RAM address multiplexor $520_{mx}$ (FIG. 20A) will only address that area of scratch memory $520_{M3}$ which is applicable to adapter No. 2 ($550_b$).

The L-bus (FIGS. 18, 20A) is the "literal" bus carrier which provides the B field of FIG. 20B. As an example, if a particular value is desired to be added to one of the registers, as for example, one of the working registers 543–546, then the program would specify a specific working register as a "source"; the data from there would be taken and passed through the arithmetic logic unit 579 and the "literal" field would be added or subtracted to the data and returned back to the working register as "destination".

It should be noted in regard to the A-bus and B-bus that "source" information comes "out of" a register on the A-bus and goes "into" a register on the B-bus to its "destination".

The A-bus is the bus that brings data into the ALU-579 from the working registers 543–546 via the bus register $540_g$ and the byte adjuster 577. The byte adjuster can move, for example, a low order byte to a higher order byte position or vice versa. This is necessary when doing message formatting since bytes from and to the adapters are always transferred as bits [7:8] or the low order byte. The B-bus carries output data from the ALU 579 and brings it back to the working registers 543–546.

The interrupt bus, or I-bus, carries the interrupt vector signal which will be used to access the ROM $520_{rm}$ (or the RAM scratchpad $520_{M3}$) in order to call up an operating routine which is appropriate, depending upon whether the interrupt is from the Data Communications Processor 20 or from a selected one of the adaptors 550.

The DCP memory interrupt circuit 572 provides circuitry for the central control 540 to interrupt the Data Communications Processor 20, or alternatively, for the Data Communications Processor 20 to interrupt the central control 540 or the memory error interrupt line.

The central control unit 540 of the improved Adapter Cluster Module 510 essentially acts as a front-end controller processor which will handle the information exchange between the remote terminals and the adapter service unit 530 and process it with a minimal amount of interruption to the Data Communications Processor 20. All of the handling of photocols, specialized timing, specialized character recognition, translation, bit transfer, etc. is all handled locally and internally within the Adapter Cluster Module 510, and only when a message block is fully completed will there be any interruption of the Data Communications Processor 20 in order to transfer a message block of information to the Data Communications Memory $20_m$ or to Main Memory $100_m$.

Thus, in the prior arts use of line adapters with a central processor or a Data Communications Processor, it was necessary that all the "overhead" (specialized timing for each remote terminal, recognition of specialized control characters, interruption of central processor or Data Communications Processor after each "byte" was transferred, etc.) was continuously being imposed upon the central processor or "Data Communications Processor", thus tying it up and keeping it from accomplishing its control activities with other front-end controllers in the subsystem.

In the present usage of the improved Adapter Cluster Module, together with the improved Data Communications Subsystem, the overburden of handling of overhead is no longer the case since the Adapter Cluster Module 510 acts as an independent front-end processor-controller which relieves the Data Communications Processor from having to give its attention to each byte being transferred; and the Data Communications Processor does not have to be used until a complete message block has been accumulated, at which time the entire message block can be transferred to or from the Data Communications Memory $20_m$ or to/from Main Memory $100_m$.

The DCP memory control 574 provides for addressing of the Data Communications Memory DCM $20_m$, whereby information can be transferred from working registers 545, 546 along the memory information line to the Data Communications Memory $20_m$. The memory address register 544 provides the memory addresses to the Data Communications Memory Control 574.

The ASU service control 532 of FIG. 18 is basically a mini-processor and a micro-controller which has its own internal-control ROMs. The ASU scan selector or "scanner" 592 is a rotational scanner which is used for selecting one of the eight different adapters $550_a$–$550_h$ for servicing. It should be noted that the scanner scans only within the ASU which speeds the scanning rate and allows faster servicing when fewer adapters are used.

Each interface adapter 550 is provided with a cyclic redundancy control chip (CRC $593_a$–$593_h$) which is used for error correction. The ASU service micro-control 532 has a special routine in its ROMs which can shift information out of the adapter 550 and do a CRC check on it in order to validate the integrity of the data.

Looking at the operative flows in an opposite direction, there are situations where it is desirable that message blocks of data in DCM $20_m$ be sent out via a specific adapter 550 to a remote terminal $RT_x$ over the telephone lines. Briefly, this would be handled whereby the Data Communications Processor 20 would send an interrupt signal to the central control 540 to indicate that there is information to be transferred. The Data Communications Processor 20 would provide an address along with the interrupt signal, of where this information block is to go. Then the Data Communications Processor 20 would cause the necessary data to be retrieved from DCM $20_m$.

The Data Communications Processor 20 would address the Data Communications Memory $20_m$ and start retrieving or accessing the information and transmit it along the DCP interface line (FIG. 20A) into the working registers 543–546 and the scratchpad $520_{M3}$. Once a message word of information is in the working registers, it is then manipulated by the central control 540 and sent to the proper adapter 550, one byte at a time. The instructions would specify that one byte of information be written into the ASU service unit 530 of FIG. 20A. This byte would eventually be transferred into the holding register 533 (FIG. 18), then into the addressed line adapter holding the register (in parallel fashion) after which the line adapter 550 would convert it into a serial transmission mode for transmission to the remote terminal RT.

The working registers of 543 (AA, AC, AI or DCP$_n$, FIG. 20A) would provide the address and control information for this data to be transferred to an addressed adapter for further transfer to a particular remote terminal, RT. Another feature provided is an index-register 581$_a$ which can be used to append or to add an index value to a base address in order to provide relative base addressing.

As previously stated, any special handling or program routines which are not normally found in the ROM 520$_{rm}$ can be loaded by the Data Communications Processor 20 into the scratchpad RAM 520$_{M3}$.

In FIG. 20B it will be seen that bits 27, 26, 25 constitute the A-field. The functions involved in this A-field are shown in FIG. 20C where a coded signal of three bits (AAA) are used to differentiate the various kinds of operators providing the various types of commands used.

An improved Adapter Cluster Module for use with a data communications subsystem has been described for operation within a data communications network having a single or plurality of host computers and main memory. A plurality of Data Comm Processors relieve the loading on the main system by monitoring and controlling the operations of data transfers in the network. By enhancing the Data Comm Processor with a special group of front-end controllers, the overall system efficiency and rate of message transmission can be increased by a number of magnitudes. Thus, with the use of an improved Adapter Cluster Module as one of the front-end controllers for handling communications to remote terminals along low to medium speed communicaton lines, the capacity for data handling and throughput along communication lines to remote terminals can be considerably enhanced since a great deal of the load on the individual Data Comm Processors and Main Memory has been eliminated by making the Adapter Cluster Module work independently of the Data Communications Processor; and whereby the Adapter Cluster Module can store and access the local Data Communications Memory without attention from the Data Comm Processor; also the Adapter Cluster Module can process and handle data transmissions/receptions to remote terminals without need for attention from the Data Communications Processor. The Adapter Cluster Module has inbuilt features for maintaining and processing its own program, for handling various protocols, for translation of various digital codes from one form to another, for selecting, dialing, calling and answering communication lines with remote terminals, in addition to a number of special functions including automatic indexing of data operations on any given communication line by always being internally aware of any incomplete status on any selected communication line so that it may be picked up at the proper point and continued for further data transmission/reception operations.

While the principles of the invention have been illustrated in a preferred embodiment, there will obviously be various modifications in structure, arrangement and components used in the practice of the invention which are particularly adapted for specific environments and operating requirements without departing from the principles of the invention. The amended claims are thus intended to define the scope of the invention and cover any equivalent embodiments.

What is claimed is:

1. In a data communications network having a plurality of peripheral terminals connected via transmission lines to a central station, wherein said central station includes a main host system having a host processor and main memory, said main host system connecting to a data communications subsystem dedicated to the handling of data transfer operations, said data communications subsystem including a data communications processor, a local autonomous data communications memory and a plurality of front-end controllers including an improved adapter cluster module front-end controller-processor which connects to a plurality of remote peripheral terminals via line adapters, an improved data communications subsystem including said improved adapter cluster module comprising:

(a) a data communications processor connected to said main host system for providing pointer addresses and instructions to be accessed by each of said front-end controllers associated with the data communications subsystem and wherein said data communications processor includes:
  (a1) means to sense a halt or failure in said main host system and;
  (a2) means to initiate continuous autonomous operation of said data communications subsystem independently of said main host system during any period when said main host system is inoperative;

(b) a plurality of specialized front-end controllers for executing data transfer operations for different speed and line disciplines of transmission lines to peripheral terminals, each of said front-end controllers capable of accessing instructions from addresses in main memory or addresses inlocal autonomous data communications memory, said addresses being provided by said data communications processor;

(c) a basic control interface providing control and communication exchange between: said data communications processor, said local autonomous data communications memory and said front-end controllers;

(d) a local autonomously operating data communications memory directly accessible to said data communications processor and each of said front-end controllers;

(e) a command block in local data communications memory for providing instructions, control and information data for each individual front-end controller;

(f) an improved adapter cluster module front-end controller-processor including:
  (f1) a plurality of line adapters each one of which is connected via transmission lines to a separate remote peripheral terminal, said line adapters being controlled by a central control means;
  (f2) a central control means including:

(f2a) ROM memory means for storing data transfer program routines;

(f2b) RAM memory means for temporary storage of data received from remote peripheral terminals or for temporary storage of data ready for transmittal to said remote peripheral terminals, said RAM memory including dedicated storage areas for each specific line adapter connected to a remote terminal, said RAM memory also including memory space for temporary storage of specialized routines as directed by said data communications processor;

(f2c) processing means for processing instructions fetched from said ROM and/or said RAM memory means;

(f2d) a plurality of working registers for the storage of addresses, instructions and data which is to be transmitted and/or processed either to/from said remote peripheral terminals or to/from said data communications memory.

2. The improved data communications subsystem having said improved adapter cluster module of claim 1 wherein said improved adapter cluster module front-end controller-processor further includes:

(g) means in said RAM memory means for the accumulation of eight bytes of data to form a full message block;

(h) means to sense the accumulation of a full message block in said RAM memory means, and to signal an interrupt to said data communications processor only after a full message block has been accumulated.

3. The improved data communications subsystem including said improved adapter cluster module of claim 2 wherein:

said RAM memory means provides temporary storage for specialized programs suitable for newly added non-standard remote terminals and line adapters.

4. The improved data communications subsystem including said improved adapter cluster module of claim 2 wherein said ROM memory means is connected on a plug-in non-fixed basis wherein it may be easily replaced with another programmed ROM memory means having other desired program routines.

5. The improved data communications subsystem including said improved adapter cluster module of claim 2 wherein each of said adapter cluster module front-end controller-processors can control data transfers along eight transmission lines on a full-duplex basis.

6. The improved data communications subsystem including said improved adapter cluster module of claim 2 wherein one data communications processor and one local autonomous data communications memory may control the operations of up to 16 adapter cluster module front-end controller-processors in order to provide full-duplex operation on 128 transmission lines to remote terminals.

7. The improved data communications subsystem of claim 1 wherein said improved adapter cluster module front-end controller-processor includes:

(i) means to sense specialized control characters indicating the end of a transmitted text before any interrupt signal is sent to said data communications processor.

8. The improved data communications subsystem including said improved adapter cluster module of claim 1 wherein each of said plurality of line adapters includes:

(f1a) adapter control circuitry for the input of information-data from said data communications memory via said central control means and an output bus for the output of data received from a remote terminal associated with each of said line adapters;

(f1b) a cyclic redundancy checker for detecting errors in any bit of data received from said remote terminal;

(f1c) an interface connecting each of said line adapters to a telephone data set.

9. The improved data communications subsystem including said improved adapter cluster module of claim 1 wherein said adapter cluster module front-end controller-processor further includes:

(g) an adapter service unit connected to said plurality of line adapters, said adapter service unit including:

(g1) scan selection means connected to said central control means for selecting a particular adapter to be serviced;

(g2) gating logic means for connecting any selected line adapter to said central control means;

(g3) a micro-control processor connected to: said central control means, said gating logic means, and to a realtime clock for regulating the serial bit flow-rate in the transfer of data to and from the said remote terminal;

(g4) a holding register for buffering data transfers to/from said remote terminals;

(g5) a real-time clock for providing designated baud rate timing periods for each of said line adapters.

10. In a data communications subsystem connected as an operating part of a main host computer system having a central processor and main memory, and wherein said data communications subsystem includes a data communications processor and a local autonomous data communications memory both connected through a common interface to a plurality of frontend controllers which are controlled by said data communications processor wherein said data communications subsystem can operate autonomously and independently of the main system during any period when the main system is halted, an improved front-end controller designated as an adapter cluster module for relieving the overhead operations which would normally be required of the said data communications processor during data transfer operations between said adapter cluster module and a plurality of remote peripheral terminals connected thereto on low/medium speed transmission lines, said adapter cluster module comprising:

(a) a plurality of line adapters, each line adapter connected via a dedicated transmission line to a separate remote peripheral terminal, each of said line adapters including:

(a1) adapter control circuitry for the input of information data from a data communications memory via a central control unit, and an output bus for the output of data received from an associated remote terminal;

(a2) a cyclic redundancy checker for correcting bits of data received from said remote terminal;

(a3) an interface connecting said line adapter to a telephone data set;

(b) an adapter service unit connected to said plurality of line adapters, said adapter service unit including:

(b1) scan selection means connected to a central control means for selecting a particular adapter to be serviced;

(b2) gating logic means for connecting any selected line adapter to a central control means;

(b3) a micro-control processor connected to: said central control means, to said gating logic, to said adapter control circuitry and to a real-time clock for regulating the serial bit flow in the transfer of data between the remote terminal, its line adapter and a holding register in said adapter service unit;

(b4) a holding register for buffering data transfer to/from remote terminals;

(b5) a real-time clock for providing designated baud rate timing periods for each of said line adapters;

(c) a central control means connected to said adapter service unit and having interfaces to said data communications memory and said data communications processor, said central control means including:

(c1) ROM memory means for storage of data-transfer routines;

(c2) RAM memory means for temporary storage of specialized data transfer routines received from said data communications memory at the direction of said data communications processor and for providing dedicated storage space for each line adapter and its associated remote terminal;

(c3) means to send an interrupt signal to said data communications processor only upon accumulation of a message length block of data in said RAM memory means;

(c4) means to select instructions from said ROM memory means and/or said RAM memory means for data transfer operations;

(c5) instruction register means to hold instructions fetched from said ROM memory means and/or said RAM memory means for execution of data transfer operations;

(c6) a plurality of working registers for temporary storage of the address of line adapters to be selected for data transfer operations and for storing addresses of information in data communications memory, and for temporary storage of data words;

(c7) processing means for execution of data transfer instructions and/or word processing instructions residing in said instructions register.

11. The adapter cluster module of claim 10 wherein each of said line adapters can be controlled for data transfers on full duplex operation.

12. The adapter cluster module of claim 10 including means to control at least eight line adapters.

13. The adapter cluster module of claim 10 wherein said RAM memory means includes storage area for any special non-standard program routines required to control non-standard remote terminals, such said special program routines being loaded therein by said data communications processor.

14. In a data communications system having a main computer including a main host processor and main host memory and working in conjunction with a data communications subsystem having its own power source, which subsystem includes at least one data communications processor which controls one or more front-end controllers used to manage data transfer operations to and from remote peripheral terminal units, the data communications subsystem comprising:

(a) a local autonomous data communications memory for storage of instructions, control data, and for storage of information data, said data communications memory dedicated for independent operation of said data communications subsystem, said data communications memory being directly accessible by an associated data communications processor and associated group of front-end controllers;

(b) a basic control interface for connecting a group of front-end controllers to said local autonomous data communications memory and to said data communications processor;

(c) a plurality of front-end controllers, each of said front-end controllers dedicated to a particular type of data communications and data transfer operations, each of said front-end controllers having processing means for controlling data transfer operations between connected peripheral terminals and the autonomous data communications memory and the main host memory;

(d) a data communications processor for initializing, starting, and stopping said plurality of front-end controllers, said data communications processor including:

(d1) means for providing an address pointer to each front-end controller to permit each front-end controller to access data transfer commands and routines from the autonomous data communications memory or from the main memory;

(d2) means to sense a halt of the main host system and to place the data communications subsystem on an autonomous operating basis independent of the halt in the main host system;

(d3) means to sense normal operation of the main host system and to resume normal intercommunicating relationships between the main host system and the data communications subsystem;

(e) a front-end controller designated as an adapter cluster module constituting at least one of said plurality of front-end controllers, said adapter cluster module including:

(e1) a plurality of line adapters, each of which has a dedicated transmission line to a remote terminal;

(e2) a central control means connected to said line adapters wherein said central control means includes:

(e2a) ROM memory means for storing program routines;

(e2b) processing means for executing data transfer instructions;

(e2c) RAM memory means for receiving and storing specialized data transfer routines from said data communications processor and for temporary storing of data in areas dedicated to each one of said line adapters;

(e2d) working register means for storage of addresses of a line adapter to be serviced and for storage of data communications memory addresses to be accessed, and for storage of data to be transferred or processed;

(e2e) connection means to said data communications processor;

(e2f) connection means to said data communications memory;

wherein said adapter cluster module controls all data transfer operations, editing, and translation with respect to data being transferred between said remote peripheral terminals and said data communications memory and wherein said adapter cluster module does not interrupt said data communications processor except when a complete message block of data has been accumulated and is ready for transfer to said data communications memory.

15. The data communications subsystem of claim 14 wherein at least 16 adapter cluster module controllers can be controlled by one data communications processor in one data communications subsystem to provide 128 transmission lines to remote terminals, each transmission line operating in full duplex mode.

16. The data communications subsystem of claim 14 wherein at least 16 adapter cluster module controllers can be controlled by one data communication processor in one data communications subsystem to provide 128 simplex-transmit lines and 128 simplex-receive lines to remote terminals.

* * * * *